(12) United States Patent
Zawistowski

(10) Patent No.: US 10,343,742 B2
(45) Date of Patent: Jul. 9, 2019

(54) LINK SUSPENSION SYSTEM

(71) Applicant: YETI CYCLING, LLC, Golden, CO (US)

(72) Inventor: Peter Zawistowski, Lakewood, CO (US)

(73) Assignee: Yeti Cycling, LLC, Golden, CO (US)

( * ) Notice: Subject to any disclaimer, the term of this patent is extended or adjusted under 35 U.S.C. 154(b) by 0 days.

(21) Appl. No.: 15/425,538

(22) Filed: Feb. 6, 2017

(65) Prior Publication Data

US 2017/0334505 A1 Nov. 23, 2017

Related U.S. Application Data

(63) Continuation of application No. 14/807,636, filed on Jul. 23, 2015, now Pat. No. 9,561,834, which is a continuation of application No. 13/215,170, filed on Aug. 22, 2011, now Pat. No. 9,102,378.

(60) Provisional application No. 61/375,278, filed on Aug. 20, 2010.

(51) Int. Cl.
*B62K 25/28* (2006.01)
*B62K 25/30* (2006.01)
*B62K 3/02* (2006.01)

(52) U.S. Cl.
CPC ............... *B62K 25/28* (2013.01); *B62K 3/02* (2013.01); *B62K 25/286* (2013.01); *B62K 25/30* (2013.01)

(58) Field of Classification Search
CPC ............................. B62K 25/28; B62K 15/286
See application file for complete search history.

(56) References Cited

U.S. PATENT DOCUMENTS

| | | | |
|---|---|---|---|
| 421,748 A | 3/1890 | McErlain | |
| 519,855 A | 5/1894 | Whitaker | |
| 591,306 A | 10/1897 | Tolson | |
| 630,232 A | 8/1899 | Hughes et al. | |
| 712,784 A | 11/1902 | Ellis | |
| 724,871 A | 4/1903 | Hunter | |
| 944,795 A | 12/1909 | Leet et al. | |

(Continued)

FOREIGN PATENT DOCUMENTS

| CA | 2293366 A1 | 12/1998 |
|---|---|---|
| CA | 2980086 A1 | 6/2005 |

(Continued)

OTHER PUBLICATIONS

International Search Report and Written Opinion for corresponding PCT Application No. PCT/US2012/066427, dated Jan. 18, 2013, 12 pages.

(Continued)

*Primary Examiner* — Kevin Hurley
(74) *Attorney, Agent, or Firm* — Dorsey & Whitney LLP

(57) ABSTRACT

A bicycle includes a frame having a longitudinal axis, a first member, and a first pivot link assembly including a first link configured to rotate around a first pivot point. The first pivot point may have a first axis of rotation that is non-orthogonal to the longitudinal axis of the first frame, and the first frame may be coupled with the first member through the first pivot link assembly. Some examples also include a second pivot link assembly including a second link configured to rotate around a second pivot point having an axis of rotation that is non-orthogonal to the longitudinal axis of the frame.

20 Claims, 62 Drawing Sheets

(56) References Cited

U.S. PATENT DOCUMENTS

| | | |
|---|---|---|
| 1,043,269 A | 11/1912 | Stephenson |
| 1,068,583 A | 7/1913 | Harley |
| 1,168,702 A | 1/1916 | Babis, Jr. |
| 1,220,606 A | 3/1917 | Chelstrom |
| 1,261,440 A | 4/1918 | Rigby |
| 1,283,030 A | 10/1918 | Ashton |
| 1,369,356 A | 2/1921 | Rigby |
| 2,173,520 A | 9/1939 | Klatt |
| 3,803,933 A | 4/1974 | Huret et al. |
| 3,813,955 A | 6/1974 | Huret et al. |
| 3,847,028 A | 11/1974 | Bergles |
| 3,917,313 A | 11/1975 | Smith et al. |
| 3,977,697 A | 8/1976 | MacPike et al. |
| 4,058,181 A | 11/1977 | Buell |
| 4,076,271 A | 2/1978 | Doncque |
| 4,114,918 A | 9/1978 | Lutz |
| 4,241,617 A | 12/1980 | Fujimoto et al. |
| 4,265,329 A | 5/1981 | de Cortanze |
| 4,279,172 A | 7/1981 | Nagano et al. |
| 4,322,088 A | 3/1982 | Miyakoshi et al. |
| 4,360,214 A | 11/1982 | Isono |
| 4,408,674 A | 10/1983 | Boyesen |
| 4,410,196 A | 10/1983 | Ribi |
| 4,415,057 A | 11/1983 | Yamaguchi |
| 4,429,760 A | 2/1984 | Koizumi et al. |
| 4,433,747 A | 2/1984 | Offenstadt |
| 4,463,824 A | 8/1984 | Boyesen |
| 4,463,964 A | 8/1984 | Takayanagi et al. |
| 4,485,885 A | 12/1984 | Fukuchi |
| 4,500,302 A | 2/1985 | Crepin |
| 4,506,755 A | 3/1985 | Tsuchida et al. |
| 4,540,193 A | 9/1985 | Noda et al. |
| 4,544,044 A | 10/1985 | Boyesen |
| RE32,059 E | 12/1985 | Nagano |
| 4,558,761 A | 12/1985 | Boyesen |
| 4,561,519 A | 12/1985 | Omori |
| 4,574,909 A | 3/1986 | Ribi |
| 4,582,343 A | 4/1986 | Waugh |
| 4,586,913 A | 5/1986 | Nagano |
| 4,596,302 A | 6/1986 | Suzuki et al. |
| 4,619,633 A | 10/1986 | Nagano |
| 4,621,706 A | 11/1986 | Boyesen |
| 4,671,525 A | 6/1987 | Ribi |
| 4,673,053 A | 6/1987 | Tanaka et al. |
| 4,679,811 A | 7/1987 | Shuler |
| 4,702,338 A | 10/1987 | Trema |
| 4,735,277 A | 4/1988 | Prince |
| 4,744,434 A | 5/1988 | Miyakoshi et al. |
| 4,789,042 A | 12/1988 | Pitts |
| 4,789,174 A | 12/1988 | Lawwill |
| RE32,924 E | 5/1989 | Nagano |
| 4,830,391 A | 5/1989 | Silk |
| 4,878,884 A | 11/1989 | Romano |
| 4,951,791 A | 8/1990 | Belil Creixell |
| 5,011,459 A | 4/1991 | Van De Vel |
| 5,121,937 A | 6/1992 | Lawwill |
| 5,205,572 A | 4/1993 | Buell et al. |
| 5,226,674 A | 7/1993 | Buell et al. |
| 5,244,224 A | 9/1993 | Busby |
| 5,259,637 A | 11/1993 | Busby |
| 5,282,517 A | 2/1994 | Prince |
| 5,295,702 A | 3/1994 | Buell |
| 5,299,820 A | 4/1994 | Lawwill |
| 5,306,036 A | 4/1994 | Busby |
| 5,332,246 A | 7/1994 | Buell |
| 5,335,929 A | 8/1994 | Takagaki et al. |
| 5,354,085 A | 10/1994 | Gaily |
| 5,356,165 A | 10/1994 | Kulhawik et al. |
| 5,360,078 A | 11/1994 | Rifenburg et al. |
| 5,370,411 A | 12/1994 | Takamiya et al. |
| 5,409,248 A | 4/1995 | Williams |
| 5,409,249 A | 4/1995 | Busby |
| 5,417,445 A | 5/1995 | Smart |
| 5,429,380 A | 7/1995 | Lawwill |
| 5,435,584 A | 7/1995 | Buell |
| 5,441,292 A | 8/1995 | Busby |
| 5,452,910 A | 9/1995 | Harris |
| 5,474,318 A | 12/1995 | Castellano |
| 5,498,013 A | 3/1996 | Hwang |
| 5,509,679 A | 4/1996 | Leitner |
| 5,553,881 A | 9/1996 | Klassen et al. |
| 5,570,896 A | 11/1996 | Collins |
| 5,597,366 A | 1/1997 | Ozaki |
| 5,607,367 A | 3/1997 | Patterson |
| 5,611,557 A | 3/1997 | Farris et al. |
| 5,628,524 A | 5/1997 | Klassen et al. |
| 5,658,001 A | 8/1997 | Blanchard |
| 5,678,837 A | 10/1997 | Leitner |
| 5,688,200 A | 11/1997 | White |
| 5,772,228 A | 6/1998 | Owyang |
| 5,791,674 A | 8/1998 | D'Aluisio et al. |
| 5,816,966 A | 10/1998 | Yang et al. |
| 5,826,899 A | 10/1998 | Klein et al. |
| 5,899,480 A | 5/1999 | Leitner |
| 5,957,473 A | 9/1999 | Lawwill |
| 6,012,999 A | 1/2000 | Patterson |
| 6,076,845 A | 6/2000 | Lawwill et al. |
| 6,102,421 A | 8/2000 | Lawwill et al. |
| 6,131,934 A | 10/2000 | Sinclair |
| 6,206,397 B1 | 3/2001 | Klassen et al. |
| 6,244,610 B1 | 6/2001 | Kramer-Massow |
| 6,439,593 B1 | 8/2002 | Tseng |
| 6,450,520 B1 | 9/2002 | Girard |
| 6,488,301 B2 | 12/2002 | Klassen et al. |
| 6,543,799 B2 | 4/2003 | Miyoshi |
| 6,629,903 B1 | 10/2003 | Kondo |
| 6,712,374 B2 | 3/2004 | Assier |
| 6,793,230 B1 | 9/2004 | Cheng |
| 6,843,494 B2 | 1/2005 | Lam |
| 6,845,998 B2 | 1/2005 | Probst |
| 6,871,867 B2 | 3/2005 | Parigian |
| 6,877,591 B1 | 4/2005 | Hso |
| 6,886,846 B2 | 5/2005 | Carroll |
| 6,902,504 B2 | 6/2005 | Fukuda |
| 6,926,298 B2 | 8/2005 | Ellsworth et al. |
| 6,955,373 B2 | 10/2005 | Chang |
| 7,025,698 B2 | 4/2006 | Wickliffe |
| 7,048,292 B2 | 5/2006 | Weagle |
| 7,066,481 B1 | 6/2006 | Soucek |
| RE39,159 E | 7/2006 | Klassen et al. |
| 7,100,930 B2 | 9/2006 | Saiki |
| 7,104,908 B2 | 9/2006 | Nagano |
| 7,128,329 B2 | 10/2006 | Weagle |
| 7,131,511 B2 | 11/2006 | Arnold |
| 7,210,695 B2 | 5/2007 | Griffiths |
| 7,216,883 B2 | 5/2007 | Oconnor |
| 7,350,797 B2 | 4/2008 | Carroll |
| 7,377,535 B2 | 5/2008 | Chamberlain |
| 7,392,999 B2 | 7/2008 | Oconnor |
| 7,413,208 B2 | 8/2008 | Weng |
| 7,427,077 B2 | 9/2008 | Lesage et al. |
| 7,467,803 B2 | 12/2008 | Buckley |
| 7,494,146 B2 | 2/2009 | Tseng |
| 7,581,743 B2 | 9/2009 | Graney |
| 7,635,141 B2 | 12/2009 | Oconnor |
| 7,658,394 B1 | 2/2010 | Huang |
| 7,677,347 B2 | 3/2010 | Brawn |
| 7,703,785 B2 | 4/2010 | Colegrove et al. |
| 7,703,788 B2 | 4/2010 | Tanouye et al. |
| 7,712,757 B2 | 5/2010 | Berthold |
| 7,717,212 B2 | 5/2010 | Weagle |
| 7,722,072 B2 | 5/2010 | Hoogendoorn |
| 7,722,488 B2 | 5/2010 | Kunisawa et al. |
| 7,766,135 B2 | 8/2010 | Fox |
| 7,784,810 B2 | 8/2010 | Graney |
| 7,806,422 B2 | 10/2010 | I |
| 7,815,207 B2 | 10/2010 | Currie |
| 7,828,314 B2 | 11/2010 | Weagle |
| 7,837,213 B2 | 11/2010 | Colegrove et al. |
| 7,837,214 B2 | 11/2010 | Tribotte |
| 7,891,688 B2 | 2/2011 | Chamberlain |
| 7,909,347 B2 | 3/2011 | Earle |
| 7,914,407 B2 | 3/2011 | Fukushima et al. |
| 7,934,739 B2 | 5/2011 | Domahidy |

(56) References Cited

U.S. PATENT DOCUMENTS

| | | | |
|---|---|---|---|
| 7,938,424 B2 | 5/2011 | Arraiz | |
| 7,938,425 B2 | 5/2011 | Chamberlain | |
| 7,954,837 B2 | 6/2011 | Talavasek | |
| 7,963,541 B2 | 6/2011 | Chamberlain | |
| 7,980,579 B2 | 7/2011 | Buckley | |
| 8,002,301 B2 | 8/2011 | Weagle | |
| 8,006,993 B1 | 8/2011 | Chamberlain | |
| 8,007,383 B2 | 8/2011 | Watarai et al. | |
| 8,012,052 B2 | 9/2011 | Shahana | |
| 8,033,558 B2 | 10/2011 | Earle | |
| 8,066,297 B2 | 11/2011 | Beale et al. | |
| 8,075,009 B2 | 12/2011 | Cocalis et al. | |
| 8,136,829 B1 | 3/2012 | Kang et al. | |
| 8,152,191 B2 | 4/2012 | Huang et al. | |
| 8,201,841 B2 | 6/2012 | Beale et al. | |
| 8,272,657 B2 | 9/2012 | Graney et al. | |
| 8,272,658 B2 | 9/2012 | Hoogendoorn | |
| 8,286,982 B2 | 10/2012 | Plantet et al. | |
| 8,303,443 B2 | 11/2012 | Wickliffe et al. | |
| 8,348,295 B2 | 1/2013 | Beaulieu et al. | |
| 8,382,136 B2 | 2/2013 | Beale et al. | |
| 8,419,573 B2 | 4/2013 | Yamaguchi | |
| 8,430,415 B2 | 4/2013 | Earle et al. | |
| 8,434,776 B2 | 5/2013 | Wuthrich | |
| 8,439,383 B2 | 5/2013 | Talavasek | |
| 8,459,680 B2 | 6/2013 | Chamberlain | |
| 8,585,070 B2 | 11/2013 | Beale | |
| 8,590,914 B2 | 11/2013 | Domahidy | |
| 8,622,411 B1 | 1/2014 | Chamberlain | |
| 8,641,072 B2 | 2/2014 | Graney et al. | |
| 8,646,797 B2 | 2/2014 | Buckley | |
| 8,678,962 B2 | 3/2014 | Jordan | |
| 8,696,008 B2 | 4/2014 | Hoogendoorn | |
| 8,727,057 B2* | 5/2014 | Park | B60G 3/207 180/210 |
| 8,733,774 B2 | 5/2014 | Graney et al. | |
| 8,770,360 B2 | 7/2014 | Fox | |
| 8,833,785 B2* | 9/2014 | Wagner | B62K 21/00 180/219 |
| 8,851,498 B2 | 10/2014 | Alsop | |
| 8,882,127 B2 | 11/2014 | Colegrove et al. | |
| 8,919,799 B2 | 12/2014 | Wimmer | |
| 8,931,793 B2 | 1/2015 | Klieber | |
| 8,932,162 B2 | 1/2015 | Emura et al. | |
| 8,998,235 B2 | 4/2015 | Beale | |
| 9,039,026 B2 | 5/2015 | Hudec | |
| 9,056,644 B2 | 6/2015 | Hudák | |
| 9,056,647 B2 | 6/2015 | Hu | |
| 9,061,729 B2 | 6/2015 | Canfield et al. | |
| 9,102,378 B2 | 8/2015 | Zawistowski | |
| 9,102,379 B2 | 8/2015 | Capogna | |
| 9,127,766 B2 | 9/2015 | Kuwayama et al. | |
| 9,145,185 B1 | 9/2015 | Claro | |
| 9,156,521 B2 | 10/2015 | Lumpkin | |
| 9,216,791 B2 | 12/2015 | Hudec | |
| 9,221,513 B2 | 12/2015 | Hoogendoorn | |
| 9,242,693 B2 | 1/2016 | Voss | |
| 9,302,732 B2 | 4/2016 | Beale | |
| 9,327,792 B2 | 5/2016 | Johnson et al. | |
| 9,334,011 B2 | 5/2016 | Chamberlain | |
| 9,376,156 B2 | 6/2016 | Chamberlain | |
| 9,376,162 B2 | 6/2016 | Colegrove et al. | |
| 9,457,871 B2 | 10/2016 | Kuwayama et al. | |
| 9,469,369 B2 | 10/2016 | Thoma | |
| 9,505,462 B2 | 11/2016 | Pasqua et al. | |
| 9,598,131 B2* | 3/2017 | Zusy | B62K 15/006 |
| 9,637,199 B2 | 5/2017 | Pasqua et al. | |
| 9,676,446 B2 | 6/2017 | Pasqua et al. | |
| 9,758,217 B2 | 9/2017 | Bortoli et al. | |
| 9,821,879 B2 | 11/2017 | Hoogendoorn et al. | |
| 10,011,325 B2 | 1/2018 | Zawistowski | |
| 9,919,765 B2 | 3/2018 | Wickliffe et al. | |
| 2001/0024024 A1 | 9/2001 | Klassen et al. | |
| 2003/0038450 A1 | 2/2003 | Lam | |
| 2004/0046355 A1 | 3/2004 | Carroll | |
| 2004/0061305 A1 | 4/2004 | Christini | |
| 2004/0239071 A1 | 12/2004 | Chamberlain et al. | |
| 2005/0067809 A2 | 3/2005 | Chamberlain | |
| 2005/0067810 A1 | 3/2005 | Weagle | |
| 2005/0184483 A1 | 8/2005 | Buckley | |
| 2005/0253357 A1 | 11/2005 | Chang et al. | |
| 2005/0285367 A1 | 12/2005 | Chang et al. | |
| 2006/0061059 A1 | 3/2006 | Lesage et al. | |
| 2006/0071442 A1 | 4/2006 | Hoogendoorn | |
| 2006/0119070 A1 | 6/2006 | Weagle | |
| 2006/0181053 A1 | 8/2006 | Huang et al. | |
| 2006/0197306 A1 | 9/2006 | Oconnor | |
| 2006/0225942 A1 | 10/2006 | Weagle | |
| 2006/0231360 A1 | 10/2006 | Chen | |
| 2007/0024022 A1 | 2/2007 | Weagle | |
| 2007/0108725 A1 | 5/2007 | Graney | |
| 2007/0194550 A1 | 8/2007 | Wadelton | |
| 2007/0210555 A1 | 9/2007 | Oconnor | |
| 2008/0054595 A1 | 3/2008 | Lu | |
| 2008/0067772 A1 | 3/2008 | Weagle | |
| 2008/0217882 A1 | 9/2008 | Beaulieu et al. | |
| 2008/0238030 A1 | 10/2008 | Tseng | |
| 2008/0238031 A1 | 10/2008 | Tseng | |
| 2008/0252040 A1 | 10/2008 | Colegrove et al. | |
| 2008/0258427 A1 | 10/2008 | Buckley | |
| 2008/0303242 A1 | 12/2008 | Oconnor | |
| 2009/0001685 A1 | 1/2009 | Talavasek et al. | |
| 2009/0026728 A1 | 1/2009 | Domahidy | |
| 2009/0072512 A1 | 3/2009 | Earle | |
| 2009/0250897 A1 | 10/2009 | Tanouye et al. | |
| 2009/0278331 A1 | 11/2009 | Graney | |
| 2009/0283986 A1 | 11/2009 | Falke | |
| 2010/0059965 A1 | 3/2010 | Earle | |
| 2010/0102531 A1 | 4/2010 | Graney et al. | |
| 2010/0109282 A1 | 5/2010 | Weagle | |
| 2010/0127473 A1 | 5/2010 | Cocalis et al. | |
| 2010/0156066 A1 | 6/2010 | Oconnor | |
| 2010/0327553 A1 | 12/2010 | Talavasek | |
| 2010/0327554 A1 | 12/2010 | Talavasek | |
| 2010/0327556 A1 | 12/2010 | Chamberlain | |
| 2011/0025015 A1 | 2/2011 | Colegrove et al. | |
| 2011/0175310 A1* | 7/2011 | Lewis | A63C 17/0046 280/87.042 |
| 2011/0187078 A1 | 8/2011 | Higgon | |
| 2011/0233892 A1 | 9/2011 | Domahidy | |
| 2011/0233893 A1 | 9/2011 | Buckley | |
| 2011/0275256 A1* | 11/2011 | Gibbs | B60F 3/0007 440/12.51 |
| 2011/0285106 A1 | 11/2011 | Talavasek | |
| 2012/0223504 A1 | 9/2012 | Antonot | |
| 2012/0228850 A1 | 9/2012 | Tseng | |
| 2012/0280470 A1 | 11/2012 | Colegrove et al. | |
| 2012/0299268 A1 | 11/2012 | Chamberlain et al. | |
| 2013/0001918 A1 | 1/2013 | Graney et al. | |
| 2013/0001919 A1 | 1/2013 | Graney et al. | |
| 2013/0093160 A1 | 4/2013 | Alsop | |
| 2013/0096781 A1* | 4/2013 | Reichenbach | B60Q 1/326 701/49 |
| 2013/0214503 A1* | 8/2013 | Chiuppani | B60G 5/025 280/124.103 |
| 2013/0249181 A1 | 9/2013 | Becker et al. | |
| 2013/0249188 A1 | 9/2013 | Beale | |
| 2013/0285346 A1 | 10/2013 | Wimmer | |
| 2014/0001729 A1 | 1/2014 | Hudec | |
| 2014/0015220 A1 | 1/2014 | Talavasek | |
| 2014/0060950 A1 | 3/2014 | Beutner | |
| 2014/0217697 A1 | 8/2014 | Buckley | |
| 2014/0318306 A1 | 10/2014 | Tetsuka | |
| 2015/0001829 A1 | 1/2015 | Berthold | |
| 2015/0054250 A1 | 2/2015 | Hu | |
| 2015/0115569 A1 | 4/2015 | Matheson et al. | |
| 2015/0175238 A1 | 6/2015 | Lumpkin | |
| 2015/0183487 A1 | 7/2015 | Tsai | |
| 2015/0191213 A1 | 7/2015 | Beale | |
| 2015/0251724 A1 | 9/2015 | Hudec | |
| 2015/0360743 A1 | 12/2015 | Oconnor | |
| 2016/0083042 A1 | 3/2016 | Voss | |
| 2016/0272273 A1 | 9/2016 | Colegrove et al. | |
| 2016/0280317 A1 | 9/2016 | Hoogendoorn | |

(56) References Cited

U.S. PATENT DOCUMENTS

| | | |
|---|---|---|
| 2016/0311493 A1 | 10/2016 | Scheffer |
| 2018/0229798 A1 | 8/2018 | Hoogendoorn et al. |
| 2018/0265165 A1 | 9/2018 | Zawistowski |
| 2018/0297661 A1 | 10/2018 | Beale |

FOREIGN PATENT DOCUMENTS

| | | |
|---|---|---|
| DE | 692011 C | 6/1940 |
| DE | 9405076 U1 | 5/1994 |
| DE | 9416803 U1 | 12/1994 |
| DE | 4435482 A1 | 4/1996 |
| EP | 0422324 A1 | 4/1991 |
| EP | 0723907 B1 | 7/1998 |
| EP | 941917 A2 | 9/1999 |
| EP | 1060979 A2 | 12/2000 |
| EP | 2540609 A1 | 1/2013 |
| FR | 541520 A | 7/1922 |
| FR | 933079 A | 4/1948 |
| FR | 2774966 A1 | 8/1999 |
| GB | 17336 | 10/1913 |
| JP | H0725378 A | 1/1995 |
| WO | 9422710 A1 | 10/1994 |
| WO | 9803390 A1 | 1/1998 |
| WO | 9818671 A1 | 5/1998 |
| WO | 9856645 A1 | 12/1998 |
| WO | 199944880 | 9/1999 |
| WO | 9965760 A1 | 12/1999 |
| WO | 9944880 A9 | 1/2000 |
| WO | 03010042 A1 | 2/2003 |
| WO | 03018392 A1 | 3/2003 |
| WO | 03021129 A1 | 3/2003 |
| WO | 2004045940 A2 | 6/2004 |
| WO | 2005030564 A2 | 4/2005 |
| WO | 2005030565 A1 | 4/2005 |
| WO | 2005090149 A1 | 9/2005 |
| WO | 2006005687 A1 | 1/2006 |
| WO | 2006032052 A2 | 3/2006 |
| WO | 2006061052 A1 | 6/2006 |
| WO | 2008025950 A1 | 3/2008 |
| WO | 2008130336 A1 | 10/2008 |
| WO | 2009121936 A1 | 10/2009 |
| WO | 2010033174 A1 | 3/2010 |
| WO | 2010103057 A1 | 9/2010 |
| WO | 2010121267 A1 | 10/2010 |
| WO | 2012024697 A1 | 2/2012 |
| WO | 2012027900 A1 | 3/2012 |
| WO | 2012063098 A1 | 5/2012 |
| WO | 2012122634 A1 | 9/2012 |
| WO | 2013028138 A2 | 2/2013 |
| WO | 2013078436 A1 | 5/2013 |
| WO | 2013119616 A1 | 8/2013 |
| WO | 2013142855 A2 | 9/2013 |
| WO | 2013192622 A1 | 12/2013 |
| WO | 2014009019 A1 | 1/2014 |
| WO | 2014029759 A1 | 2/2014 |
| WO | 2014202890 A1 | 12/2014 |
| WO | 2015196242 A1 | 12/2015 |
| WO | 2016036237 A1 | 3/2016 |
| WO | 2016097433 A1 | 6/2016 |
| WO | 2016134471 A1 | 9/2016 |

OTHER PUBLICATIONS

PCT International Search Report and Written Opinion dated Dec. 14, 2011 in connection with International Patent Application No. PCT/US2011/048696, 10 pages.

Author Unknown, "Sarrus Linkage", Wikipedia, http://en.wikipedia.org/wiki/Sarrus_linkage, 1 page, at least as early as Aug. 20, 2010.

Chen, "Design of Structural Mechanisms", A dissertation submitted for the degree of Doctor of Philosophy in the Department of Engineering Science at the University of Oxford, St. Hugh's College, 2003, 160 Pages.

European Patent Office, "European Extended Search Report dated May 28, 2015", European Patent Application No. 12851566.5, 7 pages.

European Patent Office, "Extended European Search Report dated Sep. 15, 2015", EP Patent Application No. 11818903.4, 8 pages.

Li, "Movable Spatial 6R Linkages", XP055249075, Retrieved from the Internet Oct. 13, 2016: URL:http://people.ricam.oeaw.ac.at/z.li/publications/talks/6.pdf, Oct. 2, 2013, 48 Pages.

Prosecution Document, "EP Supplementary Search Report dated Dec. 11, 2008", EP Application No. 05798319.9, 1 page.

Prosecution Document, "PCT International Search Report and Written Opinion dated Nov. 29, 2006", PCT Application No. PCT/US2005/33410, 5 pages.

Zawistowski, "Quantifying Wheel Path", Think Turquoise, http://www.yeticycles.com/blog/?p=237 [Retrieved from the Internet on Jul. 27, 2011], Jul. 18, 2010, 4 Pages.

PCT International Search Report and Written Opinion Application No. PCT/US2018/023124 dated Aug. 2, 2018, 14 pages.

PCT International Search Report and Written Opinion Application No. PCT/US2018/041054 dated Sep. 28, 2018, 12 pages.

Zawistowski, Think Turquoise, http://www.yeticycles.com/blog/?p=237 [Retrieved from the Internet on Jul. 27, 2011], Jul. 18, 2010.

Chen, Design of Structural Mechanisms, A dissertation submitted for the degree of Doctor of Philosophy in the Department of Engineering Science at the University of Oxford, St Hugh's College, 2003, 160 pages.

PCT International Search Report and Written Opinion Application No. PCT/US2015/065090 dated Feb. 23, 2016, 11 pages.

Li, Movable Spatial 6R Linkages, XP055249075, Retrieved from the Internet on Oct. 13, 2016: URL:http://people.ricam.oeaw.ac.at/z.li/publications/talks/6.pdf, Oct. 2, 2013, 48 pages.

Sarrut, Note Sur La Transformation Des Mouvements Rectilignes Alternatifs, Académie des Sciences, 36, 1036-1038, 1853, 5 pages.

\* cited by examiner

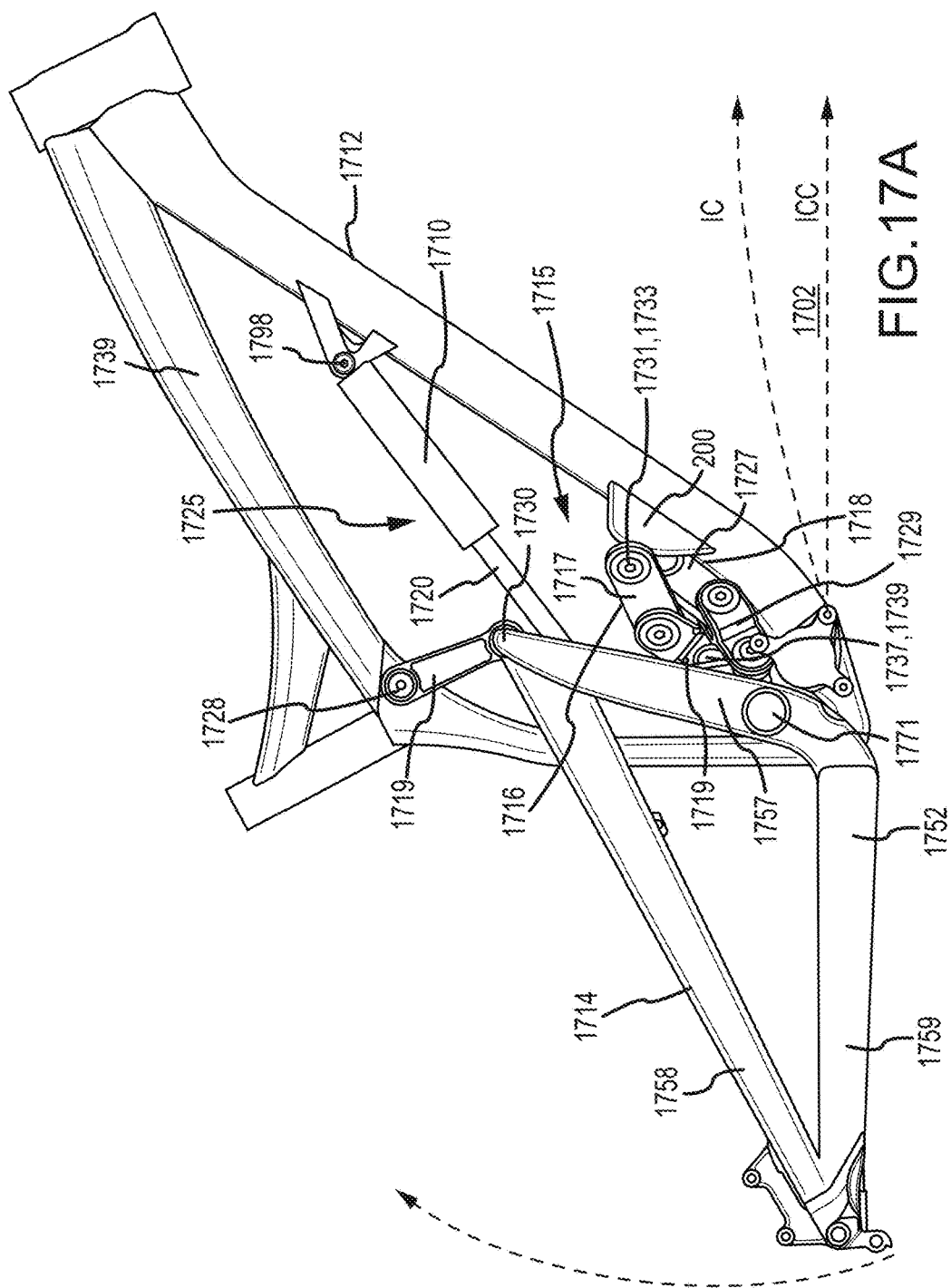

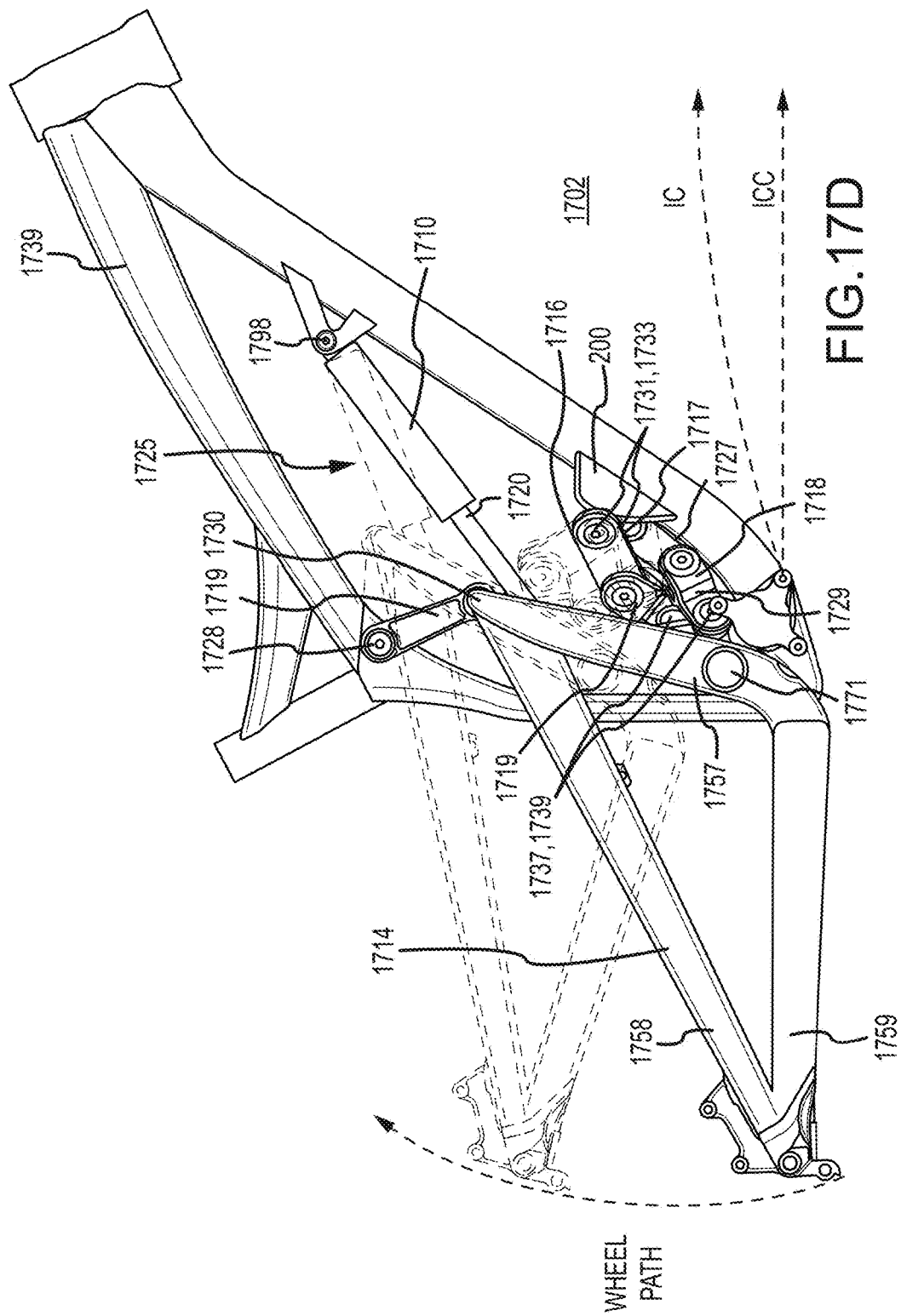

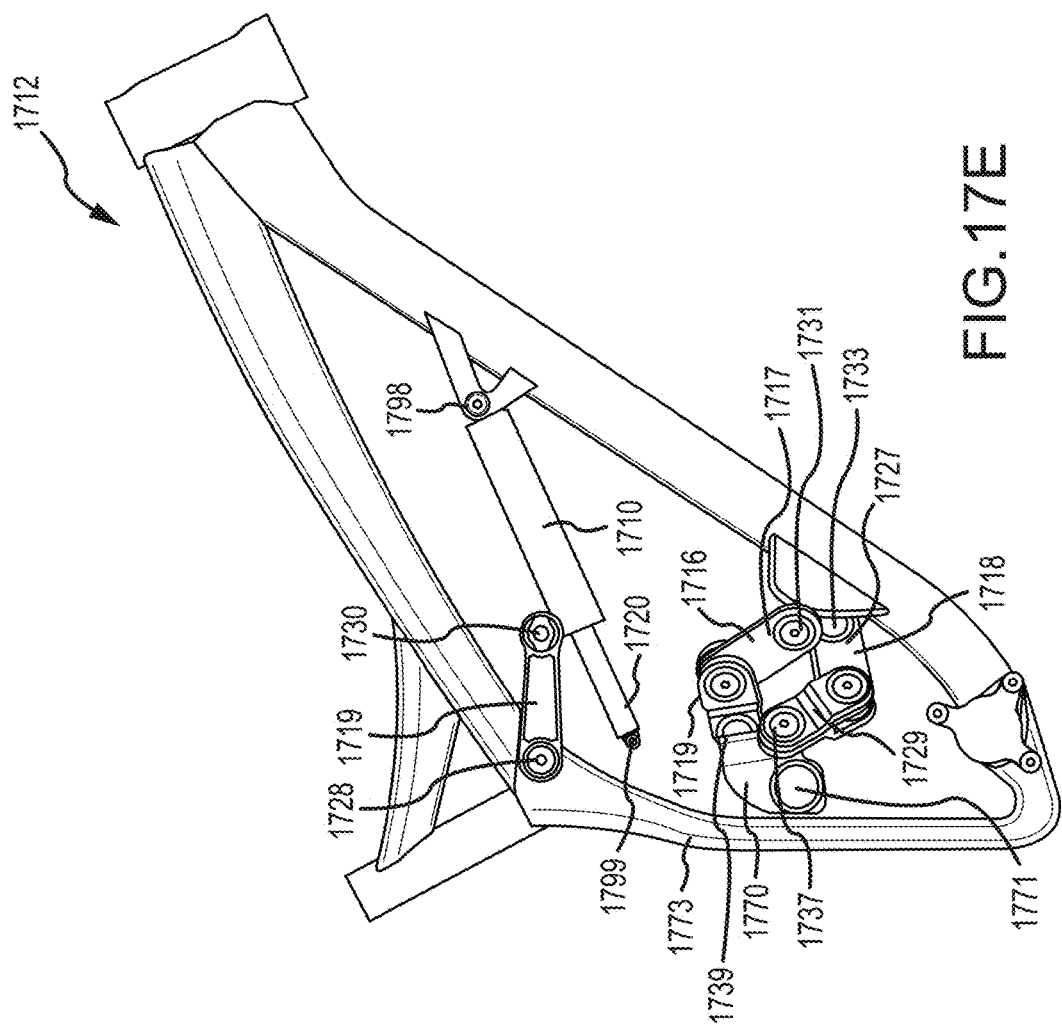

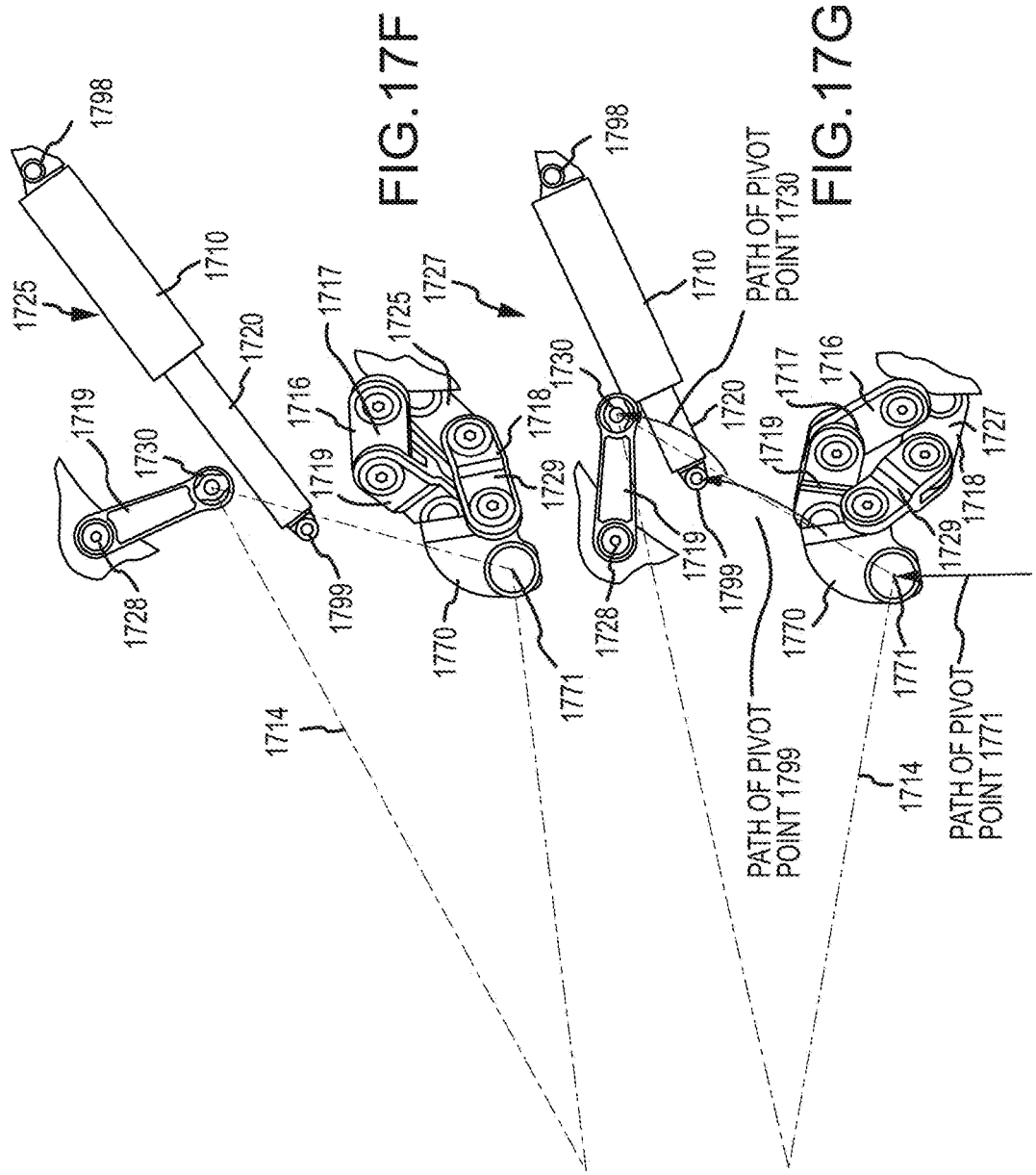

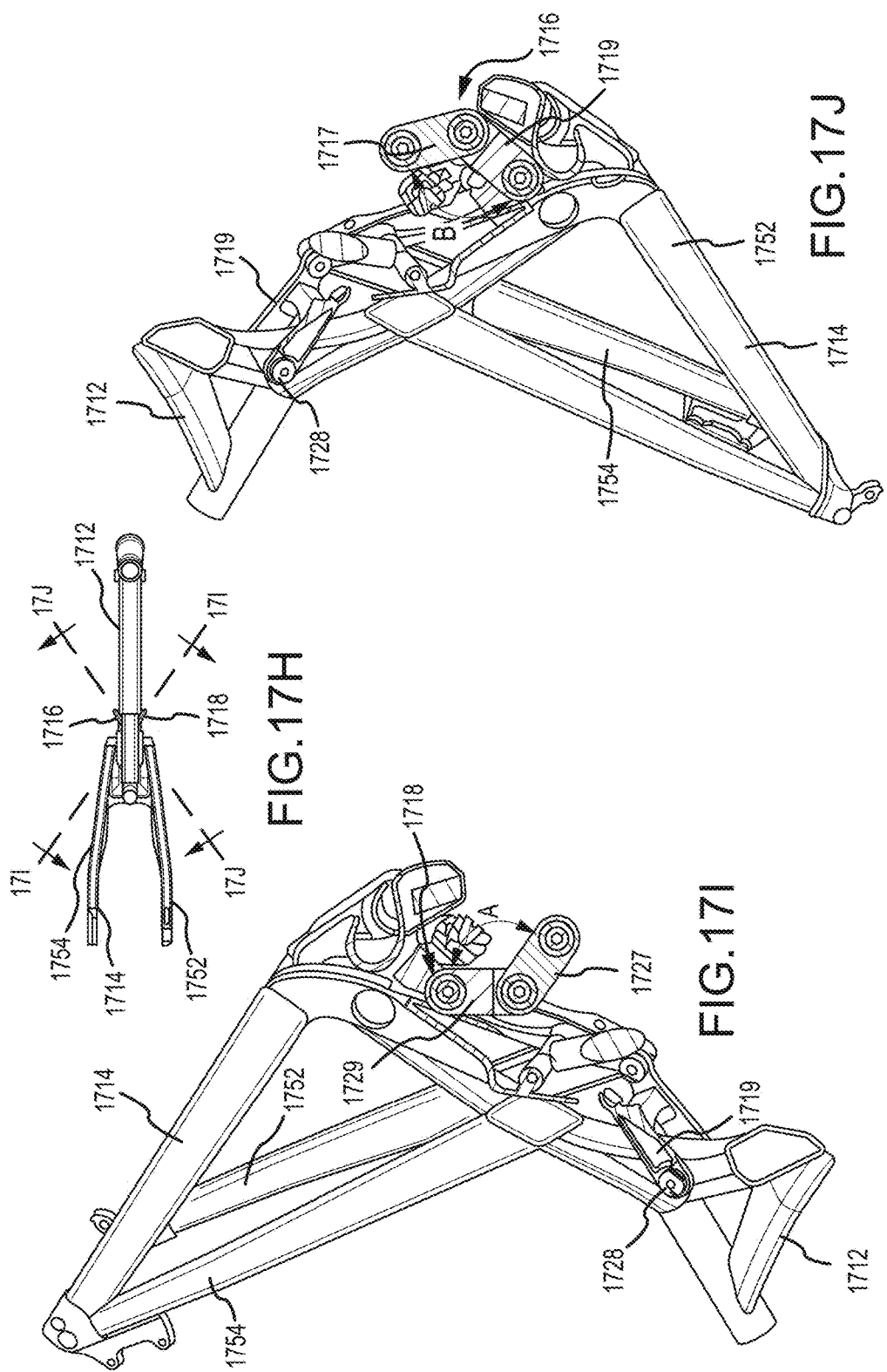

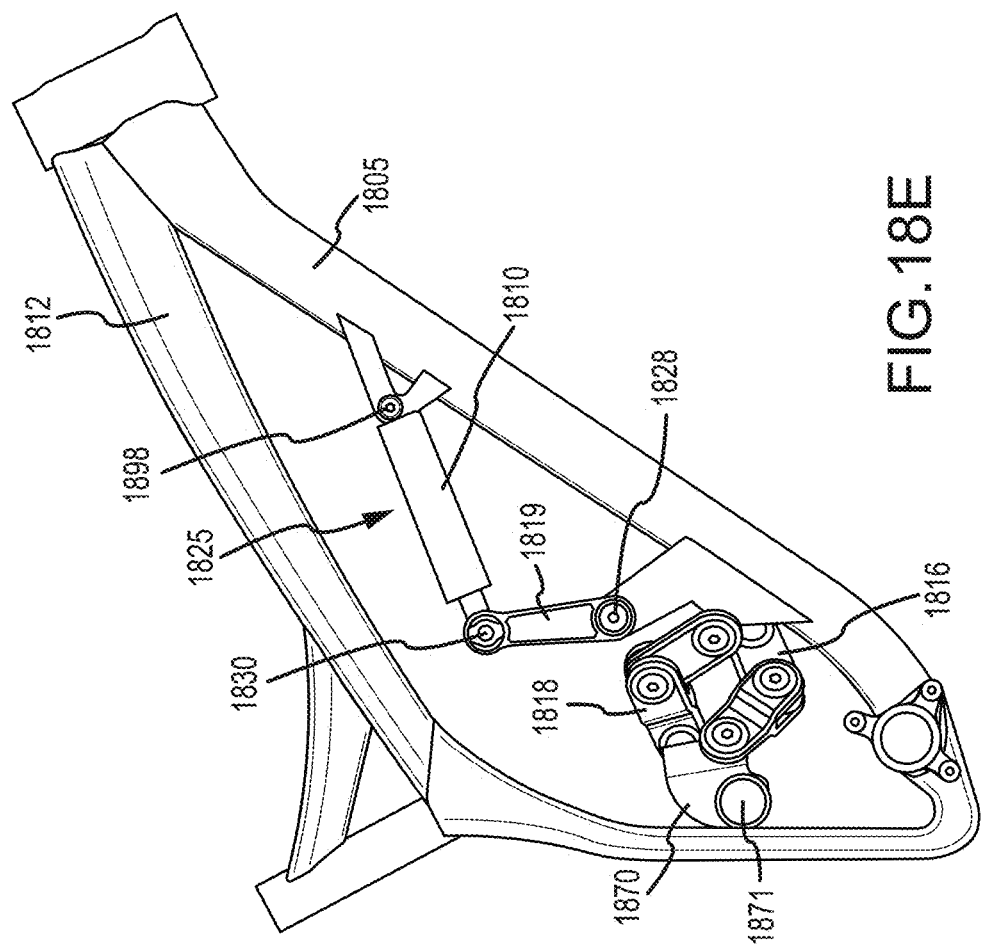

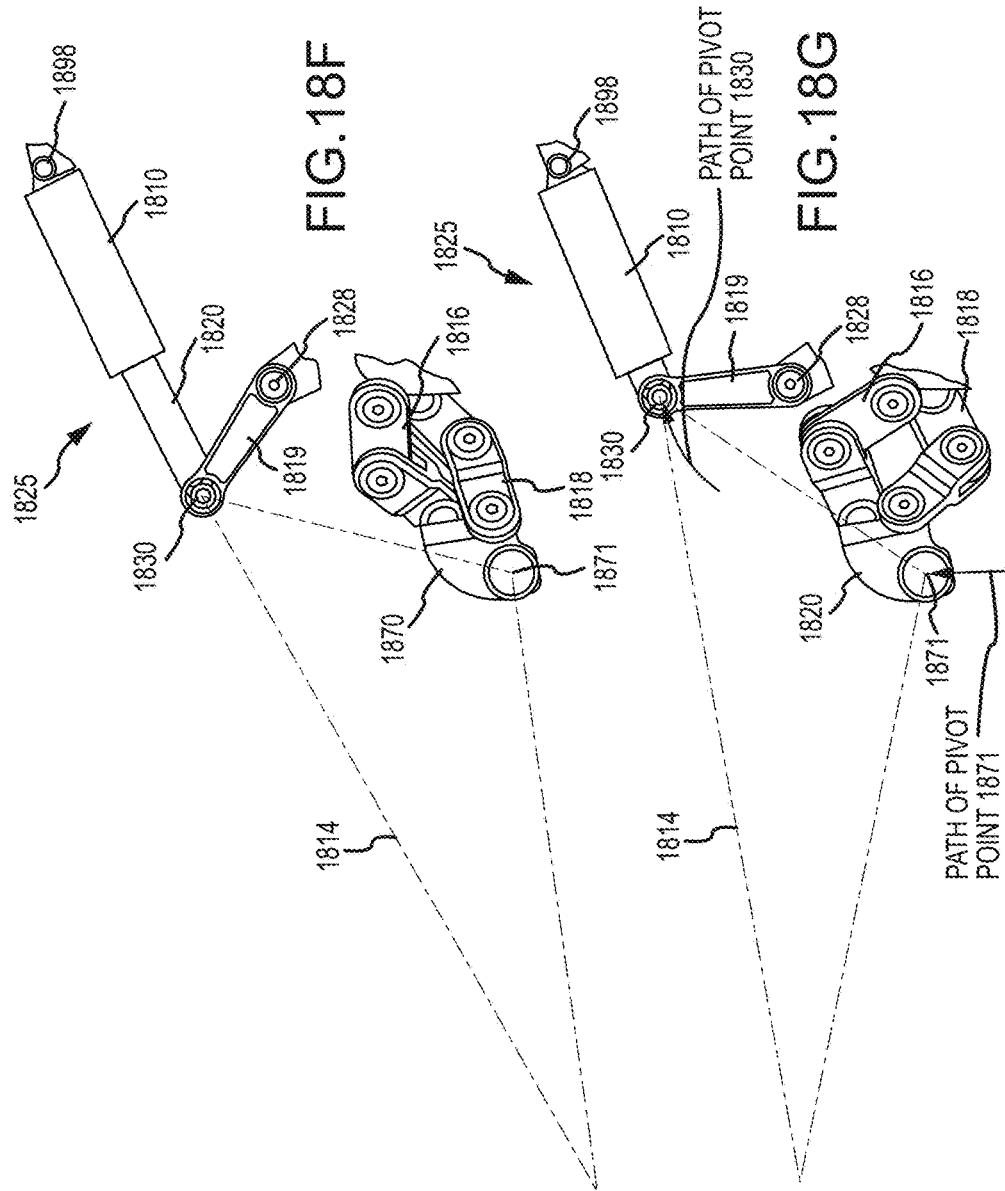

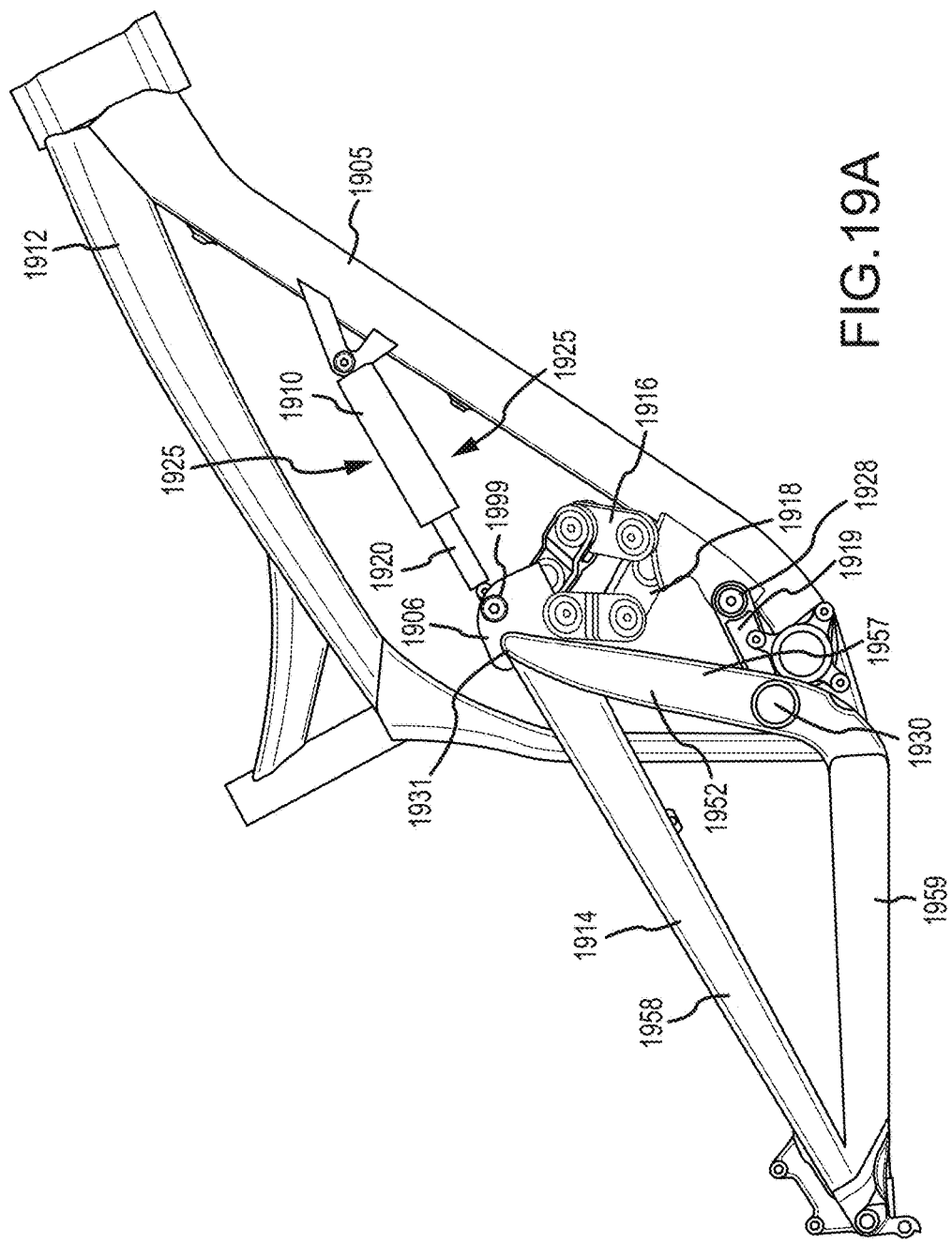

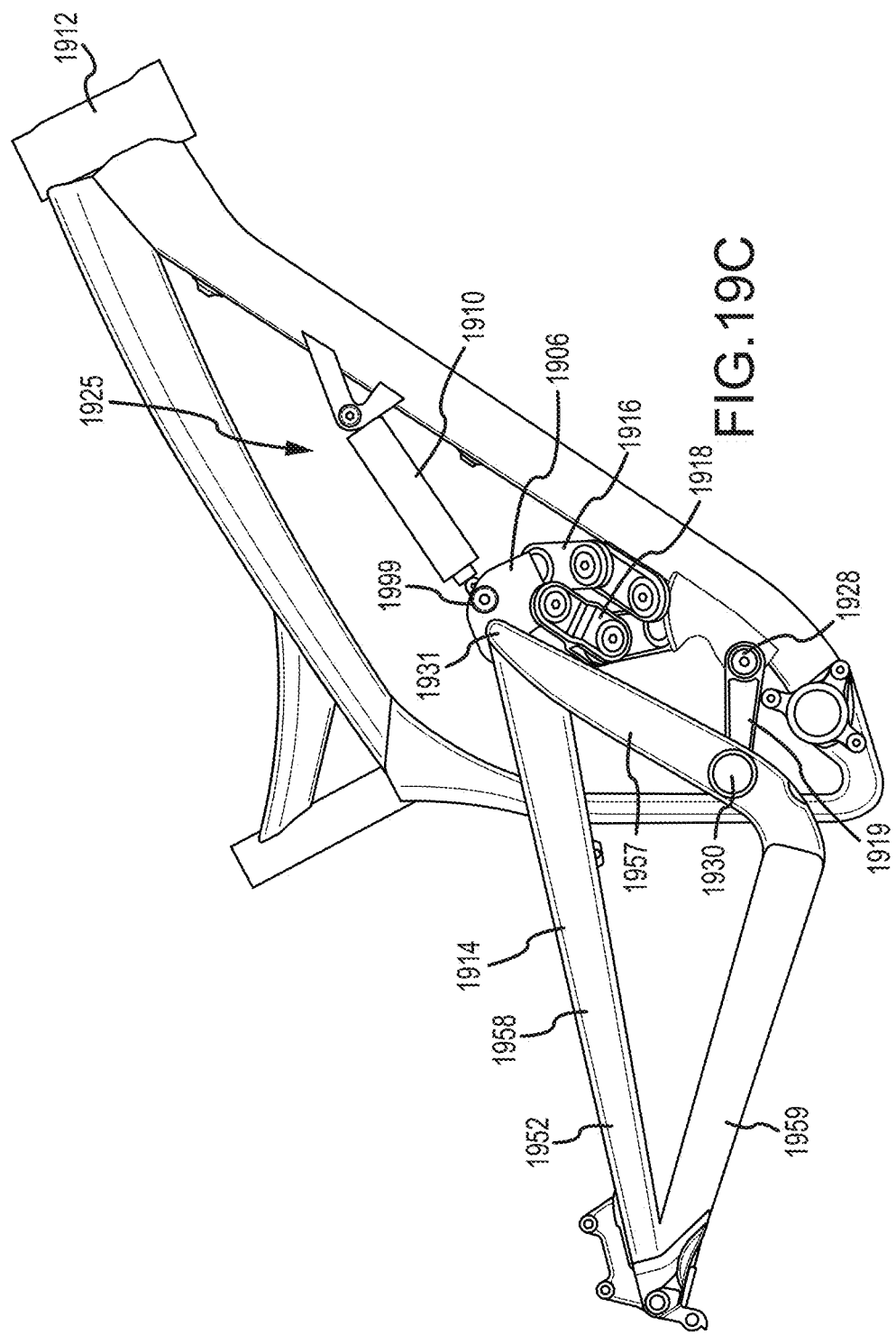

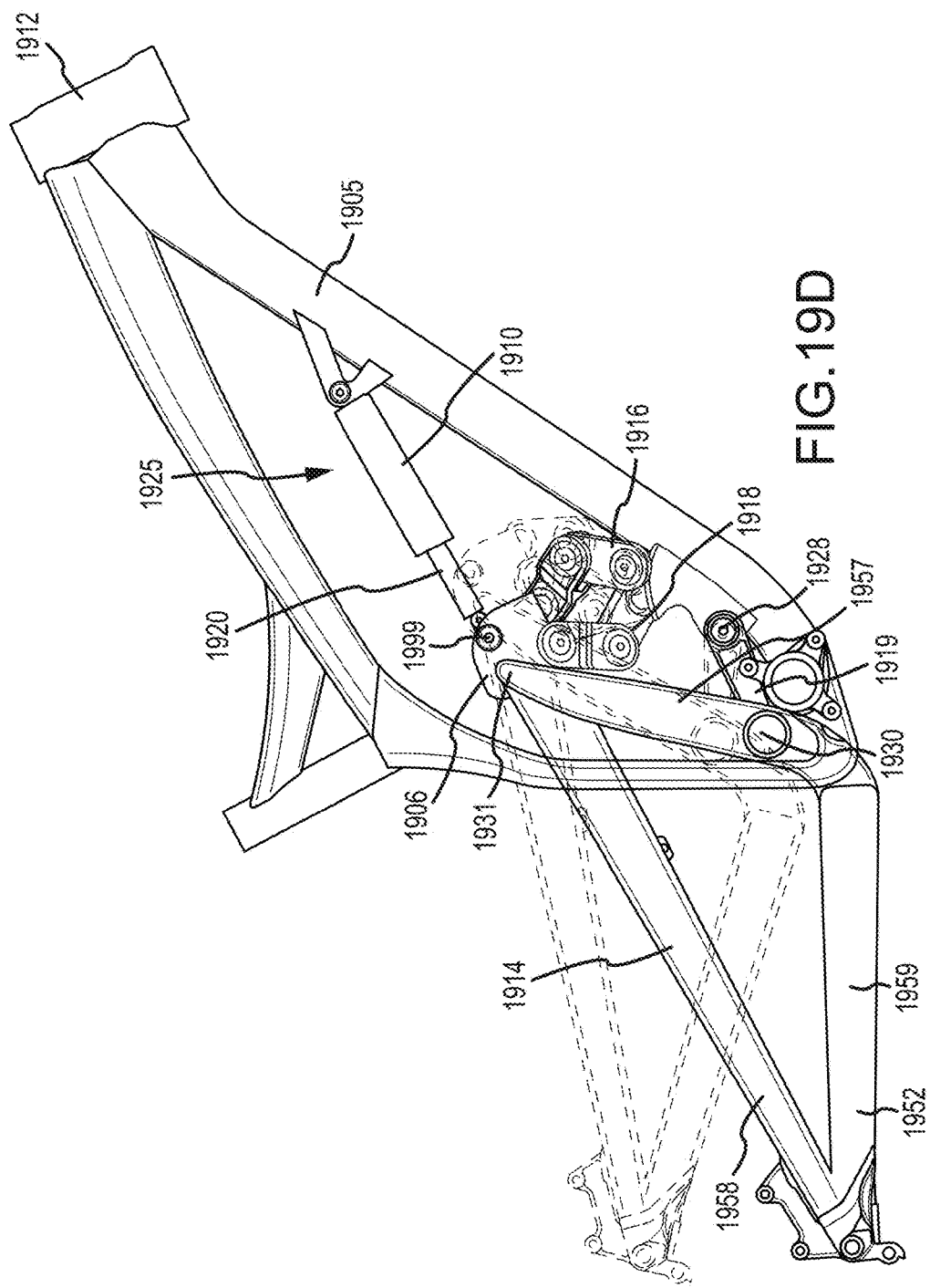

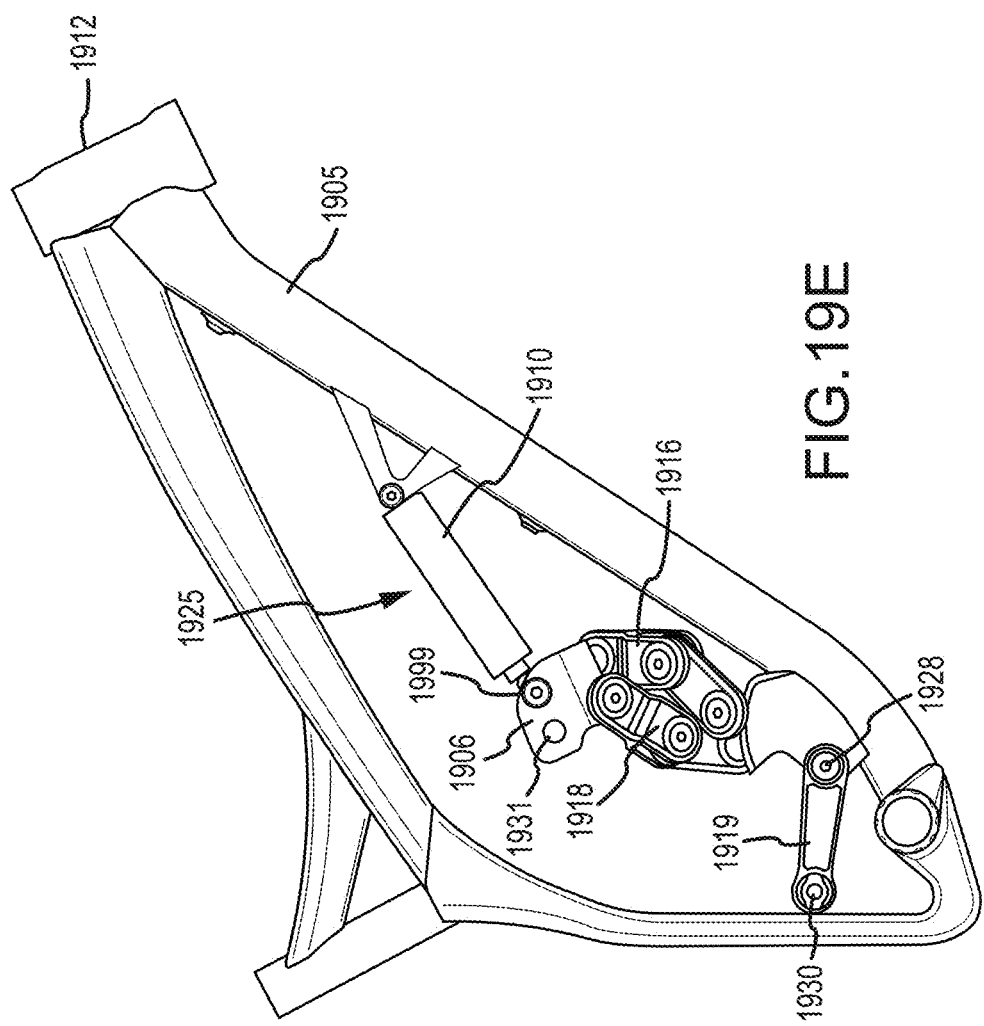

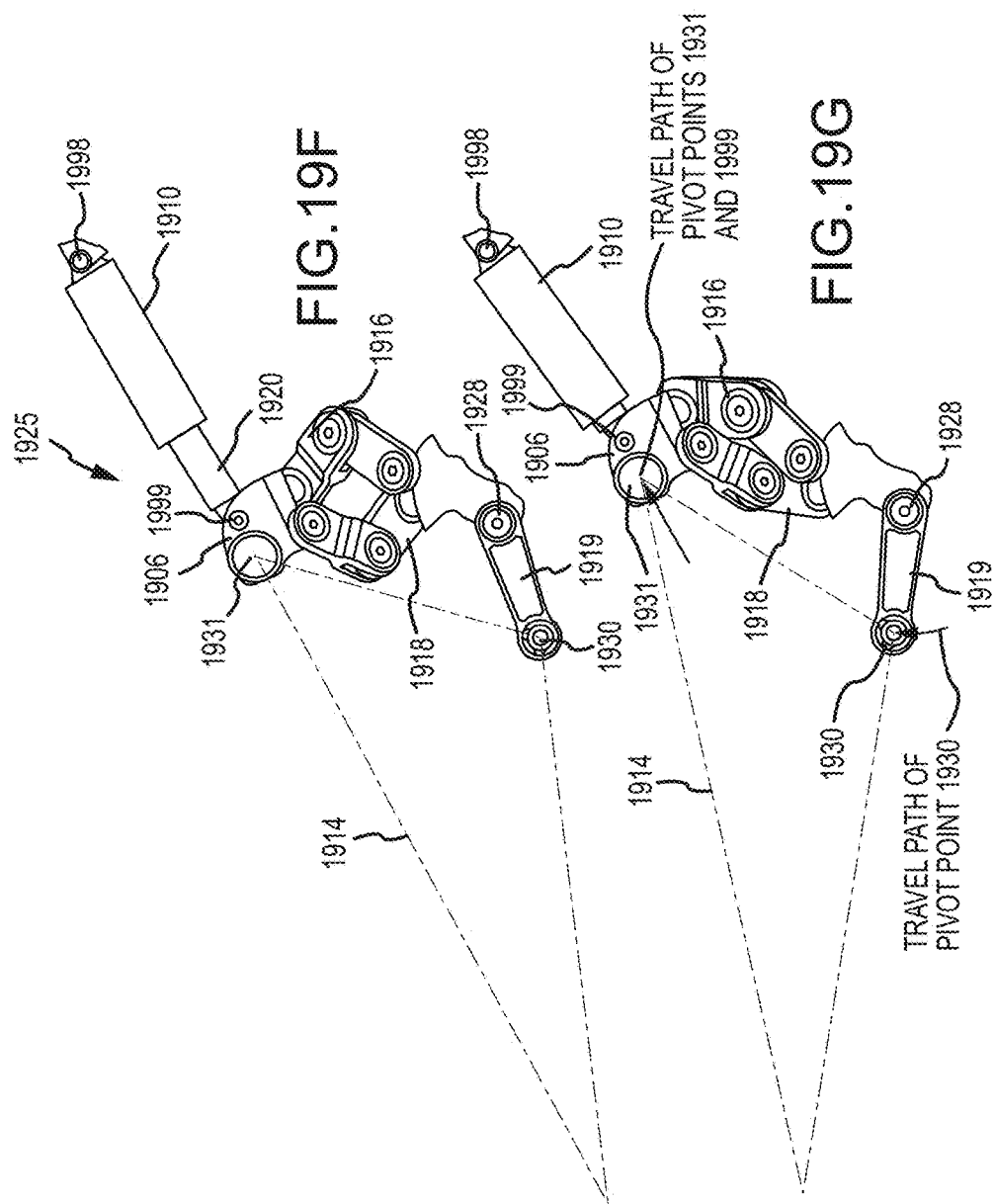

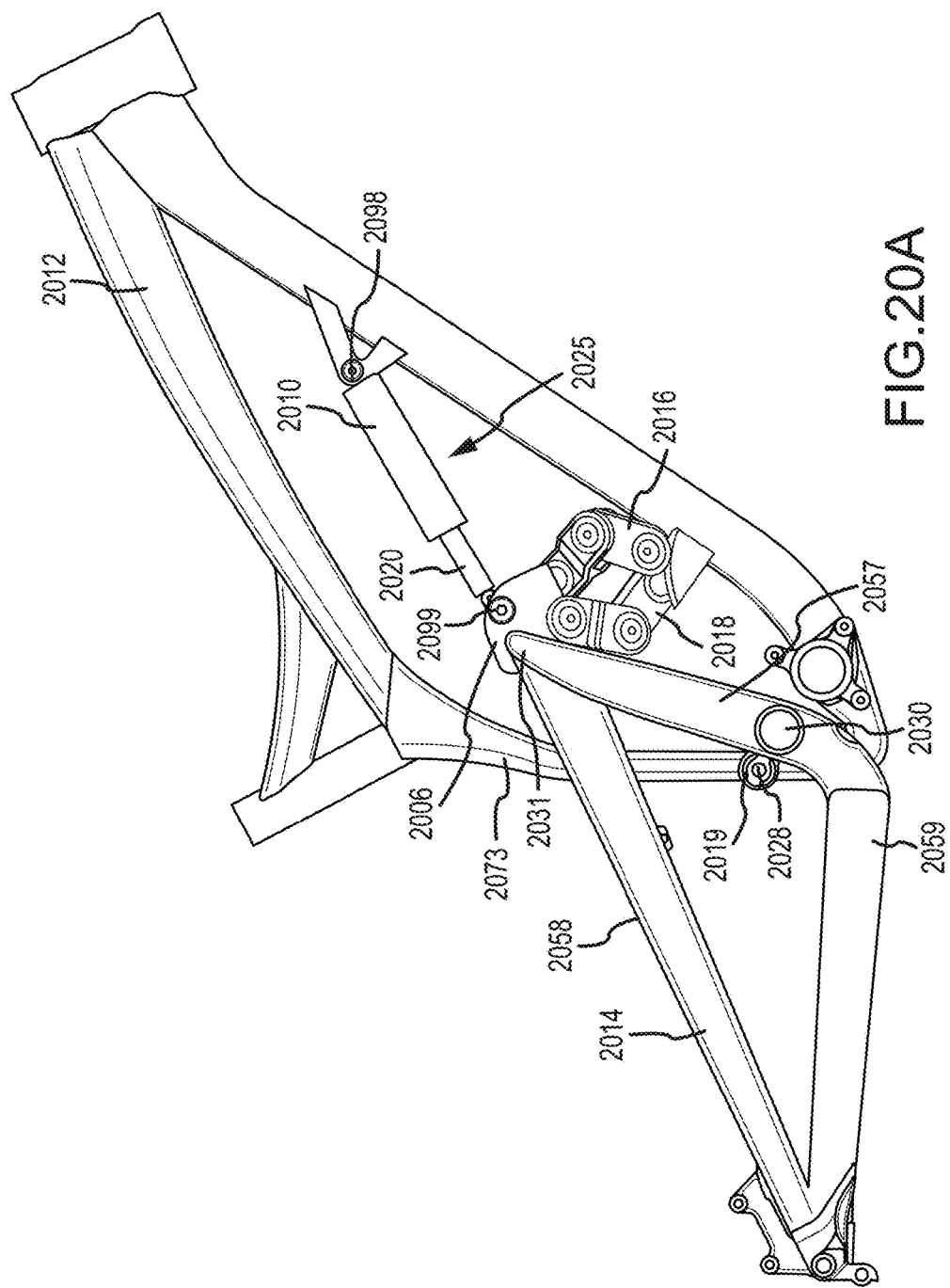

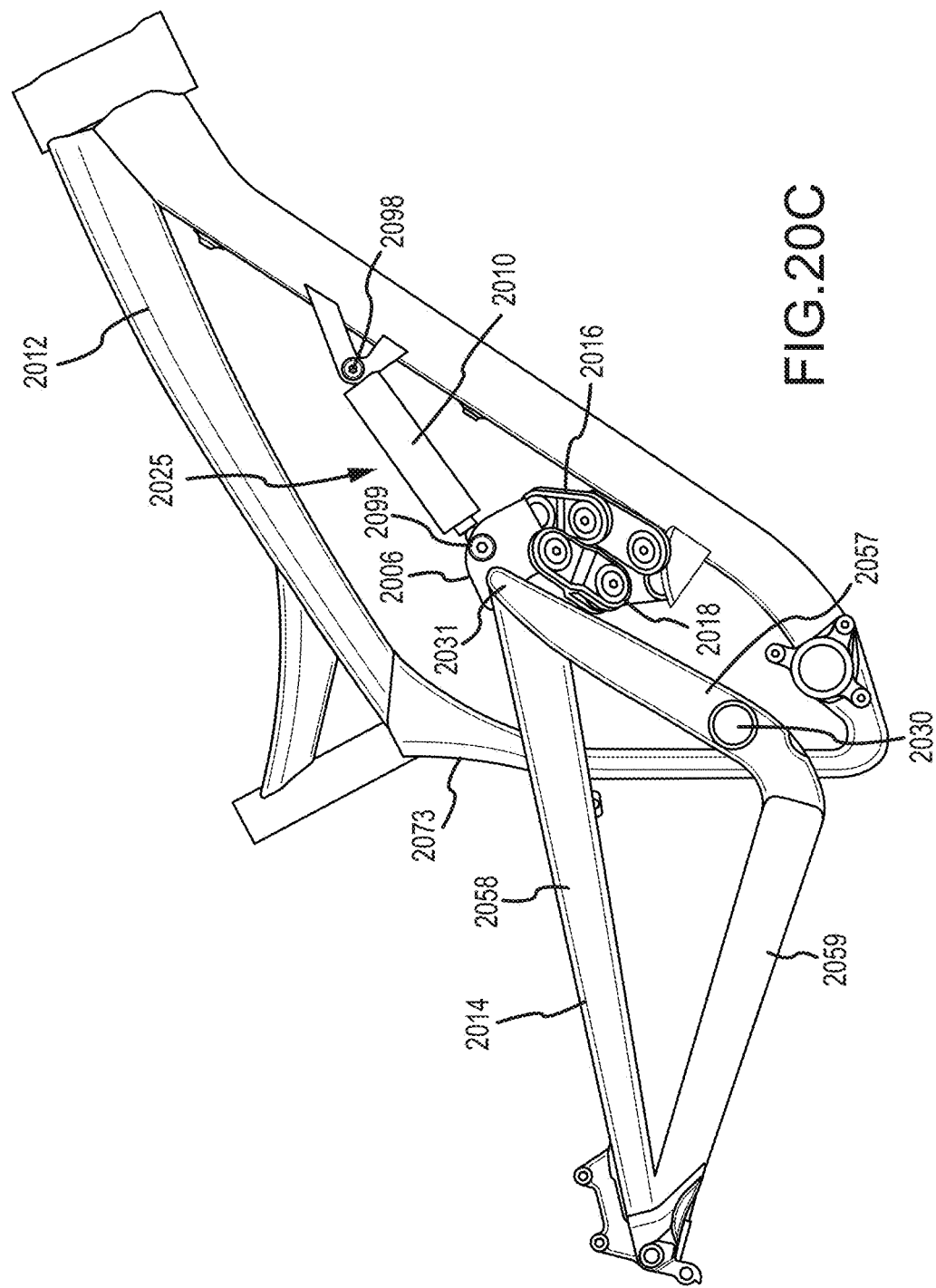

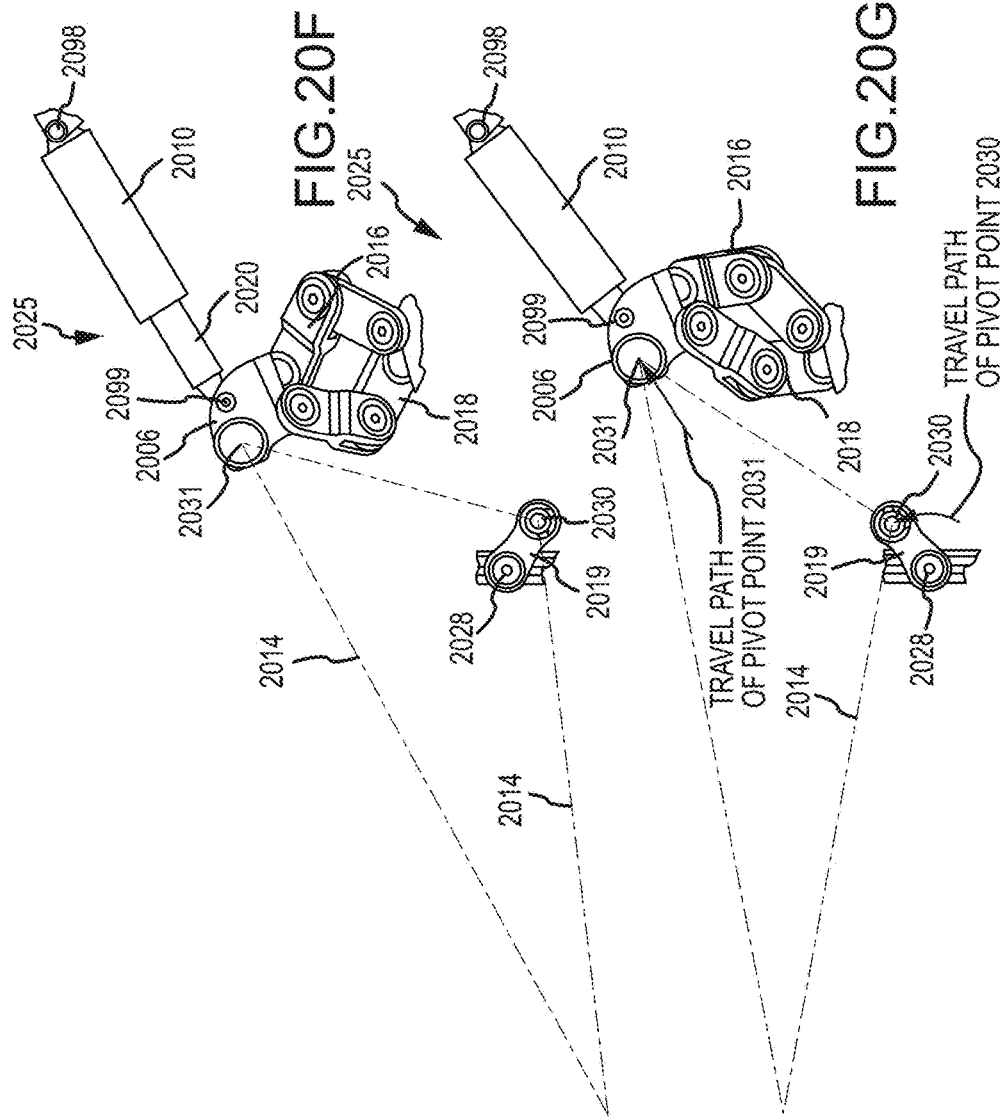

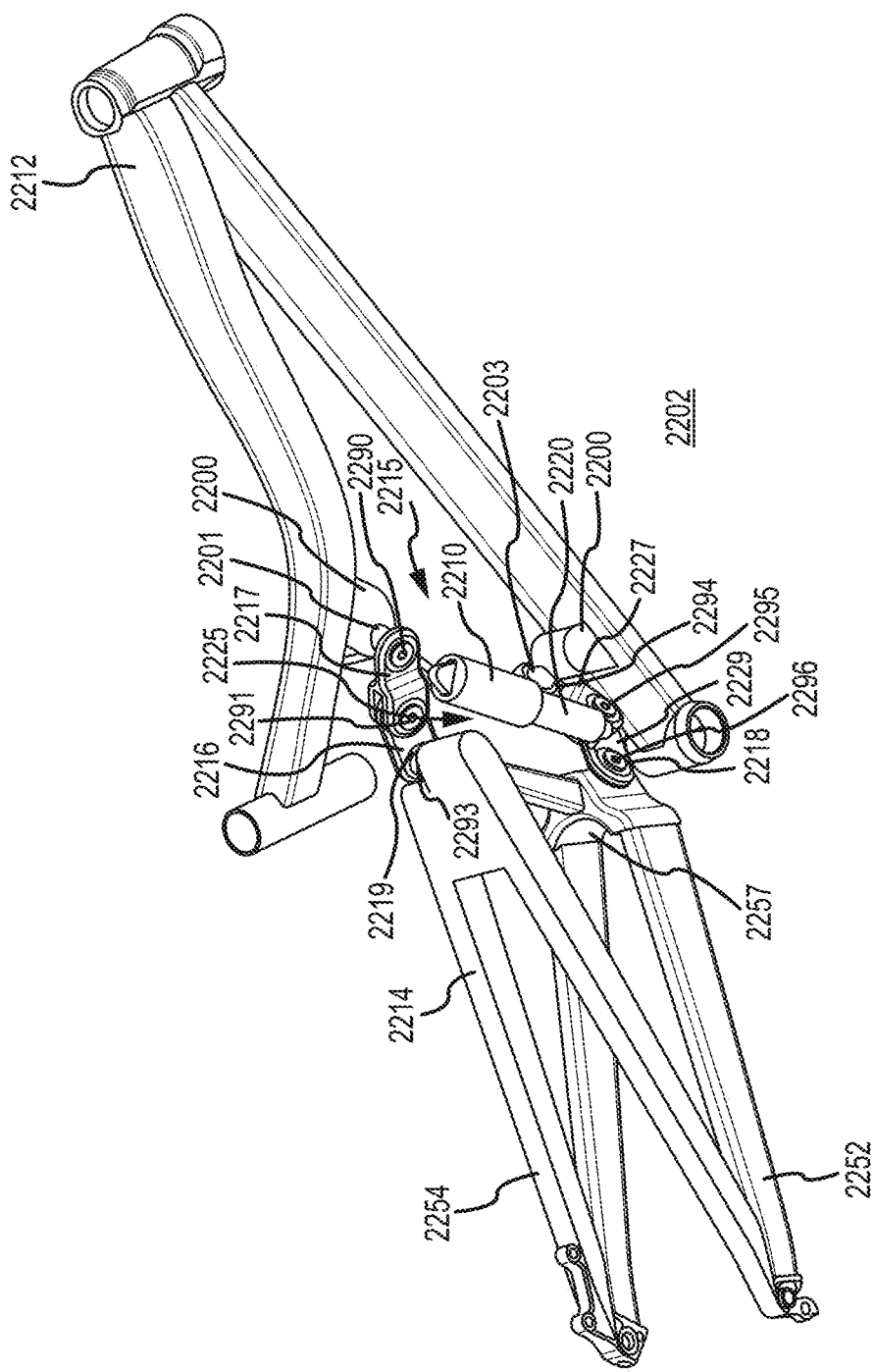

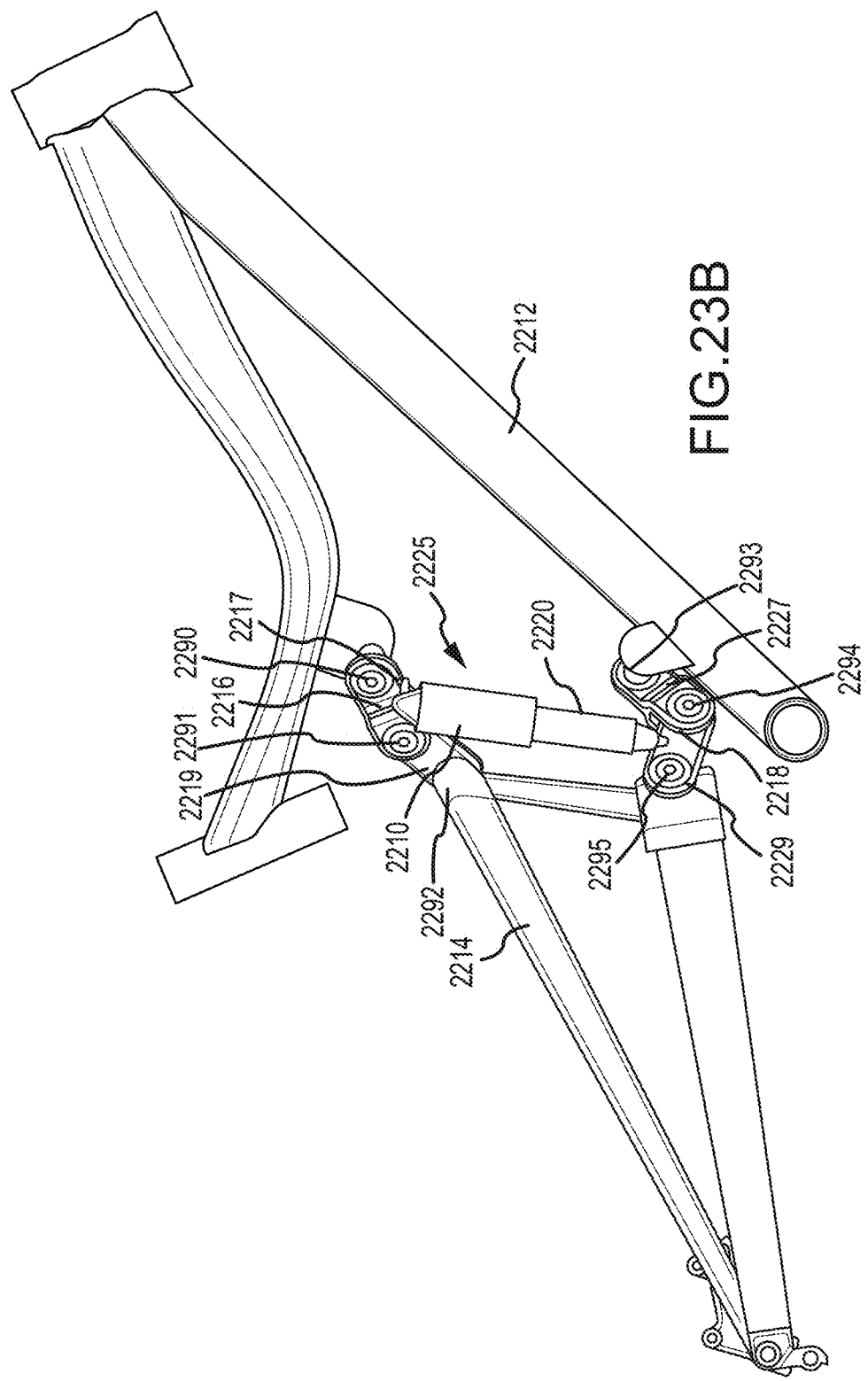

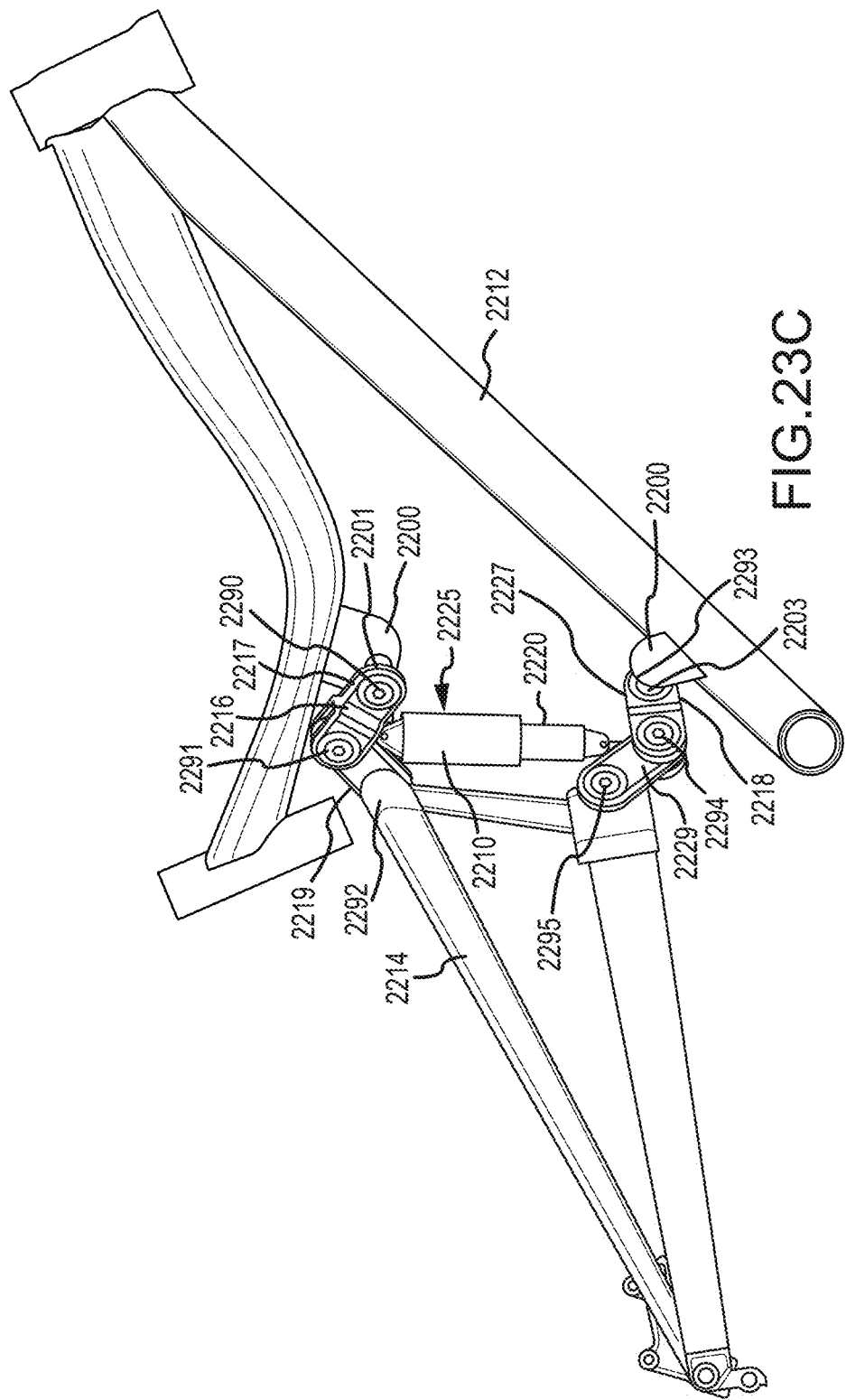

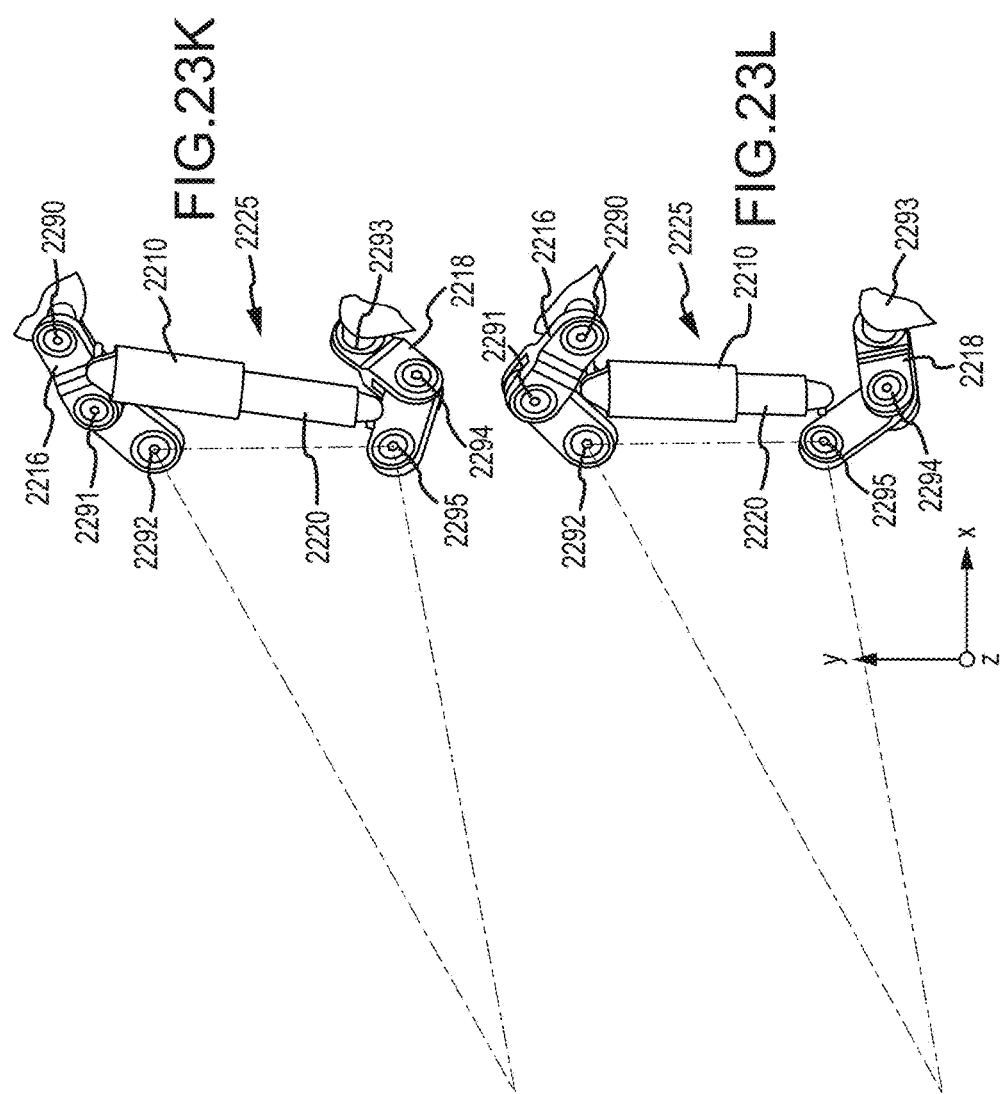

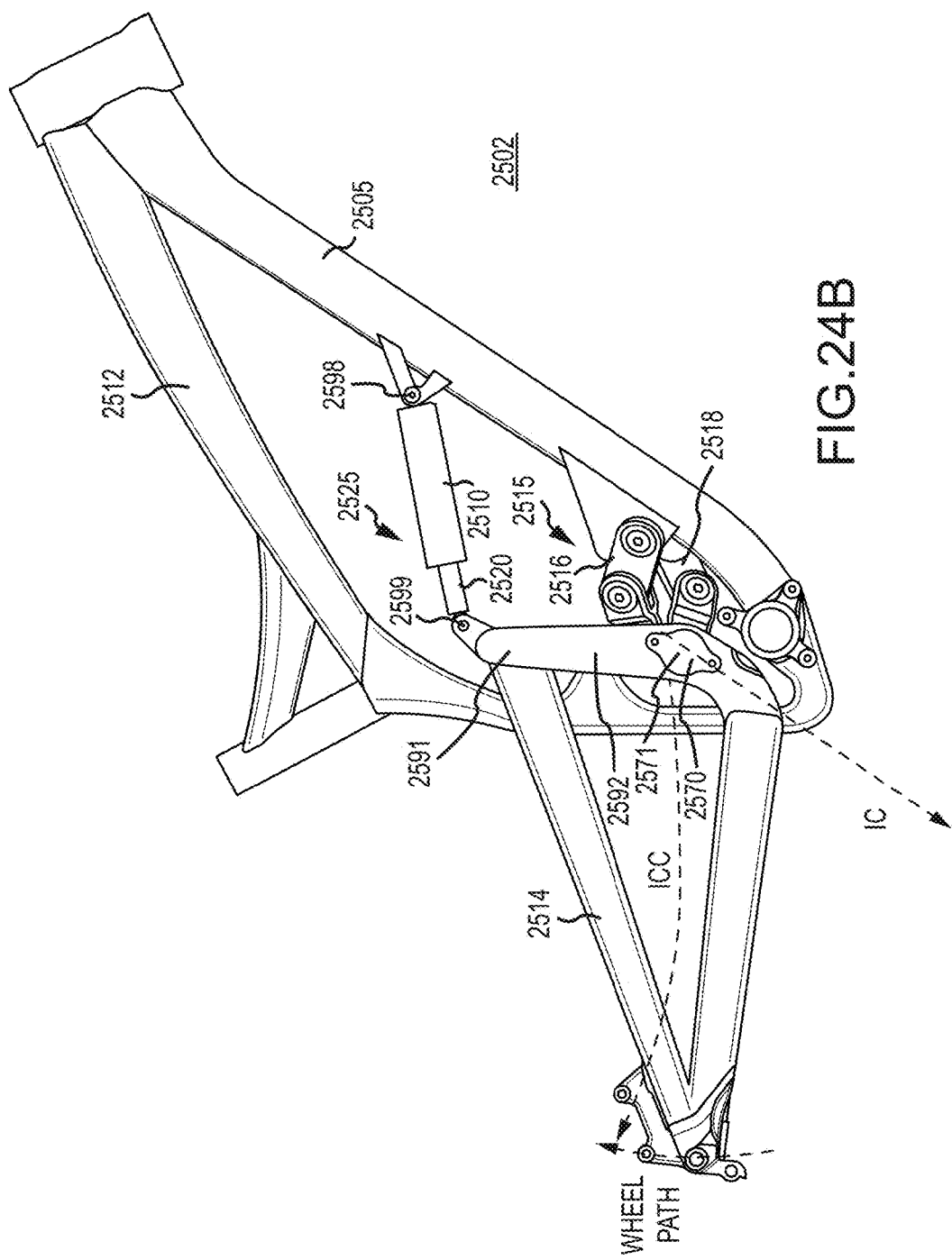

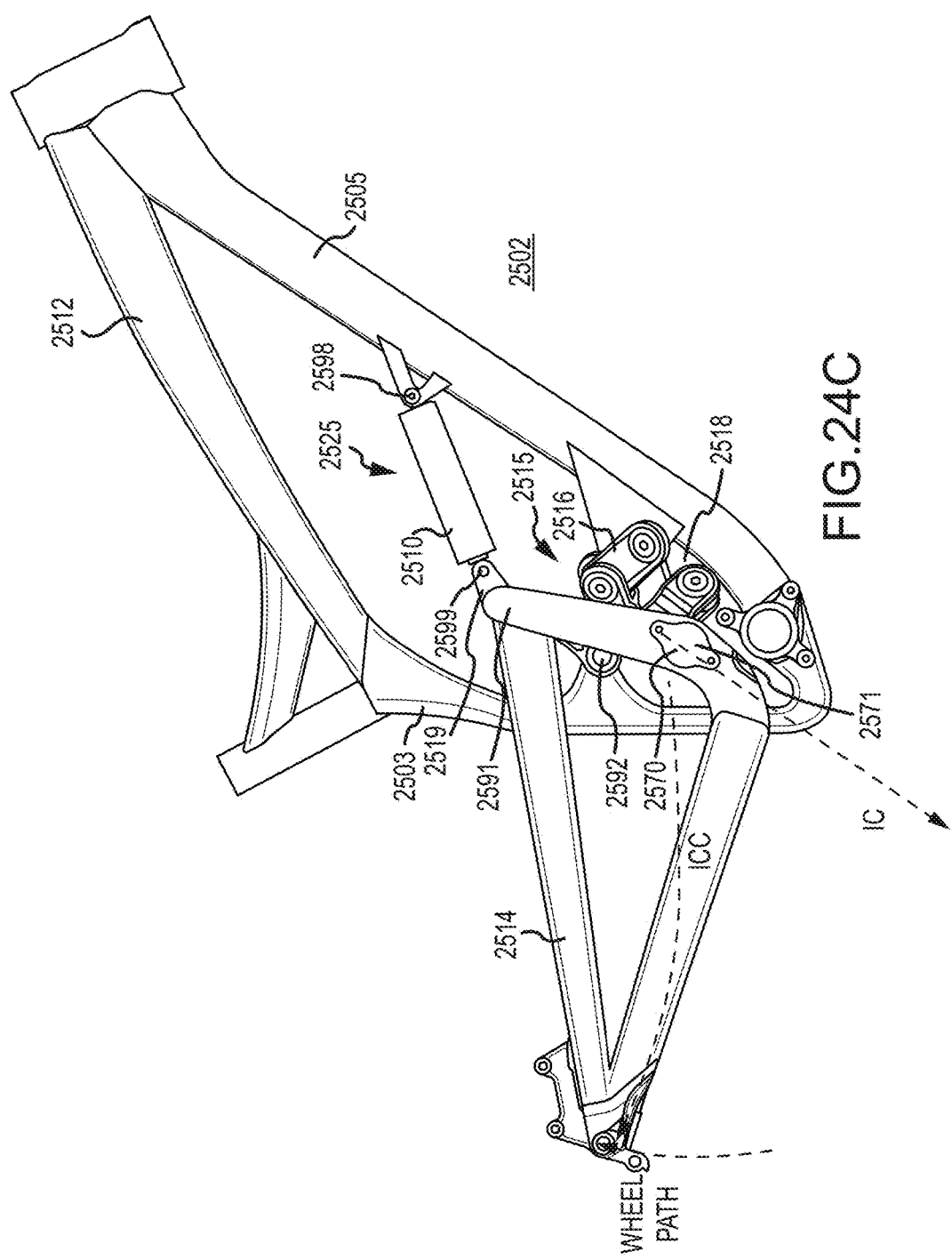

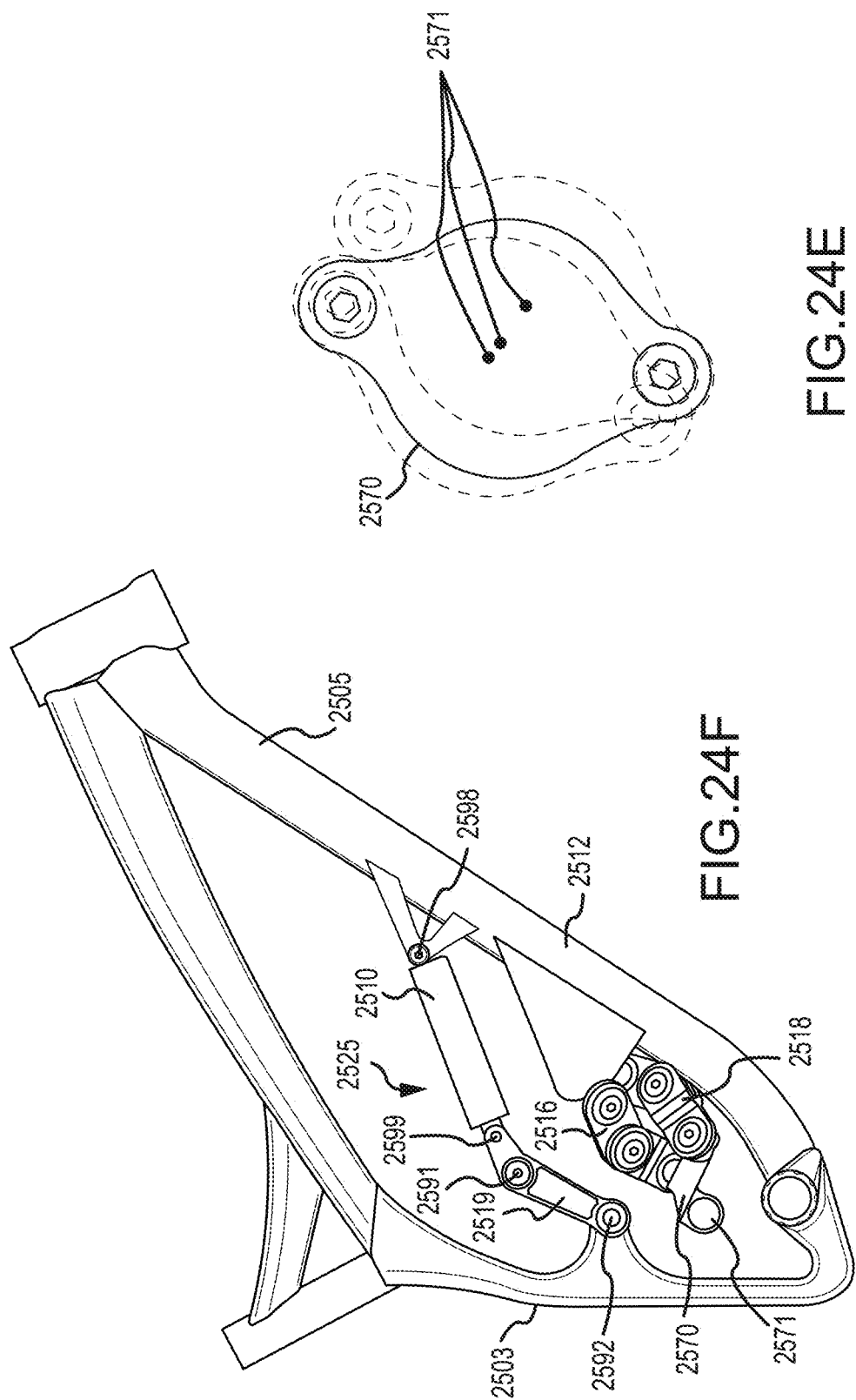

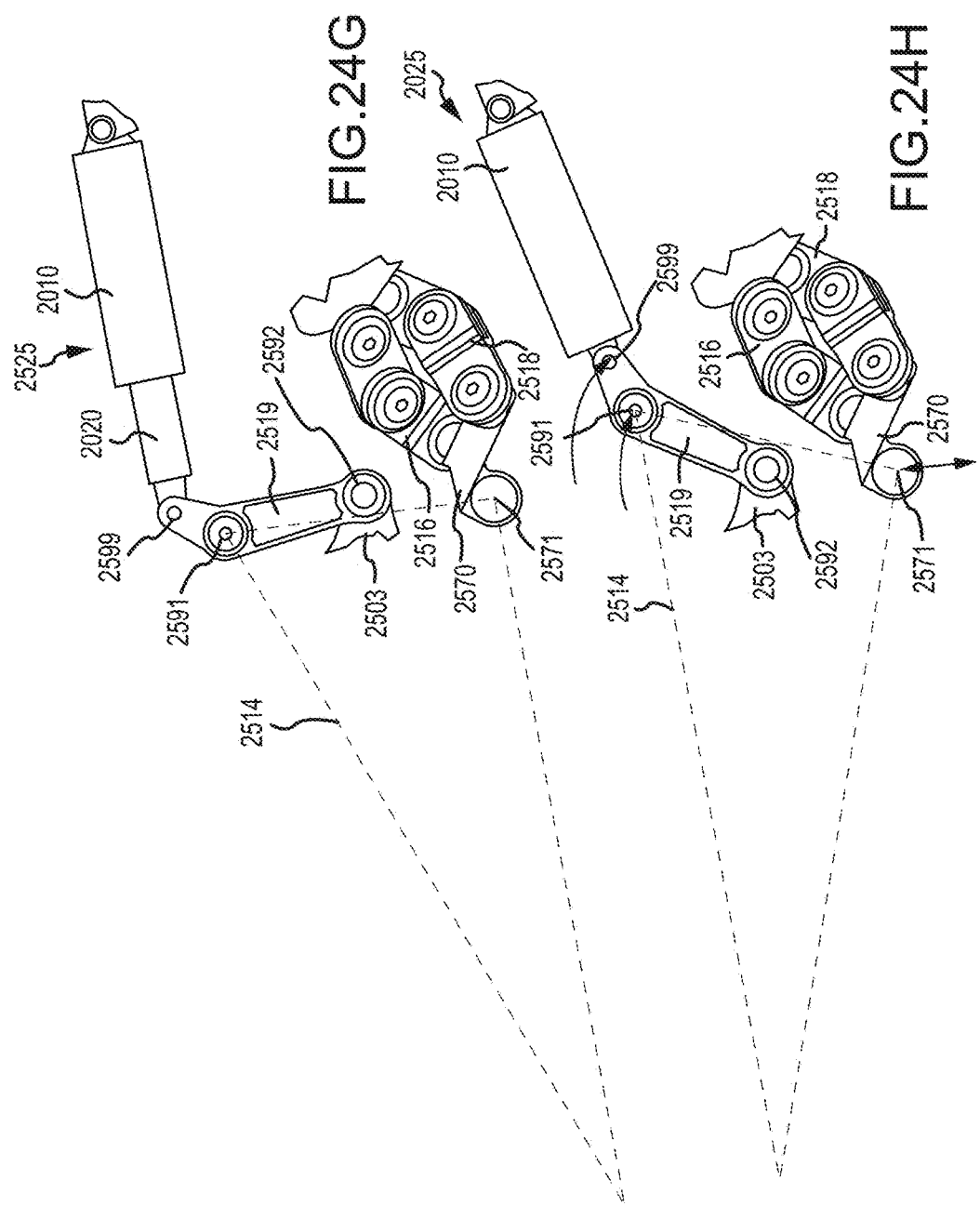

LINK SUSPENSION SYSTEM

CROSS REFERENCE TO RELATED APPLICATIONS

This application is a continuation application of U.S. patent application Ser. No. 14/807,636, filed Jul. 23, 2015, entitled "Link Suspension System", which is a continuation application of U.S. patent application Ser. No. 13/215,170, filed Aug. 22, 2011, entitled "Link Suspension System," which claims the benefit of priority pursuant to 35 U.S.C. § 119 (e) of U.S. Provisional Application No. 61/375,278 filed Aug. 20, 2010, entitled "Link Suspension System," which are each hereby incorporated herein by reference their entirety.

BACKGROUND

1. Technical Field

Examples disclosed herein relate generally to bicycles, and more particularly, to suspension systems for rear wheels of bicycles.

2. Background

Many bicycles, particularly mountain bicycles, include rear suspension systems. The rear suspension system allows the rear wheel to be displaced relative to the bicycle frame when impact forces are imparted on the rear wheel and, in turn, acts to absorb the impact forces. As such, suspension systems may improve rider comfort, as well as protect the rider and all or part of the bicycle from the roughness of the terrain when traveling or jumping the bicycle by keeping one or both wheels in contact with the ground and allowing the rider's mass to move over the ground in a flatter trajectory.

Many rear suspension systems available on the market allow the rear wheel of the bicycle to travel in a particular path that is dictated by the physical construction of the suspension system. Generally, the rear wheel path is fixed by the rear suspension design, with different rear wheel paths causing different reactions in the way that the bicycle handles forces impacting on the rear wheel. The rear suspension systems of different bicycles may have different shock-absorbing properties, so as to provide the dampening effect that is best suited to the terrain most often traversed by the bicycle. A mountain bicycle intended for traversing steep downhill grades may benefit from a shock assembly that causes the rear wheel to travel in a substantially vertical direction, while a trail bicycle intended for traversing small bumps and gradual downhill grades may benefit from a shock that travels in a curved travel path.

SUMMARY

One aspect of the present disclosure relates to a rear suspension system for a bicycle. The rear suspension system acts to absorb forces impacting on the bicycle by allowing a rear wheel of the bicycle to be displaced relative to the rest of the bicycle. The structural and geometrical configurations of some of the disclosed rear suspension systems provide a travel path in which the rear wheel moves along a substantially linear travel path and in a substantially vertical orientation relative to the ground. Other disclosed examples include rear suspension systems that provide a travel path that is curved, with different curves resulting from differences in the structural and geometrical configurations of the systems.

Generally, examples described herein may take the form of a bicycle including a frame having a longitudinal axis, a first member, and a first pivot link assembly including a first link configured to rotate around a first pivot point. The first pivot point may have a first axis of rotation that is non-orthogonal to the longitudinal axis of the first frame. The first frame may be coupled with the first member through the first pivot link assembly.

Another example of the bicycle may include a second pivot link assembly including a second link configured to rotate around a second pivot point. The second pivot point may have a second axis of rotation that is non-orthogonal to the longitudinal axis of the first frame. The first frame may be additionally coupled with the first member through the second pivot link assembly. In another example, the second axis of rotation may be oriented in a different direction than the first axis of rotation. In a further example, the first axis of rotation and the longitudinal axis may define a first angle therebetween that is between 0 and 90 degrees. Additionally, the second axis of rotation and the longitudinal axis may define a second angle therebetween that is between 0 and 90 degrees. In addition, the first angle and the second angle may be substantially equal.

In another example, the first link may be further configured to rotate around a third pivot point having a third axis of rotation that is substantially parallel to the first axis of rotation. In a further example, the first pivot link assembly may further include a third link configured to rotate around the third pivot point. In one example, the third link may be further configured to rotate around a fourth pivot point having a fourth axis of rotation that is substantially parallel to the first axis of rotation. The second link may be further configured to rotate around a fifth pivot point having a fifth axis of rotation that is substantially parallel to the second axis of rotation.

Another example may take the form of a bicycle comprising a frame, a front wheel rotatably connected with the frame, a rear suspension system, and a rear wheel rotatably connected with the rear suspension system. The rear wheel may be configured to rotate around a first axis of rotation. The rear suspension system may comprise a first member, a first pivot link assembly operably coupling the first member with the frame and extending in a first direction that is non-orthogonal to the first axis of rotation, and a second pivot link assembly operably coupling the first member with the frame and extending in a second direction different from the first direction that is non-orthogonal to the first axis of rotation. In one example, the first pivot link assembly may extend diagonally relative to the second pivot link assembly.

Another example may take the form of a bicycle comprising a frame having a longitudinal axis and including a head tube, a top tube connected with the head tube, a down tube connected with the head tube, and a bottom bracket connected with the down tube. The bicycle may further include a front wheel operably coupled with the head tube, and a rear suspension system including a swingarm and a first pivot link assembly pivotally connected to the swingarm and to the frame. The first pivot link assembly may include a first link configured to rotate around a first pivot point having a first axis of rotation that is non-orthogonal to the longitudinal axis of the frame.

Yet another example may take the form of a suspension system for a bicycle. The system may include a first pivot link assembly configured to couple a first member to a frame having a longitudinal axis and a second pivot link assembly configured to couple the first member to the frame. The first pivot link assembly may include a first link configured to rotate around a first pivot point. The first link may define a first angle relative to the frame. The second pivot link assembly may include a second link configured to rotate around a second pivot point. The second link may define a second angle relative to the frame. The first and second angles may be substantially equal.

A further example may take the form of a suspension system including a front frame having a longitudinal axis and a link suspension system operably coupled to the front frame. The link suspension system may include a first pivot link assembly including a first forward link and a first rear link configured to pivot relative to the first forward link, where an axis of rotation of the first rear link relative to the first forward link is non-orthogonal to the longitudinal axis of the front frame. The link suspension system may further include a second pivot link assembly including a second forward link and a second rear link configured to pivot relative to the second forward link, where an axis of rotation of the second rear link relative to the second forward link is non-orthogonal to the longitudinal axis of the front frame. One end of each of the pivot link assemblies of the link suspension system defines a fixed pivot point relative to the front frame and the other end of each of the pivot link assemblies of the link suspension system defines a pivot point relative to the front frame.

In other examples, the suspension system may further include a rear frame operably coupled to the front frame. In another example, a first forward end of the first pivot link assembly is pivotally coupled to the front frame and a first rear end of the first pivot link assembly is pivotally coupled to the rear frame, and a second forward end of the second pivot link assembly is pivotally coupled to the front frame and a second rear end of the second pivot link assembly is operably coupled to the rear frame. In another example, the first and second rear ends of the first and second pivot link assemblies are configured to travel along a substantially linear path.

In a further example, the first and second rear ends of the first and second pivot link assemblies are pivotally coupled to a mounting bracket that is coupled to the rear frame. Another example may include a shock link having a first end pivotally coupled to the front frame and a second end pivotally coupled to the rear frame. Further examples may include a shock having a first end pivotally coupled to the front frame and a second end pivotally coupled to the rear frame.

In another example, the shock link may be configured to rotate in a clockwise direction. Additionally, the shock link may be configured to rotate in a counterclockwise direction. In another example, the second end of the shock is further pivotally coupled to the second end of the shock link. Another example may include a shock having a first end pivotally coupled to the front frame and a second end pivotally coupled to the mounting bracket. In some examples, the shock is substantially parallel to the substantially linear path defined by the first and second pivot link assemblies. The shock link may be configured to rotate in a clockwise direction in some examples, and in a counterclockwise direction in other examples.

Yet another example may take the form of a bicycle including a frame having a longitudinal axis, a first pivot link assembly including a first link configured to rotate around a first pivot point, where the first pivot point has a first axis of rotation that is non-orthogonal to the longitudinal axis of the first frame. The pivot link assembly may further include a second pivot link assembly including a second link configured to rotate around a second pivot point, where the second pivot point has a second axis of rotation that is non-orthogonal to the longitudinal axis of the first frame, and a shock assembly having a first end coupled to the first pivot link and a second end coupled to the second pivot link.

Other examples of the bicycle may include a first member, where the first frame is coupled with the first member through the first pivot link assembly. In a further example, the shock assembly is configured to travel in three dimensions. In another example, the first end of the shock is configured to travel along a first plane that is parallel to a second plane defined by the first pivot link assembly. In some examples, the first pivot link assembly further includes a third link configured to rotate around the first link, and the second pivot link assembly further includes a fourth link configured to rotate around the third link.

In further examples, the third link is positioned behind the first link and the second link is positioned behind the fourth link. Additionally, in some examples, the first and second links are pivotally coupled to the front frame and the third and fourth links are pivotally coupled to a rear frame.

Another example may take the form of a bicycle including a frame having a longitudinal axis and a shock operably associated with the frame, the shock operably associated with the frame and having a first end configured to travel along a first plane and a second end configured to travel along a second plane that intersects the first plane.

In another example, the first end of the shock is coupled to a first link oriented at a first angle with respect to the frame and the second end of the shock is coupled to a second link oriented at a second angle with respect to the frame. Another example may further include a third link pivotally coupled to the first link, where an axis of rotation of the third link around the first link is non-orthogonal to the frame. A further example may include a fourth link pivotally coupled to the second link, where an axis of rotation of the fourth link around the second link is non-orthogonal to the frame. A further example may include a rear frame pivotally coupled to the third link and to the fourth link, where the rear frame is configured to travel, and the translation of the rear frame is substantially confined to a single plane.

Another example may take the form of a bicycle including a front frame, a rear frame operably associated with the front frame, and a suspension system operably coupled to the front frame and to the rear frame and including a shock assembly. The suspension system causes at least a portion of the rear frame to travel in a first direction and in a second direction opposite the first direction during a single compression of a shock assembly.

In a further example, the portion of the rear frame is configured to travel along a substantially linear path.

Another example may take the form of a bicycle including a front frame having a longitudinal axis, a rear frame operably associated with the front frame and to a wheel, and a suspension system operably coupled to the front frame and to the rear frame. The suspension system causes at least a portion of the rear frame to travel in a first direction and in a second direction opposite the first direction as the wheel travels in an upward direction relative to the front frame.

In other examples, the curvature of the wheel increases as the wheel travels in the upward direction. In another example, the suspension system includes a first pivot link assembly including a first link configured to rotate around a first pivot point. The first pivot point has a first axis of rotation that is non-orthogonal to the longitudinal axis of the frame. The suspension system further includes second pivot link assembly including a second link configured to rotate around a second pivot point, the second pivot point having a second axis of rotation that is non-orthogonal to the longitudinal axis of the frame.

Another example may take the form of a mounting assembly including a first member coupled to an supported object, a second member coupled to a supporting object, a first pivot link assembly coupled between the first member and the second member, and a second pivot link assembly coupled between the first member and the second member. The first pivot link assembly may include a first link pivotally coupled to a second link, and the second pivot link assembly comprising a third link pivotally coupled to a fourth link. The first and second pivot link assemblies allow for moving the supported object away from the supporting object along a substantially linear path.

The features, utilities, and advantages of the various disclosed examples will be apparent from the following more particular description of the examples as illustrated in the accompanying drawings and defined in the appended claims.

BRIEF DESCRIPTION OF THE FIGURES

FIG. 17A is a right side view of a front frame and rear suspension system according to a fourth example of the present invention.

FIG. 17D is a right side view of the front frame and rear suspension system depicted in FIG. 17A in an uncompressed stage shown in solid lines, and in a fully compressed stage shown in dashed lines.

FIG. 17E is a right side view of the front frame depicted in FIG. 17A in an uncompressed stage.

FIG. 17F is a right side view of the shock and pivot link assemblies of the rear suspension system depicted in FIG. 17A in an uncompressed stage, as well as an outline of the rear frame.

FIG. 17G is a right side view of the shock and pivot link assemblies of the rear suspension system depicted in FIG. 17A in a fully compressed stage, as well as an outline of the rear frame.

FIG. 17H is a top down view of the front frame and rear suspension system depicted in FIG. 17A in a fully compressed stage.

FIG. 17I is a cross-sectional view of the front frame and rear suspension system depicted in FIG. 17A, as taken along line 17I-17I of FIG. 17H.

FIG. 17J is a cross-sectional view of the front frame and rear suspension system depicted in FIG. 17A, as taken along line 17J-17J of FIG. 17H.

FIG. 18E is a right side view of the front frame depicted in FIG. 18A in a fully compressed stage.

FIG. 18F is a right side view of the shock and pivot link assemblies of the rear suspension system depicted in FIG. 18A in an uncompressed stage, as well as an outline of the rear frame.

FIG. 18G is a right side view of the shock and pivot link assemblies of the rear suspension system depicted in FIG. 18A in a fully compressed stage, as well as an outline of the rear frame.

FIG. 19A is a right side view of a front frame and rear suspension system according to a sixth example of the present invention.

FIG. 19C is a right side view of the front frame and rear suspension system depicted in FIG. 19A in a fully compressed stage.

FIG. 19D is a right side view of the front frame and rear suspension system depicted in FIG. 19A in an uncompressed stage shown in solid lines, and in a fully compressed stage shown in dashed lines.

FIG. 19E is a right side view of the front frame depicted in FIG. 19A in a fully compressed stage.

FIG. 19F is a right side view of the shock and pivot link assemblies of the rear suspension system depicted in FIG. 19A in an uncompressed stage, as well as an outline of the rear frame.

FIG. 19G is a right side view of the shock and pivot link assemblies of the rear suspension system depicted in FIG. 19A in a fully compressed stage, as well as an outline of the rear frame.

FIG. 20A is a right side view of a front frame and rear suspension system according to a seventh example of the present invention.

FIG. 20C is a right side view of the front frame and rear suspension system depicted in FIG. 20A in a fully compressed stage.

FIG. 20F is a right side view of the shock and pivot link assemblies of the rear suspension system depicted in FIG. 20A in an uncompressed stage, as well as an outline of the rear frame.

FIG. 20G is a right side view of the shock and pivot link assemblies of the rear suspension system depicted in FIG. 20A in a fully compressed stage as well as an outline of the rear frame.

FIG. 23A is a right-rear isometric view of a front frame and rear suspension system according to a tenth example of the present invention.

FIG. 23B is a right side view of the front frame and rear suspension system depicted in FIG. 23A.

FIG. 23C is a right side view of the front frame and rear suspension system depicted in FIG. 23A in a partially compressed stage.

FIG. 23K is a right side view of the shock and pivot link assemblies of the rear suspension system depicted in FIG. 23A in an uncompressed stage, as well as an outline of the rear frame.

FIG. 23L is a right side view of the shock and pivot link assemblies of the rear suspension system depicted in FIG. 23A in a partially compressed stage as well as an outline of the rear frame.

FIG. 24B is a right side view of the front frame and rear suspension system depicted in FIG. 24A in a partially compressed stage.

FIG. 24C is a right side view of the front frame and rear suspension system depicted in FIG. 24A in a fully compressed stage.

FIG. 24E illustrates a right side view of a portion of the mounting bracket in an uncompressed stage shown in solid lines, in a partially compressed stage shown in dashed lines, and in a fully compressed stage shown in dashed lines.

FIG. 24F is a right side view of the front frame depicted in FIG. 24A in a fully compressed stage.

FIG. 24G is a right side view of the shock and pivot link assemblies of the rear suspension system depicted in FIG. 24A in an uncompressed stage, as well as an outline of the rear frame.

FIG. 24H is a right side view of the shock and pivot link assemblies of the rear suspension system depicted in FIG. 24A in a fully compressed stage, as well as an outline of the rear frame.

DETAILED DESCRIPTION

Figure 1:
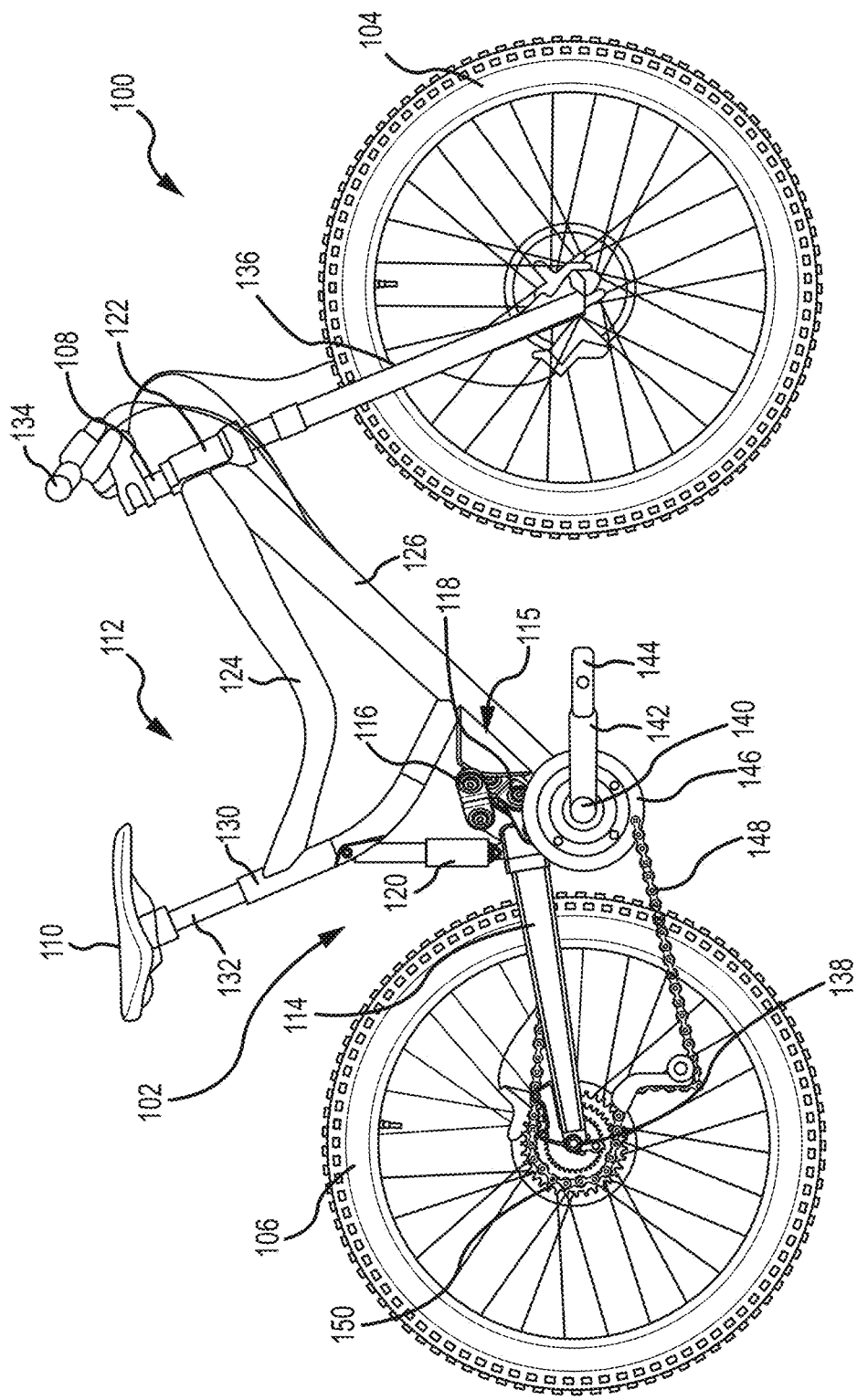
FIG. 1 is a right side view of a bicycle incorporating a rear suspension system according to one example.

Generally, examples described herein take the form of a rear suspension system for a bicycle. The rear suspension system acts to absorb forces impacting on the bicycle by allowing a rear wheel of the bicycle to be displaced relative to the rest of the bicycle. Such forces may be caused from riding over rough terrain (such as rocks, holes in the ground, and the like). Upon displacement of the rear wheel, the rear suspension system can allow the rear wheel to move from a general first position to a second position. The rear suspension system may then act to return the rear wheel to the general first position. The structural and geometrical configurations of the rear suspension system provide a travel path in which the rear wheel moves when acted upon by various forces. As discussed below, examples of the rear suspension system can include a first pivot link assembly and a second pivot link assembly configured to couple the front frame of the bicycle to the swingarm connected to the rear wheel. The link assemblies may each include at least one link that is configured to rotate around an axis of rotation that is non-orthogonal to the longitudinal axis of the frame.

As is known in the art, the leverage ratio of a rear suspension system also can also affect the "feel" of the rear suspension system as sensed by the rider when the rear wheel is displaced. The leverage ratio can be defined as the total rear wheel travel divided by the total shock stroke length, and changes instantaneously throughout the travel path of the rear wheel. The instantaneous leverage ratios at different points along the travel path can be plotted to derive a leverage ratio curve. Generally, a suspension system having higher instantaneous leverage ratios results in an increased mechanical advantage at the rear wheel, allowing for a "softer" suspension, while a system having lower instantaneous leverage ratios results in a decreased mechanical advantage at the rear wheel, allowing for a "firmer" suspension. Different types of leverage ratio curves may be better suited for use with different types of shock assemblies (e.g., an air or liquid shock vs. a spring shock), and with different types of bicycles (e.g., dirt bikes, mountain bikes, road bikes, downhill hikes, cross-country bikes, and so on), to provide a more comfortable riding experience.

Examples of the rear suspension system may be capable of traveling along a substantially linear and vertical path. The rear suspension system may have a 1:1 leverage ratio and maximize the efficiency of the rear suspension system. Although the rear suspension system is described below with reference to a typical bicycle depicted in the figures, it should be understood the rear suspension system can be used with bicycles having different frame styles than that which is depicted and described herein. Further, although the systems and methods are described below mainly with reference to bicycles, the present invention can be applied to other vehicles, such as scooters and motorcycles.

FIG. 1 shows a bicycle 100 including a rear suspension system 102 according to a first example. The bicycle 100 is rollingly supported by a front wheel 104 and a rear wheel 106. A rider can steer the bicycle 100 by turning the front wheel 104 toward a desired direction of travel with a steering system 108. The bicycle 100 also includes a seat 110 connected with a front frame 112 which can be used to support the rider. As discussed in more detail below, the rear suspension system includes a swingarm 114 coupled with the front frame 112 through a link suspension system 115 including a first link assembly 116, a second link assembly 118, and a shock assembly 120, which may be operably connected between the front frame 112 and the swingarm 114. The swingarm may be fabricated from various members connected together, or as a single piece or member. The swing arm may be one-sided or two-sided.

Figure 2:
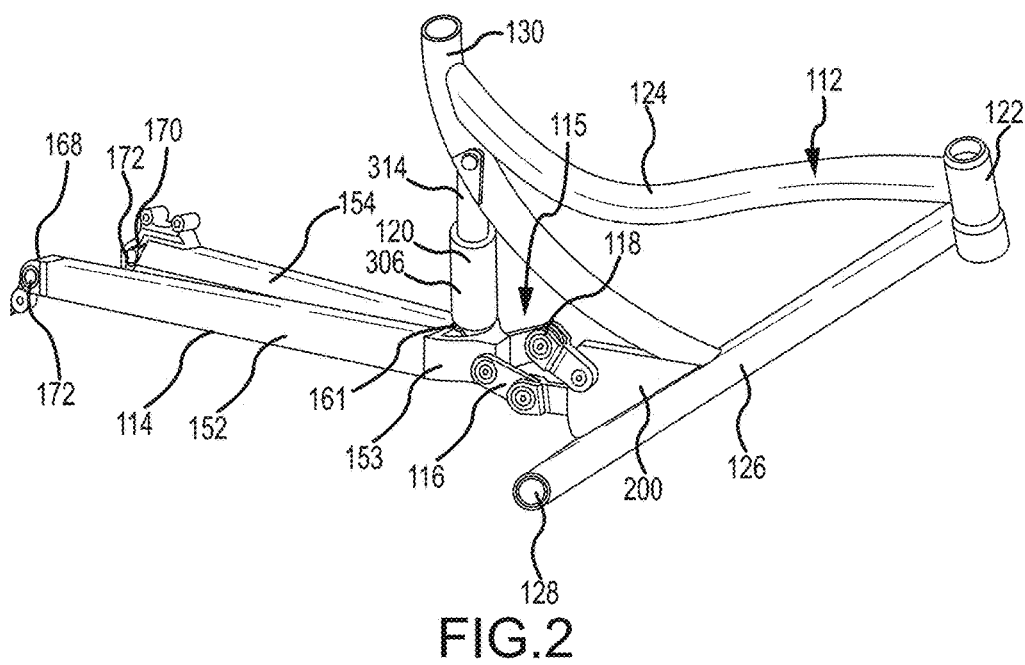
FIG. 2 is a right-front isometric view of a front frame and rear suspension system of the bicycle depicted in FIG. 1.
Figure 3:
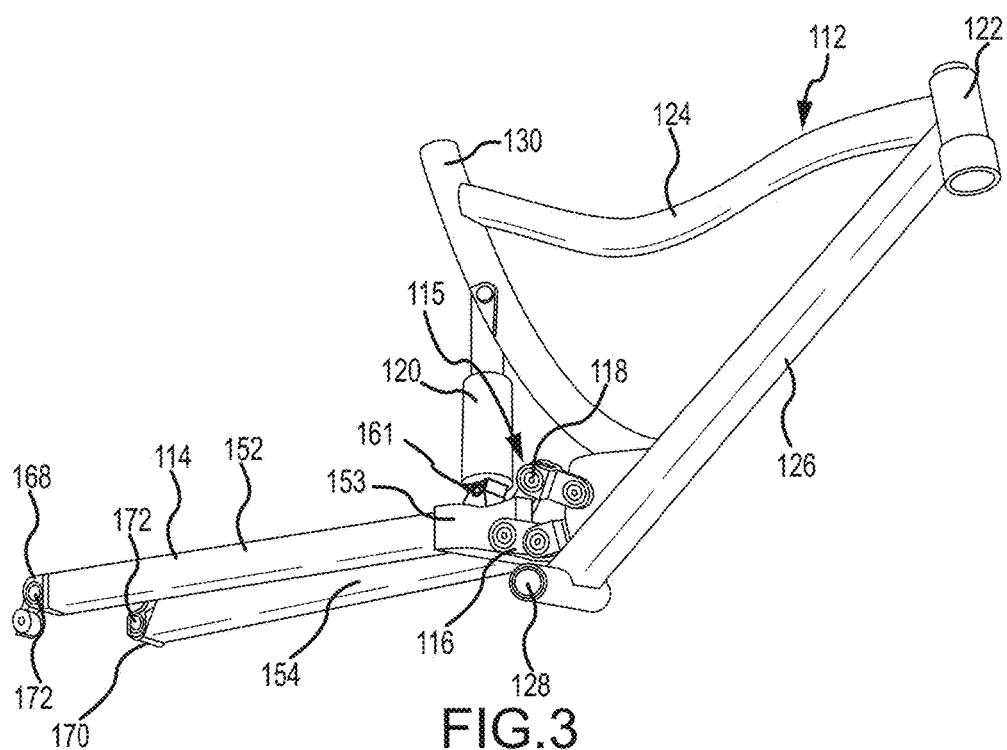
FIG. 3 is a right-bottom isometric view of the front frame and rear suspension system of the bicycle depicted in FIG. 1.

As shown in FIGS. 1-3, the front frame 112 can include a head tube 122, a top tube 124, a down tube 126, a bottom bracket 128, and a seat tube 130. The top tube 124 extends rearwardly from the head tube 122 to connect with an upper portion of the seat tube 130, and the down tube 126 extends rearwardly and downwardly from the head tube 122 to connect with the bottom bracket 128. The front frame 112 described herein utilizes a continuous seat tube design where the seat tube 130 extends from the top tube 124 all the way to the down tube 126. It is to be appreciated that in other frame configurations, the seat tube may include an interrupted design in which the seat tube does not fully extend from the top tube to connect with the down tube. Referring to FIG. 1, the seat or saddle 110, which is used to support the rider, is connected with a seat post 132 that may be inserted into the seat tube 130. In some configurations, the seat post can be adjustably or releasably received within the seat tube 130, for example, so the height of the seat relative to the front frame 112 can be adjusted.

As illustrated in FIG. 1, the steering system 108 includes a handle bar 134 connected with an upper portion of a front fork member 136. Both the handle bar 134 and the front fork member 136 are rotatably connected with the head tube 122. The front wheel 104 is rotatably connected with a lower portion of the front fork member 136, as is known in the art. Turning the handle bar 134 in a particular direction causes the front wheel 104 to turn in the same direction. As such, a user can steer the bicycle 100 by turning the handle bar 134 in a desired direction of travel.

As described in more detail below, the rear wheel 106 may be rotatably connected with the swingarm 114 through a rear axle 138. It is to be appreciated that the rear axle 138 may be connected to the swingarm 114 in many ways, such as by use of drop-out structures or the like, as are known.

As shown in FIGS. 1-3, the bottom bracket 128 is connected with a lower end portion of the down tube 126. The bottom bracket 128 rotatably supports a crank shaft 140 having crank arms 142 extending radially therefrom in opposite directions. Foot pedals 144 are rotatably connected with the crank arms. A drive sprocket 146, which is connected with the crank shaft 140, is typically connected through a chain 148 with a rear sprocket assembly 150 coupled with the rear wheel 106. When the rider applies forces to the pedals 144, the forces may be translated through the drive sprocket 146 and chain 148 to the rear sprocket assembly 150, causing the rear wheel 106 to rotate. Rotation of the rear wheel 106 may translate into forward motion of the bicycle 100.

As shown in FIGS. 2-5 and 8, the swingarm 114 includes right and left arms 152, 154, typically referred to as chain stays. Generally, the right and left arms 152, 154 are connected together by a central attachment member 153 that may also be attached to the first link assembly 116 and the second link assembly 118. Because the right and left arms 152, 154 are substantially mirror images of each other, descriptions with reference to the right arm 152, are applicable to the left arm 154 unless otherwise noted. As shown in FIGS. 2 and 3, the rear end portions of the right and left arms 152, 154 are each connected to a respective rear joint member 168, 170. Right and left rear joint members 168, 170 include rear axle apertures 172 adapted to receive and rotatably support the rear axle 138 of the rear wheel 106. As is known, some examples may further include dropouts to allow for detaching the axle 138 of the wheel 106 from the swingarm 114. It is to be appreciated that the swingarm 114 can be constructed from various types of material, such as aluminum, carbon, or titanium. The members used to construct the swingarm may also define a hollow tubular structure, or may have a solid construction, or other suitable construction. The swing arm may be constructed to facilitate the use of disc brakes, and a derailleur structure.

The forward end portions of the right and left arms 152, 154 are connected with the central attachment member 153, which may be integrally formed with the arms or a separate part attachable to the arms. As will be further discussed below, the central attachment member 153 may define right and left link attachment portions 167, 169 to which first and second pivot link assemblies 116, 118 are pivotally attached. In particular, the first and second link assemblies 116, 118 may be rotatably mounted to the link attachment portions 167, 169, thereby connecting the swingarm 114 with the down tube 126 of the front frame 112. The central attachment member 153 may also include an axle 161 adapted to connect to the bottom end of the shock assembly 120 to couple the shock assembly 120 to the central attachment member 153, described in more detail below. The link suspension system 115 may also generally attached to the central member 153.

The top end of the shock 120 may be connected to the seat tube 130 via an axle 300 mounted on the top end of the piston shaft 314 and corresponding receiving apertures 302 defined by the seat tube 130. As discussed above, the bottom end of the shock 120 may be connected to the central attachment member 153. In one example, the shock 120 may be substantially parallel to the y-axis when mounted to the seat tube 130 and to the central attachment member 153, so as to be positioned in a substantially vertical orientation. However, in other examples, the shock 120 may be positioned at an angle relative to the y-axis. For example, the shock 120 may be positioned so as to define an angle between 0 and 90 degrees with respect to the y-axis. As will be further discussed below, in one example, the position of the shock 120 relative to the front frame 112 may partially define the path traversed by the swing arm 114 and the rear wheel 106 when the shock 120 is compressed. However, in other examples, the path traversed by the swing arm 114 may be substantially wholly defined by the first and second link assemblies 116, 118, which may serve to constrain the motion of the swing arm 114 to a substantially linear path.

Figure 7A:
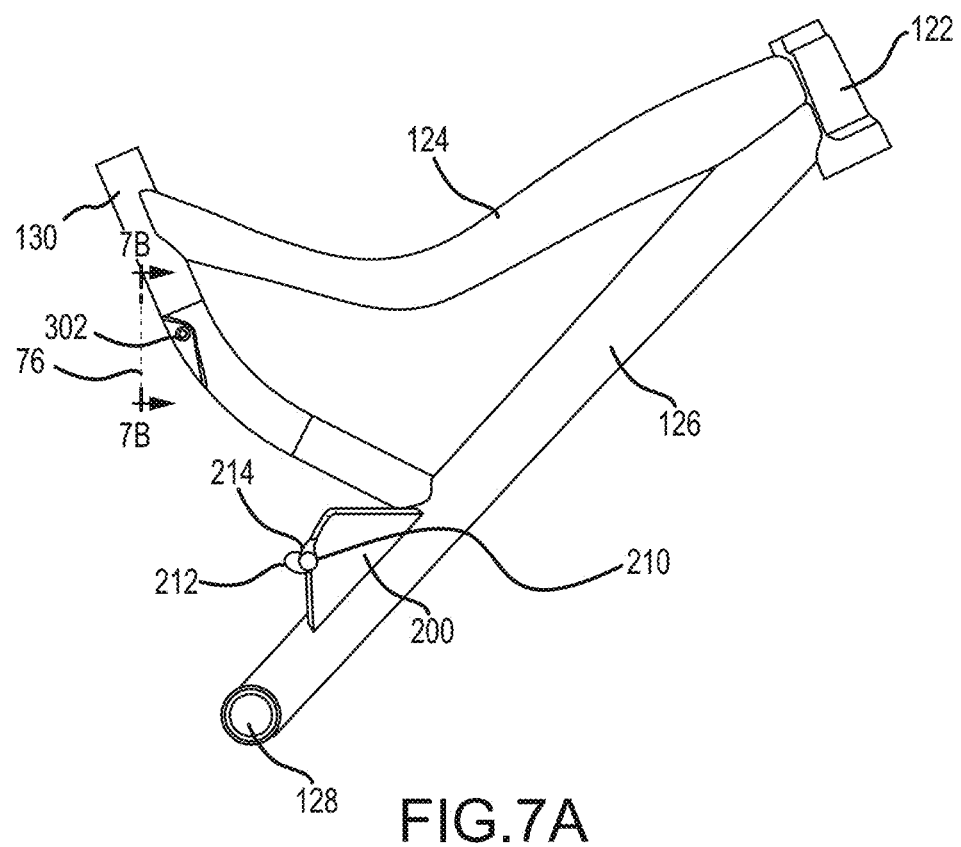
FIG. 7A is a right side view of the front frame of the bicycle depicted in FIG. 1.
Figure 7B:
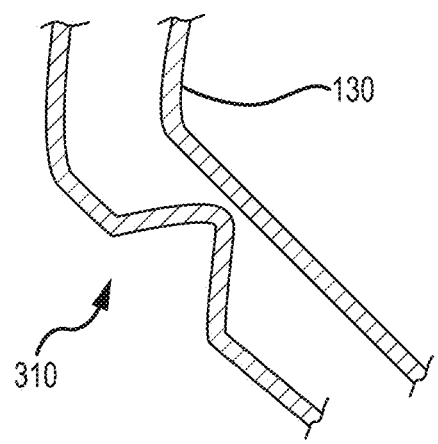
FIG. 7B is a partial cross-sectional view of the seat tube, as taken along line 7B-7B of FIG. 7A.

The shock assembly 120 may include a piston shaft 314 and a cylinder body 306. Generally, compression of the shock assembly 120 causes the cylinder body 306 to be pushed in an upward direction over the shaft 314, for example, as the rear wheel 106 is displaced relative to the front frame 112. Fluid contained within the cylinder body 306 acts to dampen the movement of the piston shaft 314 within the cylinder body. As such, the shock 120 dampens the tensile and/or compressive forces exerted on the piston shaft 314. The shock assembly 120 may be placed in various stages of compression relative to the amount of upward force applied to the bottom end of the shock assembly 120. For example, a larger upward force applied to the bottom end of the shock assembly 120 may cause the cylinder body 306 to traverse a longer length of the piston shaft 314 than a smaller upward force. As shown in FIGS. 7A-7B, the seat tube 130 may define a recessed portion 310 that is configured to receive the cylinder body 306 so that the upper portion of the cylinder body 306 is partially retracted into the recessed portion 310 when the shock assembly 120 is in a fully compressed stage. It is to be appreciated that shock assemblies are known in the art and that various types of shock assemblies and orientation can be utilized with the present disclosure. Some examples of shock assemblies include oil shocks, air shocks, spring return shocks, gas charged shocks, and so on.

The first and second pivot link assemblies 116, 118 will now be described in more detail. As shown in FIGS. 1-6, the first pivot link assembly 116 may include a rear link 117 that is pivotally connected to a forward link 119. The front end of the forward link 119 may be pivotally connected to the front frame 112 and the rear end of the forward link 119 may be pivotally connected with the front end of the rear link 117. The rear end of the rear link 117 may be pivotally connected to the right link attachment portion 167 of the swingarm 114. Accordingly, the first pivot link assembly 116 may define three pivot points 182, 185, and 187. The second pivot link assembly 118 may be similar in configuration to the first pivot link assembly 116. For example, the second pivot link assembly 118 may also include a rear link 127 that is pivotally connected to a forward link 129. The front end of the forward link 129 may be pivotally connected with the front frame 112 and the rear end of the forward link 119 may be pivotally connected to the front end of the rear link 117. The rear end of the rear link 117 may be pivotally connected to the left link attachment portion 169 of the swingarm 114. The second pivot link assembly 118 may define three pivot points 194, 198, and 206.

Figure 5:
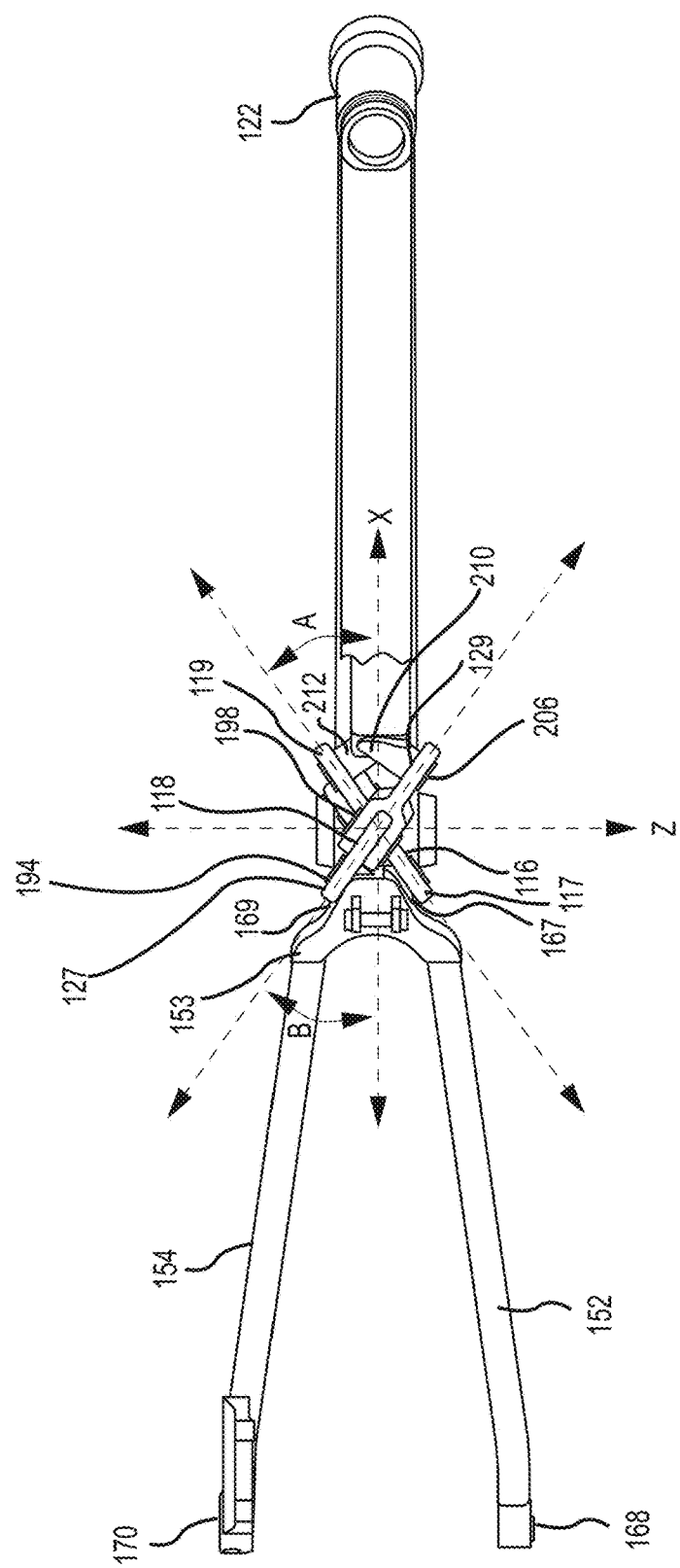
FIG. 5 is a top view of the front frame and rear suspension system of the bicycle depicted in FIG. 1 with the seat tube and top bracket partially removed.
Figure 6:
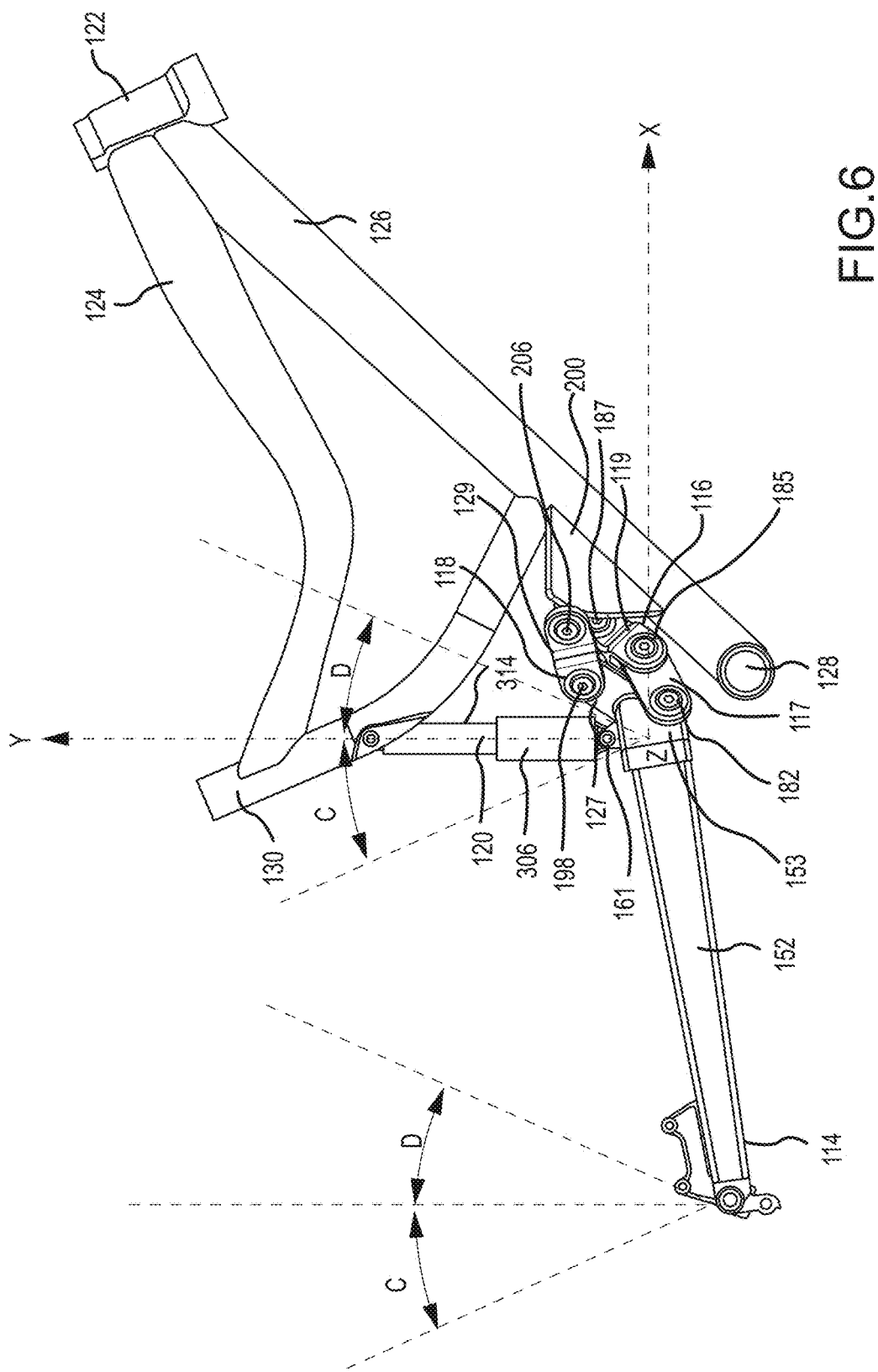
FIG. 6 is a right side view of a front frame and rear suspension system of the bicycle depicted in FIG. 1.

As shown in FIGS. 5, 6 and 7 the down tube 126 may include a triangular-shaped mounting portion 200 defining right and left mounting arms 210, 212 to which the first pivot link assembly 116 and the second pivot link assembly 118 are pivotally attached. The right and left mounting arms 210, 212 may each include an angled mounting surface 214. As best shown in FIGS. 5 and 7, each mounting surface 214 may define an angle A, B that is between 0 and 90 degrees with respect to the longitudinal axis of the frame, i.e., the x-axis. In other examples, mounting portion 200 may have a different configuration, for example, the mounting portion 200 may have a different polygonal configuration, or may have a rounded shape. Additionally, in other examples, each mounting surface 214 may define an angle between 90 to 180 degrees with respect to the longitudinal axis of the frame and to the x-axis, or between 180 to 270 or 270 to 360 degrees with respect to the longitudinal axis of the frame and to the x-axis.

Figure 4:
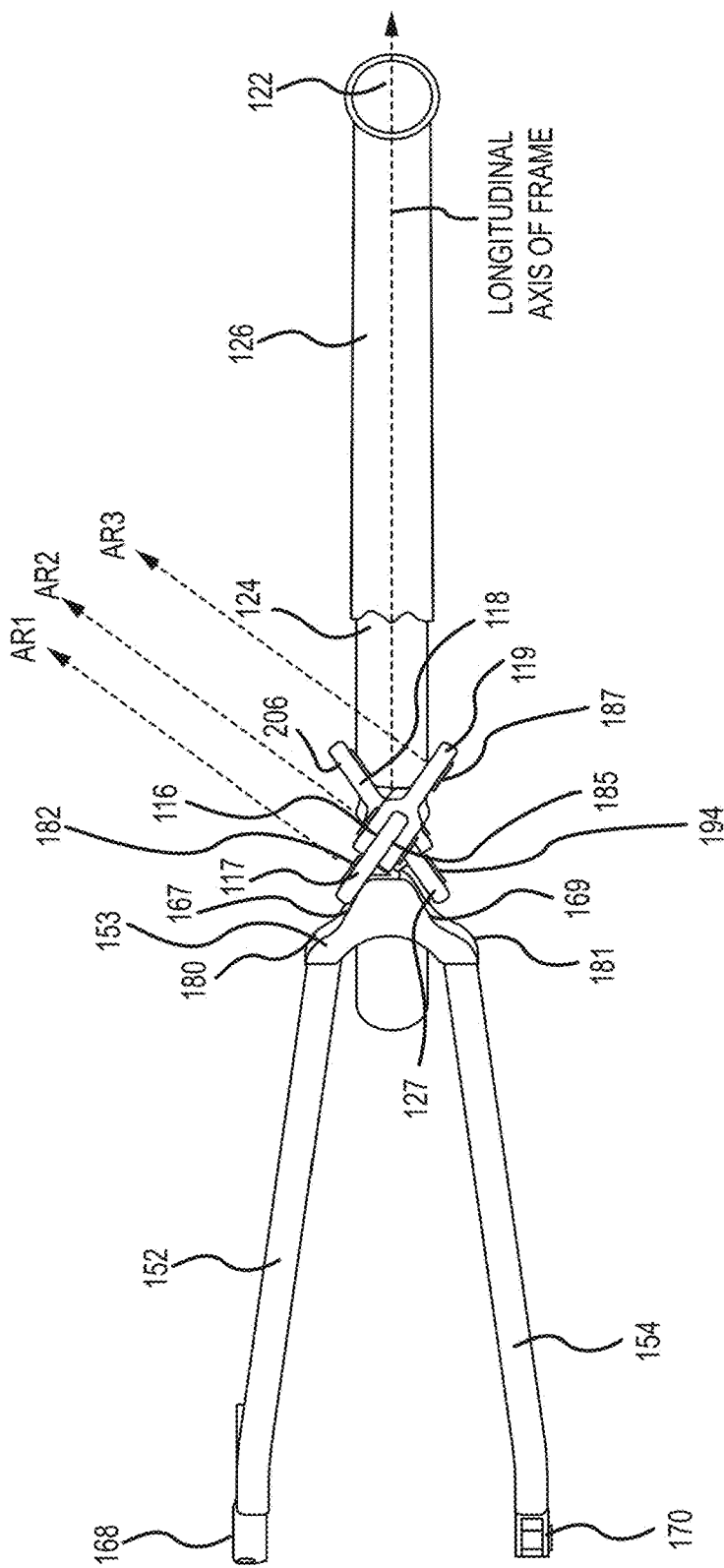
FIG. 4 is a bottom view of the front frame and rear suspension system of the bicycle depicted in FIG. 1 with the bottom bracket partially removed.

As best shown in FIGS. 4-8, the first and second pivot link assemblies 116, 118 may be positioned in a crossed, or x-shaped configuration. The x-shaped configuration of the link assemblies 116, 118 may serve to reduce the amount of space required for operation of the first and second pivot link assemblies 116, 118 and maintain the streamlined profile of the bicycle. For example, as shown in FIG. 5, the first pivot link assembly 116 may extend transversely from the right link attachment portion 167 of the central attachment member 153 to the left mounting arm 210 of the mounting portion 200 to define an angle A, that is between 0 and 90 degrees with respect to the longitudinal axis of the frame and to the x-axis. In other examples, the first pivot link assembly 116 may extend between 90 to 180 degrees with respect to the longitudinal axis of the frame and to the x-axis, or between 180 to 270 or 270 to 360 degrees with respect to the longitudinal axis of the frame and to the x-axis, so long as the pivot link assemblies 116, 118 are not parallel in orientation. Stated another way, the first pivot link assembly 116 may extend in a first direction that is non-orthogonal to the z-axis (see FIG. 5) and the axis of rotation of the rear wheel. Furthermore, as shown in FIG. 4, the axes of rotation AR1, AR2, AR3 of the forward and rear links 117, 119 around the pivot points 182, 185, 187 may be orthogonal to the orientation of the links, and may further be non-orthogonal to the longitudinal axis of the frame 112. More particularly, the axes of rotation AR1, AR2, AR3 of the links 117, 119 around the pivot points 182, 185, 187 may form an angle that is between 0 and 90 degrees with respect to the longitudinal axis of the frame 112 (the x-direction). In other examples, the axes of rotation, may form an angle between 90 to 180 degrees with respect to the longitudinal axis of the frame and to the x-axis, or between 180 to 270 or 270 to 360 degrees with respect to the longitudinal axis of the frame and to the x-axis.

Similarly, the second pivot link assembly 118 may extend over or under the first pivot link assembly 116 from the left link attachment portion 169 of the central attachment member 153 to the right mounting arm 212 of the mounting portion 200 to define an angle B with respect to the longitudinal axis of the frame. Accordingly, the direction of extension of the second pivot link assembly 118 may be non-orthogonal to the z-axis and the axis of rotation of the rear wheel. Further, as shown in FIG. 4, the axes of rotation AR4, AR5, AR6 of the forward and rear links 127, 129 around the pivot points 194, 198, 206 may be orthogonal to the orientation of the links 127, 129 and non-orthogonal to the longitudinal axis of the frame 112 (the x-direction). As shown in FIG. 5, the angle B defined between the second pivot link assembly 118 and the x-axis may be equal to the angle A defined between the first pivot link assembly 116 and the x-axis, thereby equalizing the distribution of forces along the first and second pivot link assemblies 118.

It is to be appreciated that the relative positions of the first and second pivot link assemblies 116, 118 with respect to one another is not critical. For example, in one example, the second pivot link assembly 118 may extend over and across the second pivot link assembly 116, generally forming an X-shape when viewed from above, while in other examples, the positions of the first and second pivot link assemblies 116, 118 may be reversed so that the first pivot link assembly 116 extends over the second pivot link assembly 118. The positioning of the first and second pivot link assemblies 116, 118 along the swing arm 114 and the front frame 112 is also not critical. For example, in other examples, the first and second pivot link assemblies 116, 118 may be mounted anywhere along the length of the swingarm 114 and/or the front frame 112. Also, the pivot link assemblies may be mounted so that they do not cross over one another, for example, too form a V-shape when viewed from above.

Figure 9:
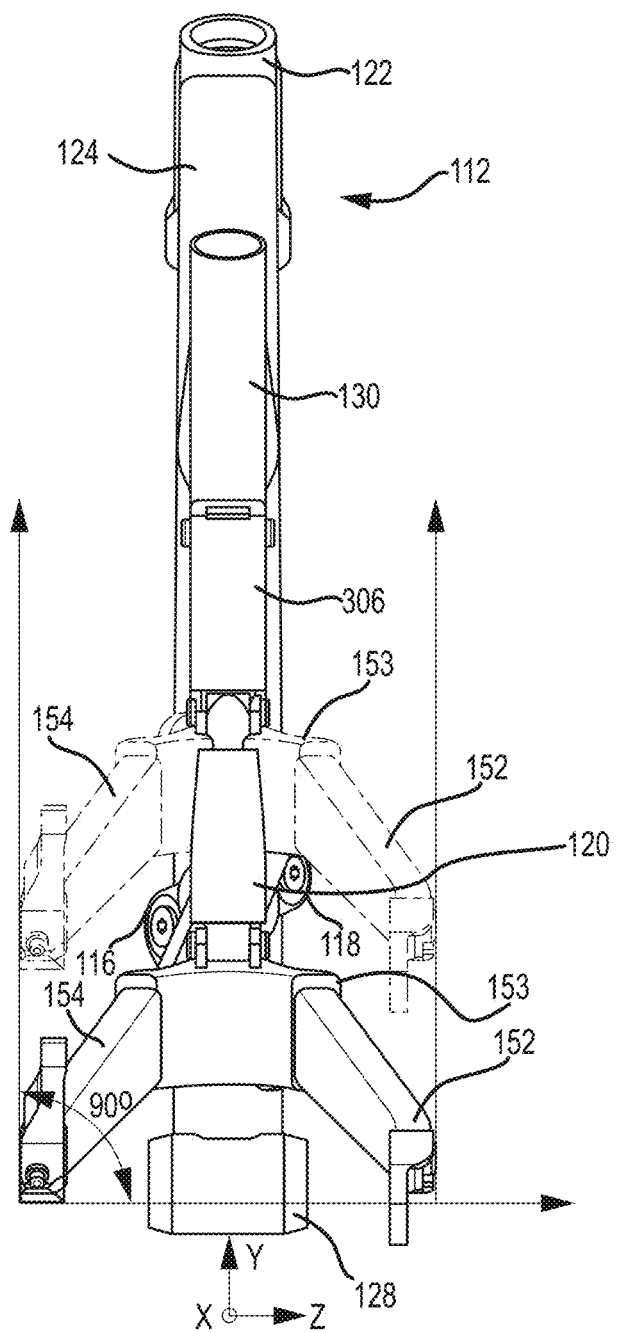
FIG. 9 is a rear view of the front frame and rear suspension system of the bicycle depicted in FIG. 1 in an uncompressed stage shown in solid lines, and in a fully compressed stage shown in dashed lines.

The transverse orientation of the link assemblies 116, 118 serves to restrict horizontal movement of the swingarm 114 along the z-axis, thereby controlling, inhibiting, or preventing side-to-side wobbling of the swingarm 114 and the connected rear wheel 106. Each of the link assemblies 116, 118 serve as yokes to counterbalance the load caused by side-to-side deflection of the swingarm 114. More particularly, the first link assembly 116 may provide an opposing force to counterbalance movement of the swingarm 114 to the left, while the second link assembly 118 may provide an opposing force to counterbalance movement of the swingarm 114 to the right. Accordingly, as shown in FIG. 9, the swingarm 114 is prevented from moving back and forth along the z-axis, and instead travels along a travel path located along the X-Y-plane.

The transverse orientation of the link assemblies 116, 118 further confines any motion of the swingarm 114 and the connected rear wheel 106 to a substantially linear path having limited, if any, curvature. Referring to FIG. 6, the path traversed by the swingarm 114 may be determined by the angle defined between the shock 120 and the y-axis. Therefore, if the shock 120 is oriented so that it is parallel to the y-axis, then the travel path of the swingarm 114 will be confined to a linear path that is substantially parallel to the y-axis. In this configuration, the rear wheel 106 can travel in a substantially vertical orientation, allowing for a 1:1 leverage ratio and improving the efficiency of the shock 120 in absorbing forces exerted on the rear wheel 105. Furthermore, the Instant Center of Curvature ("ICC") and Instant Center ("IC") of the rear wheel 105 may approach infinity because the wheel path is completely linear. The IC is the point for the swingarm 114 as it is undergoing planar movement, i.e., during wheel travel, which has zero velocity at a particular instant of time. At this instant the velocity vectors of the trajectories of other points in the swingarm generate a circular field around the IC, which is identical to what is generated by a pure rotation. The ICC, as used herein, refers to the ICC with respect to the center point of the rear wheel axle. The ICC can be derived from the radius of curvature at given point along wheel path, or the radius of a circle that mathematically best fits the curve of the wheel path at that point. The center point of this circle is the ICC.

In other examples, the first and second pivot link assemblies 116, 118 may define different angles with respect to the longitudinal axis of the frame, such that angle A and angle B, as shown in FIG. 5, may not be substantially equal. In such examples, the forces impacting upon the rear wheel may be distributed unevenly between the two pivot link assemblies 116, 118. Nonetheless, the transverse orientation of the link assemblies 116, 118 may serve to restrict horizontal movement of the swingarm 114 along the z-axis, with each of the link assemblies 116, 118 providing counteracting forces to counterbalance the load caused by side-to-side deflection of the swingarm 114. Accordingly, the swingarm 114 may be prevented from moving back and forth along the z-axis even when the angles defined between the link assemblies 116, 118 and the longitudinal axis of the frame are different. In one particular example, one of the pivot link assemblies may extend such that it is substantially parallel to the longitudinal axis of the frame, and the other of the pivot link assemblies may extend such that it is substantially orthogonal to the longitudinal axis of the frame.

Referring to FIG. 6, in another example, the shock 120 may be tilted rearward to form an angle C with respect to the y-axis and the mounting points for the pivot link assemblies 116, 118 readjusted such that the linear path defined by the pivot link assemblies 116, 118 is parallel to the shock. In this example, the motion of the swingarm 114 may be substantially confined to a linear path that forms an angle C with respect to the y-axis, and the leverage ratio may be substantially close to 1:1. Similarly, the shock 120 may be tilted forward to form an angle D with respect to the y-axis and the mounting points for the pivot link assemblies 116, 118 readjusted such that the linear path defined by the pivot link assemblies 116, 118 is parallel to the shock. In this example, the motion of the swingarm 114 may be substantially confined to a linear path that forms an angle D with respect to the y-axis. Accordingly, the shock 120 may be tilted forward or backward so as to define any angle between 0 and 90 degrees with respect to the y-axis and the mounting points for the pivot link assemblies 116, 118 readjusted such that the linear path defined by the pivot link assemblies 116, 118 is parallel to the shock, such that the wheel path also forms the same angle with respect to the y-axis, and the leverage ratio is 1:1.

In other examples, the shock 120 may be oriented at an angle with respect to the travel path of the rear wheel 105, i.e., so that the shock 120 and the travel path of the wheel 105 are no longer parallel, and the leverage ratio varies from 1:1. In such cases, the wheel travel distance may be longer or shorter than the shock stroke length. As an example, this may be accomplished by rotating the shock at an angle along the Y-Z plane (i.e., such that the shock is not parallel to the y-axis when viewed from the front of the bicycle), or along the X-Y plane. In further examples, the shock may be tilted such that it is not fully aligned with either of the X-Y or Y-Z planes. In this example, at least a portion of the shock would rotate in three-dimensions.

Figure 8A:
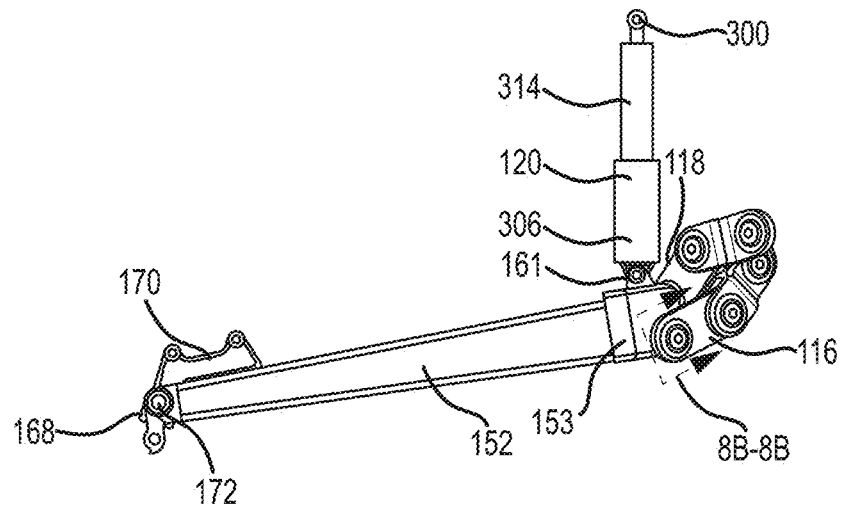
FIG. 8A is a right side view of the rear suspension system of the bicycle depicted.
Figure 8B:
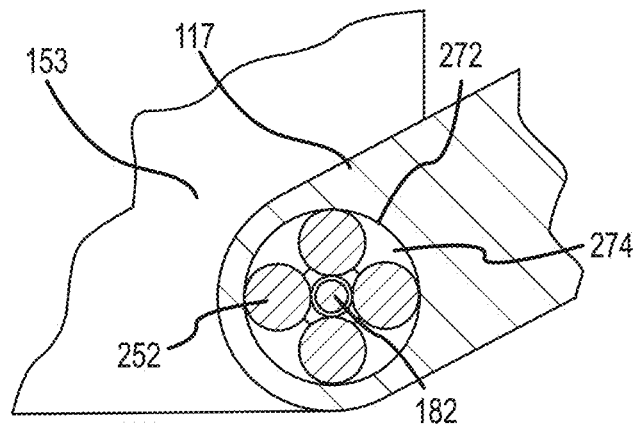
FIG. 8B is a partial cross-sectional view of the rear link of the first pivoty link assembly, as taken along line in 8B-8B of FIG. 8A.

A detailed cross-sectional view of an exemplary pivot joint used in the pivot points 194, 198, 206, 182, 185, 187 is shown in FIG. 8B. In one example, each pivot point 194, 198, 206, 182, 185, 187 may include a plurality of rolling-element bearings 252 connected with the first and second link assemblies 116, 118 configured to pivot around the circumference of a respective pivot axle 182. The rolling-elements 252 may be generally cylindrically-shaped and may be configured to roll along respective track surfaces 272. The widths of the track surfaces 272 may be slightly larger than the corresponding widths of the rolling-element bearings 252, and the distance between track surfaces 272 and the surfaces of the pivot axles 182 may be slightly larger than the corresponding diameters of the rolling-element bearings 252. The track surfaces 272 may be substantially smooth to provide a low friction rolling surface for the rolling-elements 252.

As described in more detail below, the rolling-element bearings 252 may be adapted to roll back and forth along their respective track surfaces 272 as the links 117, 119, 127, 129 move in response to displacement of the rear wheel 106. More particularly, the rolling-element bearings 252 allow the forward link 119 of the first pivot link assembly 116 to pivot with respect to the front frame 112, and the rear link 117 to pivot with respect to the swingarm 114 and the forward link 119. Similarly, the forward link 129 of the second pivot link assembly 118 is allowed to pivot with respect to the front frame 112 and the rear link 127, and the rear link 127 is allowed to pivot with respect to the swingarm 114 and the forward link 129. Rotation of the links 117, 119 around pivot points 194, 198, 206, 182, 185, 187 in response to forces exerted on the rear wheel 106 causes the swing arm 114 to move in an upwards or downwards direction relative to the frame 112.

It is to be appreciated that different examples of the present disclosure can utilize different roller bearing and track configurations to provide desired strength and motion characteristics. For example, in some examples, each pivot aperture may define multiple tracks and include multiple rolling-element bearings 252 positioned in a parallel orientation. Additionally, other examples may utilize different configurations of rolling-element bearings, including ball bearings, roller bearings, needle bearings, static bearings, and so on. Additionally, while FIG. 8B illustrates a radially centered bearing, other examples may utilize radially off-center bearings.

In the example illustrated in FIGS. 1-14, the forward 117, 127 and rear 119, 129 links of the first and second pivot assemblies 116, 118 are substantially the same length. Additionally, the links 117, 119, 127, 129 of the first and second pivot link assemblies 116, 118 are substantially the same length, and the first and second pivot link assemblies 116, 118 include the same number of pivot points 194, 198, 206, 182, 185, 187, i.e., three each. The links can be relatively short, for example, 50 mm for every 100 mm of rear wheel travel. In other examples of the link suspension system, the first and second pivot link assemblies 116, 118 may have any number of pivot points and/or links. For example, the first pivot link assembly 116 may have more or fewer links than the second pivot link assembly 118, and may be connected by more or fewer pivot points. In addition, in other examples, the forward and rear links of the first and second pivot link assemblies 116, 118 may have different lengths, the pivot link assemblies 116, 118 may have different overall or total lengths, or one of the pivot link assemblies may have more or fewer links than the other. While changing the length of the individual links may alter the angular velocity of the links 117, 119, 127, 129 as they rotate around the pivot points 194, 198, 206, 182, 185, 187, the swing arm 114 and rear wheel 106 will continue to maintain a substantially linear travel path.

FIGS. 9-14 show the rear suspension system 102 in varying stages of compression. For example, the rear suspension system 102 may be placed in a partially or fully compressed stage by an upward force applied to the rear wheel 106 or a downward force applied to the seat 110, such as when a rider sits on the bicycle 100, or when the bicycle 100 moves over rough terrain. Such an upward or downward force may activate the shock assembly 120, causing the cylinder body 306 to traverse the length of the piston shaft 314 relative to the amount of upward or downward force exerted on the shock assembly 120. If no force is applied onto the shock assembly 120, it may remain inactive, with the cylinder body 306 maintained in an extended position away from the piston shaft 314.

Figure 10:
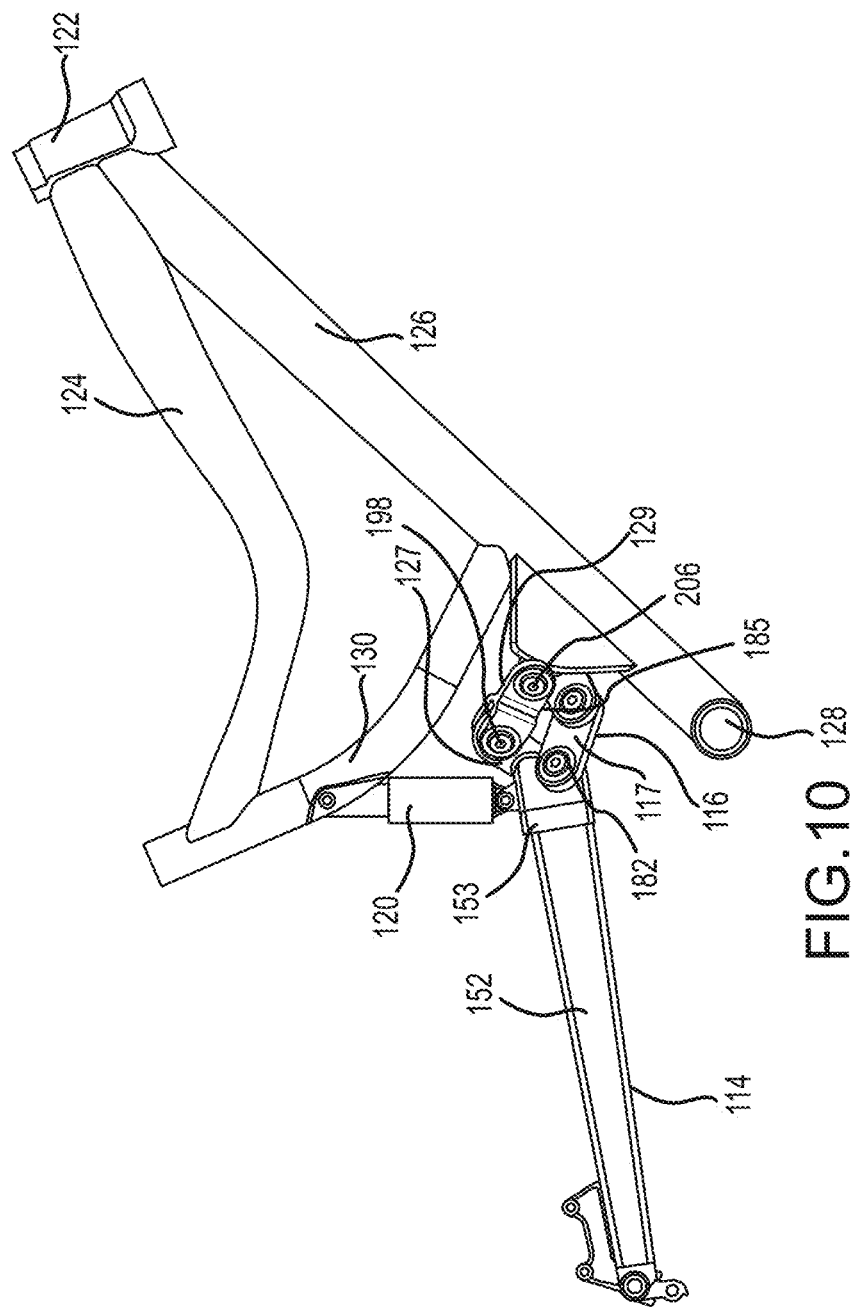
FIG. 10 is right side view of the front frame and rear suspension system of the bicycle depicted in FIG. 1, with the shock in a partially compressed position.
Figure 11:
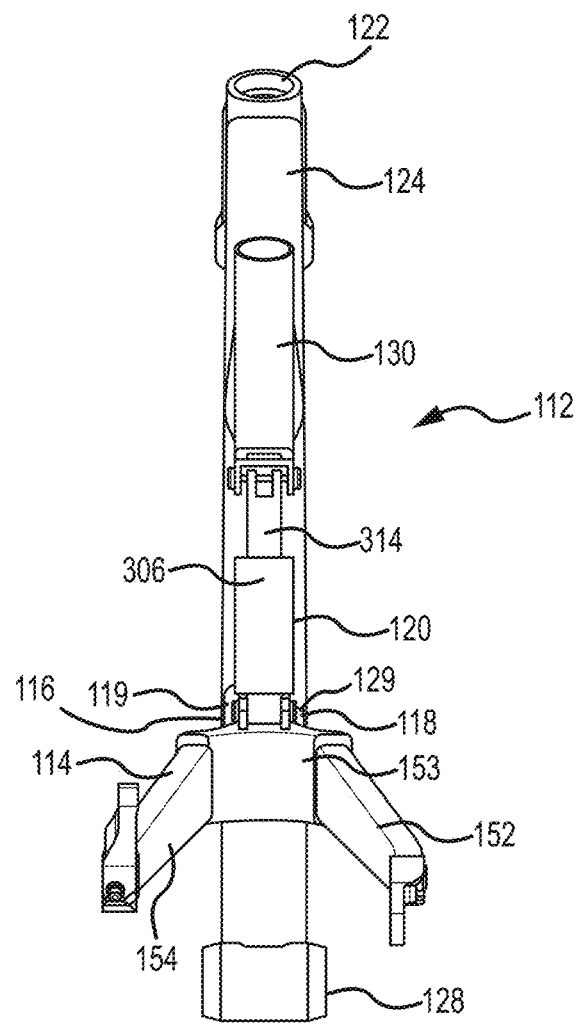
FIG. 11 is a rear view of the front frame and rear suspension system of the bicycle depicted in FIG. 1, with the shock in a partially compressed position.
Figure 14:
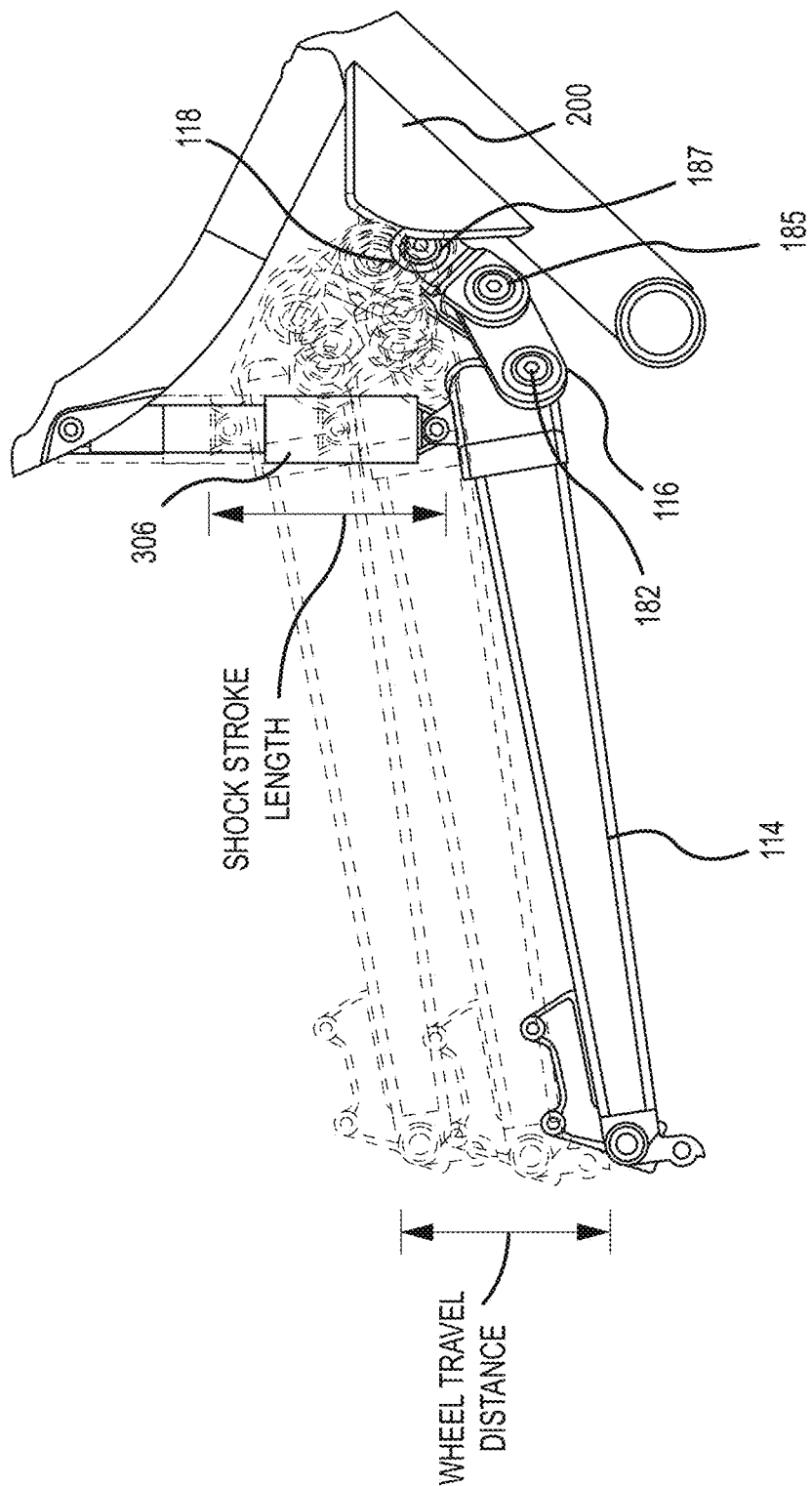
FIG. 14 is a right side view of the rear suspension system in an uncompressed stage shown in solid lines, and in a partially compressed stage and a fully compressed stage shown in dashed lines.

FIGS. 10-11 illustrate the shock assembly 120 in a partially compressed stage. As illustrated, the forward 119, 129 and rear 117, 127 links of the first and second link assemblies 116, 118 are in a first elevated position. Additionally, the rear pivot points 182, 185 of the first pivot link assembly 116 and the rear pivot points 194, 198 of the second pivot link assembly 118 are in a first elevated position with respect to the bike frame 112. As shown in FIG. 14, a comparison of the compressed stages illustrated in FIGS. 1-9 with FIGS. 10-11 shows that the rear pivot points 182, 185 of the first pivot link assembly 116 and the rear pivot points 194, 198 of the second pivot link assembly 118 have moved upward along the y-axis. The upward movement of the first and second link assemblies 116, 118 also forces the cylinder body 306 of the shock assembly 120 upward and onto the piston shaft 314 to place the shock assembly in a partially compressed stage. In addition, as the rear suspension system 102 moves from the non-compressed stage to the partially compressed stage, the links 117, 119, 127, 129 may pivot around the pivot points 194, 198, 206, 182, 185, 187 in a clockwise direction (as view from the right side of the bicycle).

Figure 12:
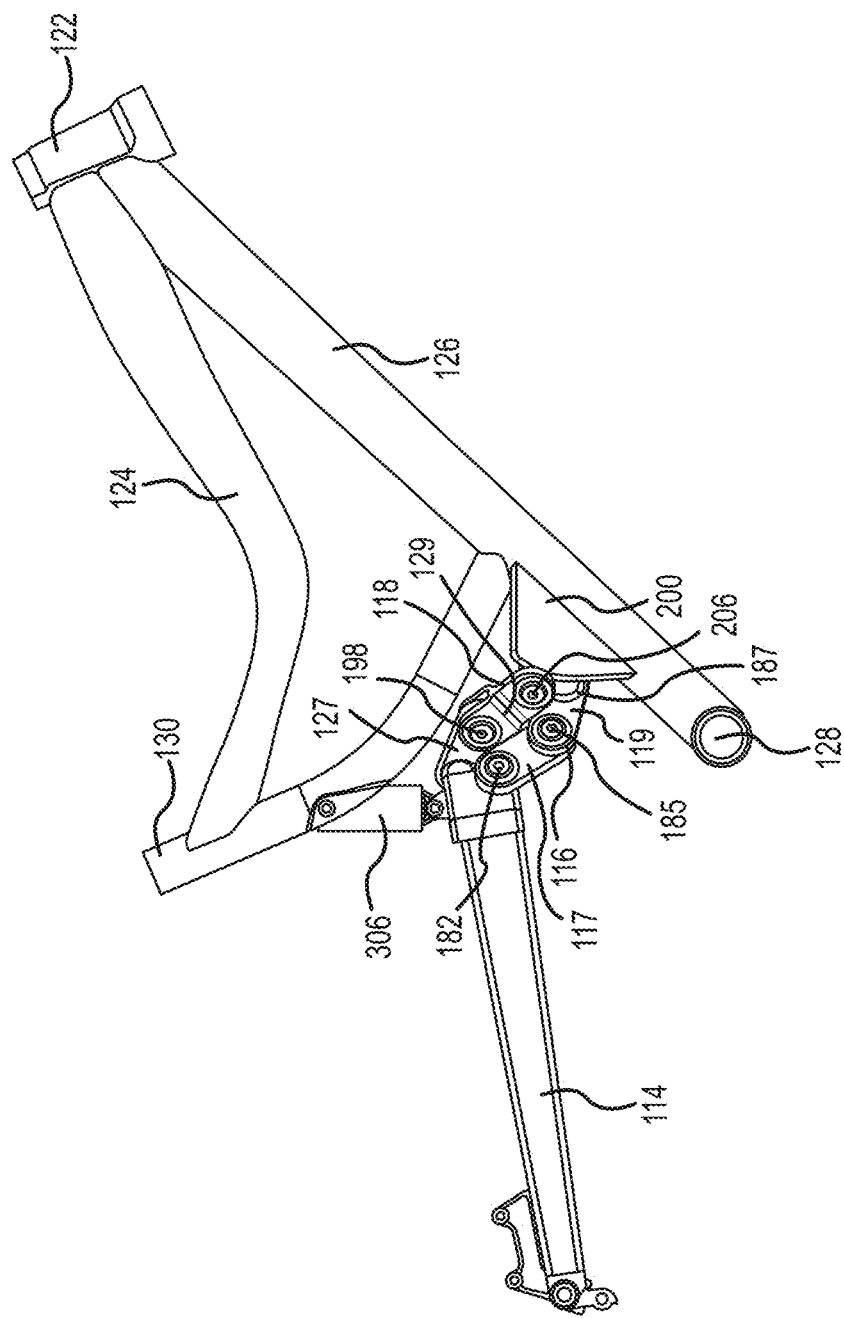
FIG. 12 is a right side view of the front frame and rear suspension system of the bicycle depicted in FIG. 1, with the shock in a fully compressed position.
Figure 13:
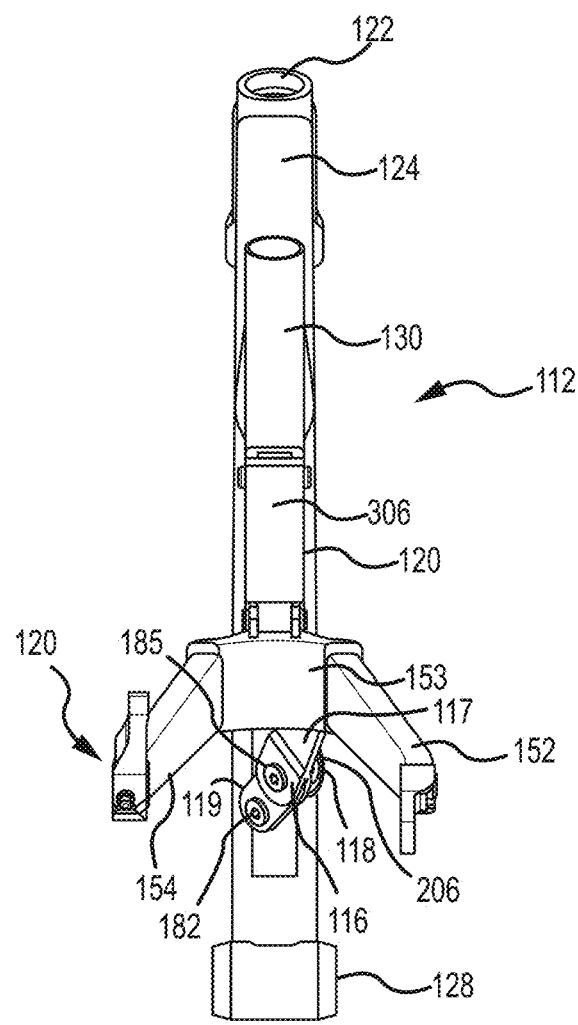
FIG. 13 is a rear view of the front frame and rear suspension system of the bicycle depicted in FIG. 1, with the shock in a fully compressed position.

FIGS. 9, 12-13 illustrate the shock assembly 120 in a fully compressed stage. As illustrated, the forward 119, 129 and rear 117, 127 links of the first and second link assemblies 116, 118 are in a second elevated position. Additionally, the rear pivot points 182, 185 of the first pivot link assembly 116 and the rear pivot points 194, 198 of the second pivot link assembly 118 are in a second elevated position with respect to the bike frame 112. As shown in FIG. 14, a comparison of the compressed stages illustrated in FIGS. 10-11 with FIGS. 12-13 shows that the rear pivot points 182, 185 of the first pivot link assembly 116 and the rear pivot points 194, 198 of the second pivot link assembly 118 have moved upward along the y-axis from the partially compressed stage. The upward movement of the first and second link assemblies 116, 118 also forces the cylinder body 306 of the shock assembly 120 further upward onto the piston shaft 314 to place the shock assembly in a fully compressed stage. In addition, as the rear suspension system 102 moves from the partially compressed stage to the fully compressed stage, the links 117, 119, 127, 129 may pivot around the pivot points 194, 198, 206, 182, 185, 187 in a clockwise direction (as view from the right side of the bicycle). A relatively large upward force applied to the rear wheel 106 or a large downward force applied to the seat 110, such as when the rider and the bicycle land on the ground after riding over a jump, can place the rear suspension system in a third fully compressed stage as shown in FIGS. 12-13.

By allowing the rear wheel 106 and the swingarm 114 to move relative to the front frame 112 through the first and second link assemblies 116, 118 as described above, the rear suspension system 102 acts to efficiently absorb forces impacting on the bicycle 100 that can be caused from riding over rough terrain (such as rocks, holes in the ground, and the like). As previously mentioned, the shock assembly 120 acts to resist displacement of the rear wheel 106 and acts to return the rear wheel to its pre-displacement position. In addition, the link assembly 116, 118 prevents movement of the swingarm 114 along the z-axis, thereby limiting the travel path of the swingarm 114 to a substantially linear path along the X-Y plane that is substantially parallel to the orientation of the shock assembly 120. Accordingly, the swing arm 114 and rear wheel 106 can travel in a substantially linear path parallel to the y-axis, thereby limiting inefficient use of the shock assembly 120 associated with wheel travel along the x-axis.

Figure 15:
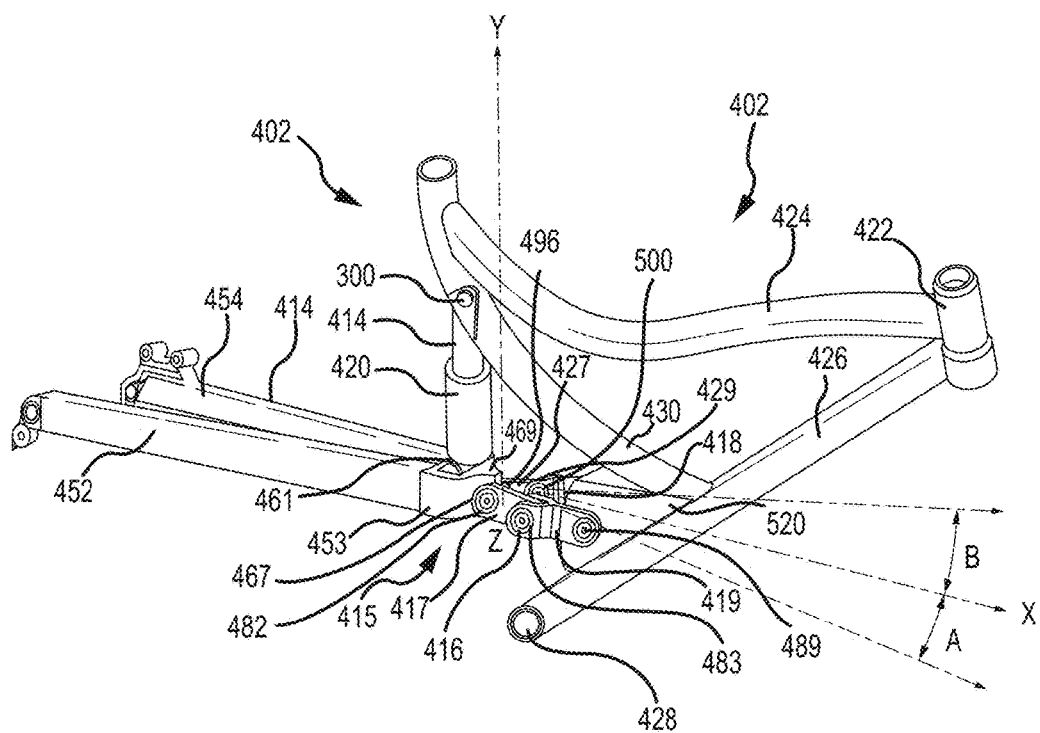
FIG. 15 is a right-front isometric view of a front frame and a rear suspension system according to a second example of the present invention.

A second example of the rear suspension system 402 is shown in FIG. 15. Similar to the first example, the second example of the rear suspension system 402 includes a swingarm 414 coupled with the front frame 412 through a link suspension system 415 including a first pivot link assembly 416, a second pivot link assembly 418, and a shock assembly 420, which may be bolted to the front frame 412 and to the swingarm 414. The front frame 412 can include a head tube 422, a top tube 424, a down tube 426, a bottom bracket 428, and a seat tube 430. Additionally, the swingarm 414 includes right and left arms 452, 454 that are connected together by a central attachment member 453 that may also be attached to the first link assembly 416 and the second link assembly 418. Similar to the example shown in FIGS. 1-14, the shock 420 may include a piston shaft 514 and a cylinder body 506.

As will be further discussed below, the central attachment member 453 may define right and left link attachment portions 467, 469 to which the rear links 417, 427 of the first and second link assemblies 416, 418 are pivotally attached, thereby connecting the swingarm 114 with the down tube 426 of the front frame 412. The central attachment member 453 may also include an axle 461 adapted to rotatably receive the bottom end of the shock assembly 420 to connect the shock assembly 420 to the central attachment member 453. The top end of the shock assembly 420 may be rotatably connected to the seat tube 430 via an axle 300 mounted on the top end of the piston shaft 414 and corresponding receiving apertures 402 defined by the seat tube 430. As shown in FIG. 15, the shock 420 may be parallel to the y-axis when mounted to the seat tube 430 and to the central attachment member 453.

The link suspension system 415 may include first and second pivot link assemblies 416, 418 that are positioned in a v-shaped configuration. Accordingly, in contrast to the example shown in FIG. 1, the first and second pivot link assemblies 416, 418 are not crossed in position, i.e., the positions of the first and second pivot link assembles 416, 418 do not overlap or intersect along the z-axis, instead forming a "V." The first pivot link assembly 416 may include a rear link 417 that is pivotally connected to a forward link 419. The rear end of the rear link 417 may be pivotally connected to the right link attachment portion 467 of the central attachment member 403, and the front end of the rear link 417 may be pivotally connected to the rear end of the forward link 419. Referring to FIG. 15, the front end of the forward link 419 may be pivotally connected to the front frame 412 on the right side of the frame. In particular, the front end of the forward link 419 may be pivotally connected to the triangular shaped mounting portion 520 defined by the down tube 426 of the front frame 412.

The second pivot link assembly 418 may be similar in configuration to the first pivot link assembly 416. For example, the second pivot link assembly 418 may also include a rear link 427 that is pivotally connected to a forward link 429. The rear end of the rear link 427 may be pivotally connected to the left link attachment portion 469 of the central attachment member 403, and the front end of the rear link 427 may be pivotally connected to the rear end of the forward link 429. Referring to FIG. 15, the front end of the forward link 429 may be pivotally connected on left side of the front frame 412. In particular, the front end of the forward link 429 may be pivotally connected to the triangular shaped mounting portion 420 defined by the down tube 426 of the front frame 412.

As discussed above, the first and second pivot link assemblies 416, 418 may be positioned in v-shaped configuration. More particularly, as shown in FIG. 15, the first pivot link assembly 416 may extend transversely from the right link attachment portion 467 of the central attachment member 453 to the right mounting arm 512 of the mounting portion 520 to define an angle A with respect to the longitudinal axis of the frame, i.e., the x-axis. The first pivot link assembly 146 may be non-orthogonal to the z-axis and the axis of rotation of the rear wheel, which is parallel to the z-axis. The angle A may be between 0 and 90 degrees with respect to the longitudinal axis of the frame. In other examples, the angle A may be between 90 to 180 degrees, 180 to 270 degrees, or 270 to 360 degrees with respect to the longitudinal axis of the frame. The axes of rotation of the forward and rear links 417, 419 around the pivot points 482, 483, 489 may be orthogonal to the orientation of the links, and may further be non-orthogonal to the longitudinal axis of the frame 412. More particularly, the axes of rotation of the links 417, 419 around the pivot points 482, 483, 489 may form an angle between 0 and 90 degrees with respect to the longitudinal axis of the frame. In other examples, the axes of rotation, may form an angle between 90 to 180 degrees with respect to the longitudinal axis of the frame and to the x-axis, or between 180 to 270 or 270 to 360 degrees with respect to the longitudinal axis of the frame and to the x-axis.

Similarly, the second pivot link assembly 418 may extend from the left link attachment portion 469 of the central attachment member 453 to the left mounting arm 512 of the mounting portion 520 to define an angle B with respect to the longitudinal axis of the frame. The axes of rotation of the forward and rear links 427, 429 around the pivot points 496, 500, 508 may be orthogonal to the orientation of the links 427, 429 and non-parallel to the z-axis. As shown in FIG. 5, the angle B defined between the second pivot link assembly 418 and the x-axis may be equal to the angle A defined between the first pivot link assembly 416 and the x-axis, thereby equalizing the distribution of forces along the first and second pivot link assemblies 418.

The transverse orientation of the link assemblies 416, 418 serves to restrict horizontal movement of the swingarm 414 along the z-axis, thereby preventing side-to-side wobbling of the swingarm 414 and the connected rear wheel 406. More particularly, the first link assembly 416 may provide an opposing force to counterbalance movement of the swingarm 414 to the left, while the second link assembly 418 may provide an opposing force to counterbalance movement of the swingarm 414 to the right. Accordingly, the swingarm 414 is prevented from moving back and forth along the z-axis, and instead travels along a travel path located along a plane parallel to the y-plane.

The transverse orientation of the link assemblies 416, 418 further confines any motion of the swingarm 414 and the connected rear wheel 406 to a substantially linear path having limited or no curvature. Each of the link assemblies 416, 418 acts as a yoke so as to resist loads caused by motion of the swingarm 414. Similar to other examples described above, the path traversed by the swingarm 414 may be adjusted by modifying the angle defined between the shock 420 and the y-axis, and adjusting the mounting positions of the pivot link assemblies 416, 418 such that the linear path defined by the assemblies 416, 418 is substantially parallel to the orientation of the shock 420. In this configuration, the rear wheel 406 can travel in a substantially linear path, allowing for a 1:1 leverage ratio and maintaining the efficiency of the shock 420 in absorbing forces exerted on the wheel. If the shock 420 is oriented so that it is parallel to the y-axis and the link assemblies 416, 418 are mounted so that the path defined by the link assemblies 416, 418 is parallel to the orientation of the shock, then the travel path of the swingarm 414 will be confined to a linear path that is substantially parallel to the y-axis. In other examples, the shock 420 may be tilted rearward or forward to form an angle with respect to the y-axis and the link assemblies 416, 418 mounted so that the path defined by the link assemblies 416, 418 is not parallel to the orientation of the shock. In such examples, the leverage ratio may deviate from 1:1.

Figure 16A:
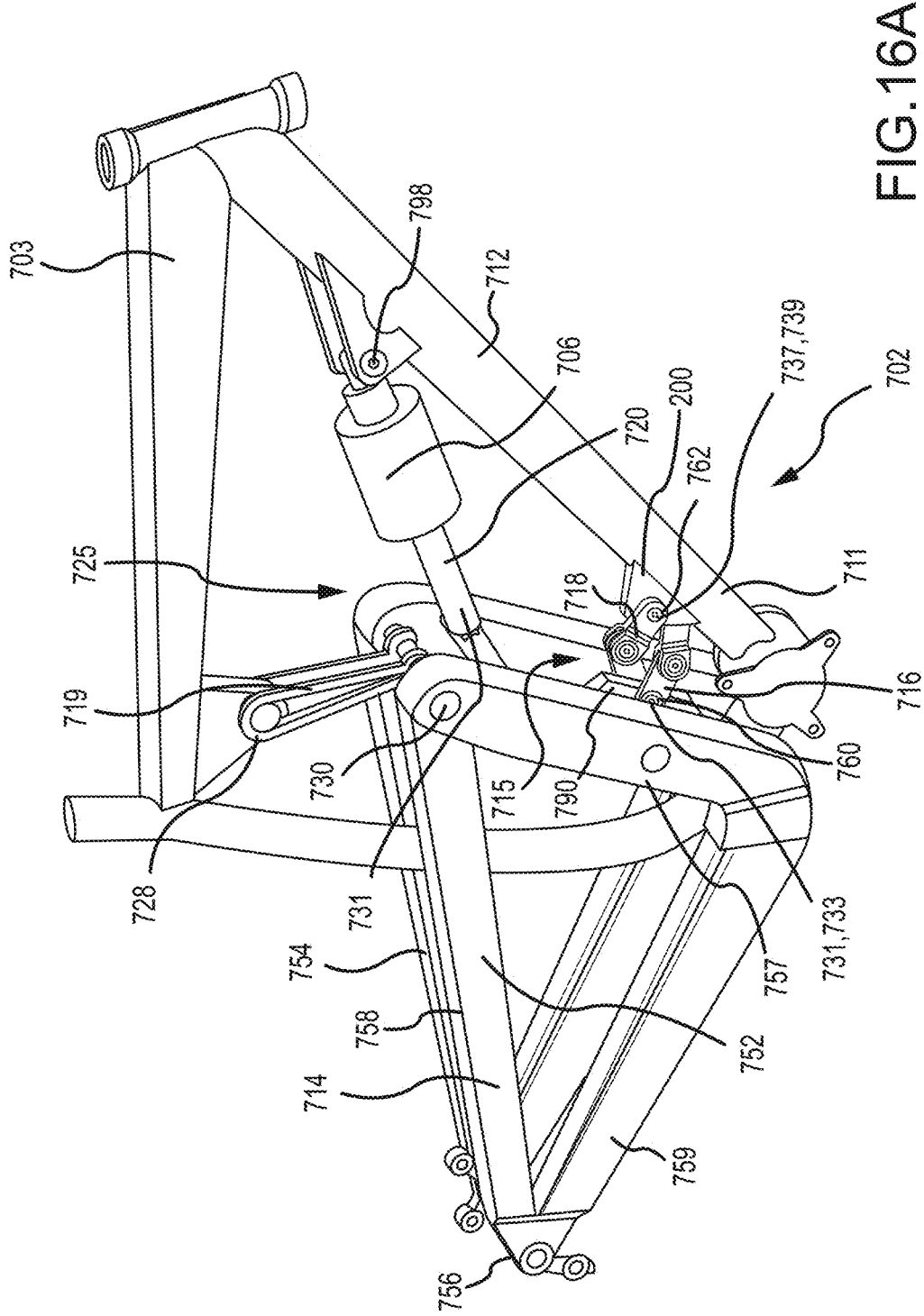
FIG. 16A is a right-front isometric view of a front frame and rear suspension system according to a third example of the present invention.
Figure 16B:
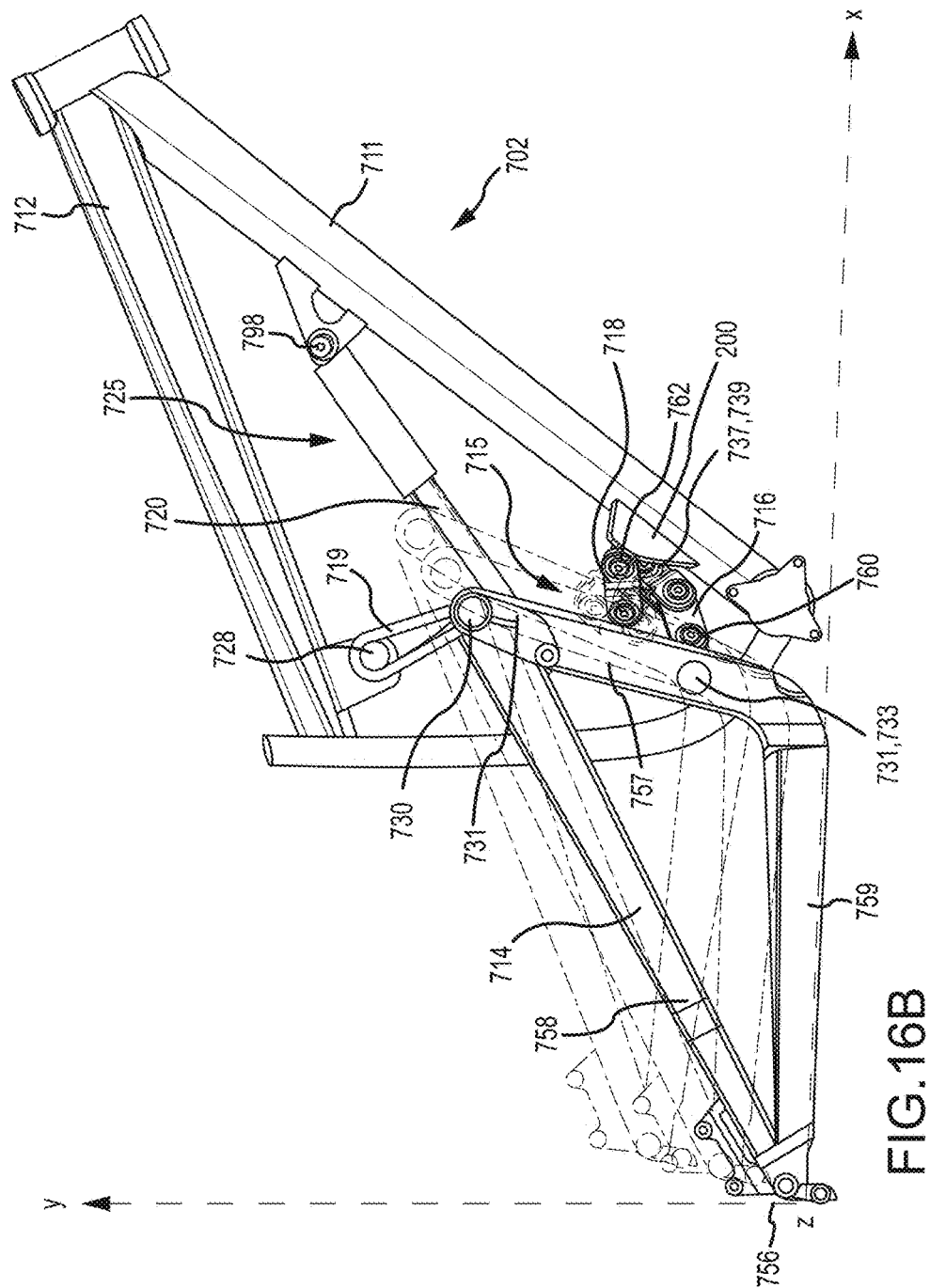
FIG. 16B is a right side view of the rear suspension system depicted in FIG. 16A in an uncompressed stage shown in solid lines, and in a partially compressed stage and a fully compressed stage shown in dashed lines.

A third example of the rear suspension system 702 is shown in FIGS. 16A and 16B. The front frame 712 is connected to a swingarm, including a rear frame 714 that is coupled with the front frame 712 through a link suspension system 715. As shown, the rear frame 714 may include right and left rear triangles 752, 754. Generally, each of the right and left triangles 752, 754 includes a forward member 757 connected to a chain stay 759 which extends from the bottom end of the forward member 757 to a rear end portion 756 configured for receiving one end of a rear wheel axle, and to a seat stay 758 that extends diagonally from the rear end portion 756 of the chain stay 759 to the top end of the forward member 757. The rear end portions 756 of the right and left rear triangles 752, 754 may be connected, or, in other examples, the rear end portions 756 of the right and left rear triangles 752, 754 may be unconnected. It is to be appreciated that the rear frame 714 can be constructed from various types of material, such as aluminum, carbon, titanium, and so on. The members used to construct the rear frame may also define a hollow tubular structure, or may have a solid construction.

Similar to the previously described examples, the link suspension system 715 may include a first pivot link assembly 716 and a second pivot link assembly 718. The first and second pivot link assemblies 716, 718 may be crossed in an X-configuration, as shown. In other examples, the link assemblies 716, 718 may be arranged in a V-configuration as described above. Additionally, the link suspension system 715 includes a horizontally-oriented shock assembly 725. As is shown, one end of the shock 725 may be coupled to the front frame 712 at fixed pivot point 798, and the other end of the shock 725 may be coupled to the rear frame at pivot point 731. In one example, the shock 725 may include a cylinder body 706, and a piston shaft 720. The piston 720 may be adapted to move back and forth along the inside length of the cylinder body 706 in response to tension and/or compression forces applied to the piston shaft 720 by the rear frame 714.

The rear frame 714 may be pivotally connected to the front frame 712 via a swing link 719. The top end of the swing link 719 may define a first fixed pivot point 728 on the front frame 712 for allowing the swing link 719 to pivot relative to the front frame 712. The bottom end of the swing link 719 may define a second pivot point 730 for allowing the swing link 719 to pivot relative to the piston shaft 720 and travel along an arcuate path about pivot point 728 as the shock 725 is compressed, thus rotating the shock 725 around pivot point 798.

The rear frame 714 may further be pivotally connected to the front frame 719 via the link suspension system 715. More particularly, the rear ends 760 of the first and second pivot link assemblies 716, 718 may define rear pivot points 731, 733 for allowing the first and second pivot link assemblies 716, 718 to pivot relative to the rear frame 714. The front ends 762 of the first and second pivot link assemblies 716, 718 may be pivotally coupled to right and left mounting arms extending from a triangular-shaped mounting portion 200 on the front frame 712 to define fixed front pivot points 737, 739 for allowing the first and second pivot link assemblies 716, 718 to pivot relative to the down tube 711. In one example, the rear ends 760 of the first and second pivot link assemblies 716, 718 may each be mounted to a central connection bracket 790 positioned between the right and left rear triangles 754, 752 forming the rear frame 714. However, in other examples, the first and second pivot link assemblies 716, 718 may be directly mounted to the triangles 754, 752.

FIG. 16B illustrates the rear suspension system 702 of FIG. 16A in an uncompressed stage shown in solid lines, and a partially compressed stage and a fully compressed stage shown in dashed lines. As shown, the second rotating pivot point 730 of the swing link 719 may travel along an arc defined by the distance pivot points 728 and 730 along the length of the piston 720 as it is compressed. As the second pivot point 730 rotates forward along the length of the piston 720, the first and second pivot link assemblies 716, 718 may be compressed to guide the rear pivot points 731, 733 of the pivot link assemblies 716, 718 in a generally upward direction toward the front end of the bicycle. Accordingly, the link suspension system 715 may serve to restrict movement of the rear frame 714 along the z-axis, thereby preventing side-to-side wobbling of the rear frame 714 and the connected rear wheel. The link suspension system 715 may thus be configured to function similar to a mechanical rail or track configured to guide the third and fourth pivot points 731, 733 between the first pivot point 728 and the down tube 711.

In this configuration, the rear wheel can travel in a substantially vertical orientation while utilizing a shorter shock assembly than in the first and second examples, which include a vertically oriented shock assembly. Accordingly, the leverage ratio may deviate from the 1:1 ratio discussed above. Furthermore, the ICC and IC of the rear wheel may migrate, rather than approach infinity, due to the slightly curved wheel travel path.

A fourth example of the rear suspension system 1702 is shown in FIGS. 17A-17J. Like the example of the rear suspension system 702 shown in FIGS. 16A and 16B, this particular example includes a rear frame 1714 that is coupled with the front frame 1712 through a link suspension system 1715. Similar to the rear frame 714 shown and described in FIGS. 16A and 16B, the rear frame 1714 may include right and left rear triangles 1752, 1754, each defining a forward member 1757, chain stay 759, and a seat stay 1758. The rear end portions of the triangles 1752, 1754 being connected by a shaft 1751 configured for receiving the wheel axle of the rear wheel. However, in other examples, the rear end portions of the right and left rear triangles 1752, 1754 may be unconnected. It is to be appreciated that the rear frame 1714 can be constructed from various types of material, such as aluminum, carbon, titanium, and so on. The members used to construct the rear frame may define a hollow tubular structure, or may have a solid construction.

As described above with respect to other examples, the link suspension system 1715 may include a first pivot link assembly 1716 and a second pivot link assembly 1718, crossed in an X-configuration, as shown. Additionally, the link suspension system 1715 may further include a horizontally-oriented shock assembly 1725. The shock 1725 may be coupled between the rear frame 1714 and the front frame 1712, and may include a cylinder body 1710 and a piston shaft 1720 adapted to move back and forth along the inside length of the cylinder body 1710 in response to tension and/or compression forces applied by the rear frame 1714. As shown, the forward end of the shock 1725 may be pivotally coupled to the down tube of the front frame 1712, and the rear end of the shock 1725 may be pivotally coupled to the rear frame 1714.

Similar to prior examples, the rear ends of the first and second pivot link assemblies 1716, 1718 may define rear points 1737, 1739 for allowing the first and second pivot link assemblies 1716, 1718 to pivot relative to the rear frame 1714 and the front ends of the first and second pivot link assemblies 1716, 1718 may define front pivot points 1731, 1733 for allowing the first and second pivot link assemblies 1716, 1718 to pivot relative to the front frame 1712. As discussed above with respect to other examples, the front ends of the first and second pivot link assemblies 1716, 1718 may be mounted to a triangular-shaped mounting portion 200 defining right and left mounting arms to which the first pivot link assembly 1716 and the second pivot link assembly 1718 are pivotally attached. Furthermore, the axes of rotation of the forward and rear links 1717, 1719, 1727, 1729 may form an angle that is between 0 and 90 degrees with respect to the longitudinal axis of the frame 1712 (i.e., the x-axis). In other examples, the axes of rotation may form an angle that is between 90 to 180 degrees with respect to the longitudinal axis of the frame and to the x-axis, or between 180 to 270 or 270 to 360 degrees with respect to the longitudinal axis of the frame and to the x-axis.

As best shown in FIG. 17E, which illustrates the rear suspension system 1702 with the rear frame 1714 removed, the front ends of the first and second pivot link assemblies 1716, 1718 may be pivotally joined to the front frame, and the rear ends of the first and second pivot link assemblies 1716, 1718 may be pivotally joined to a mounting bracket 1770 at pivot point 1771. A comparison of FIGS. 17F and 17G illustrates that the mounting bracket 1770 is configured to travel vertically relative to the front frame 1712 as the rear frame 1714 is displaced relative to the front frame 1712. Notably, the mounting bracket 1170 in this particular example does not physically touch the seat tube 1773 as it travels. In contrast, the motion of the bracket 1770 is limited by the transverse orientation of the first and second pivot link assemblies 1716, 1718, which confines any motion of the bracket 1770 to a substantially linear path having limited, if any, curvature. Other examples may include brackets or other mechanisms that slidably engage the seat tube 1773. As best shown in FIGS. 17D, 17F, and 17G, the rear ends of the first and second pivot link assemblies 1716, 1718 are configured to both pivot relative to the bracket 1770 and travel upwardly with the bracket 1770 as the shock assembly 1725 is compressed, while the front ends of the first and second pivot link assemblies 1716, 1718 are configured to pivot relative to the front frame 1712.

Figure 17B:
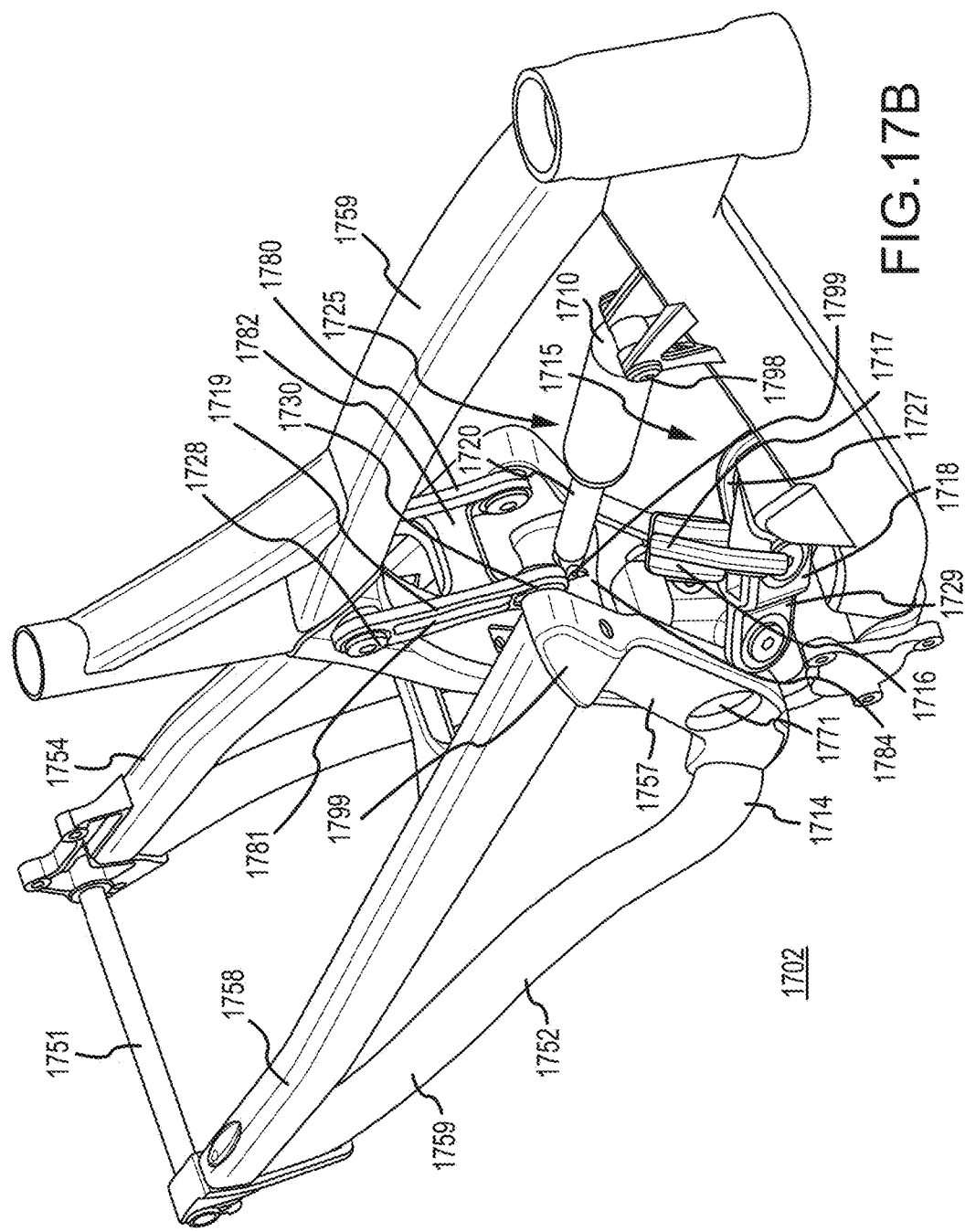
FIG. 17B is a right-front isometric view of the front frame and rear suspension system depicted in FIG. 17A.
Figure 17C:
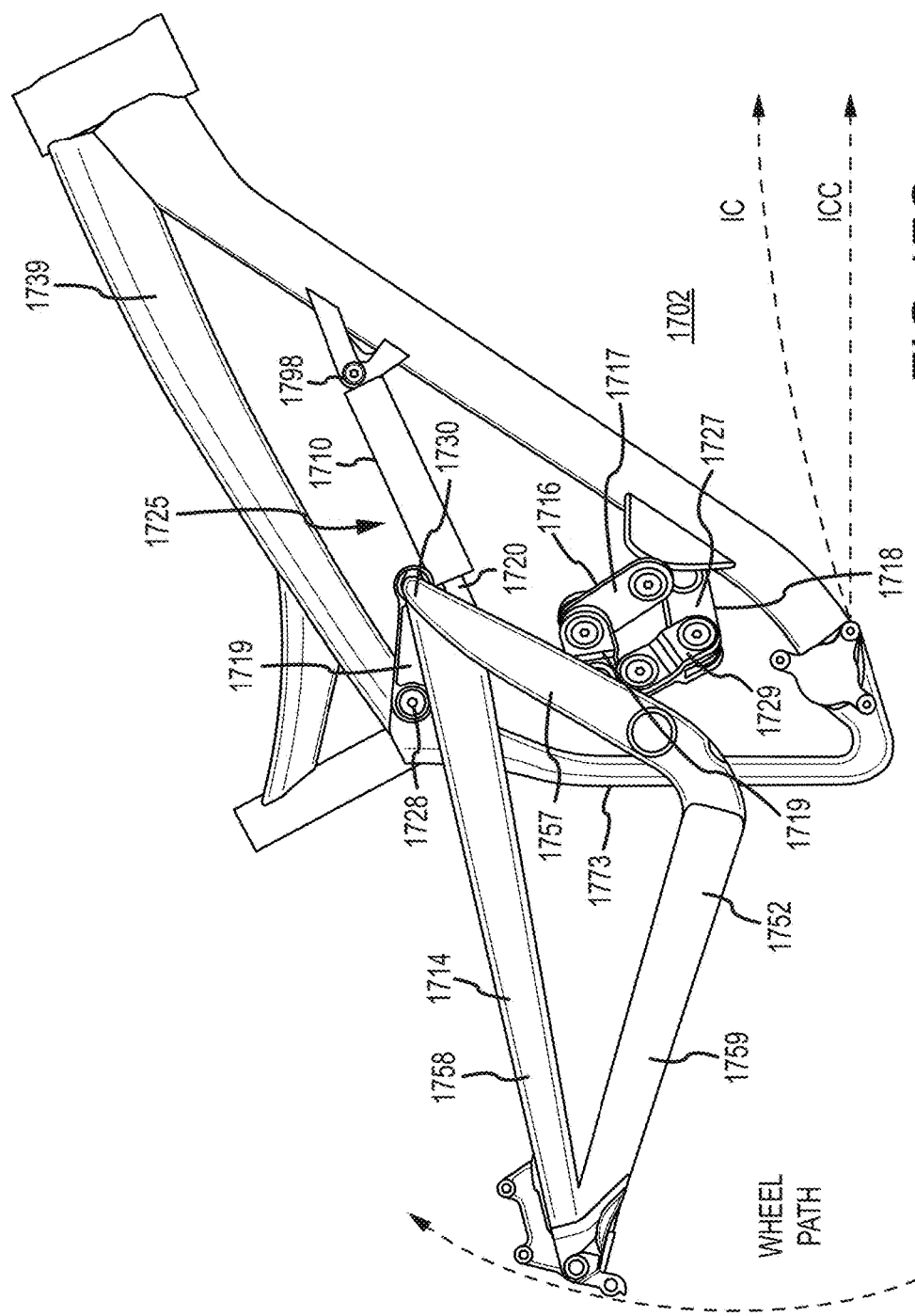
FIG. 17C is a right side view of the front frame and rear suspension system depicted in FIG. 17A in a fully compressed stage.

Referring back to FIGS. 17A and 17B, the rear frame 1714 may further be pivotally connected front frame 1712 via a swing link 1719. The top end of the swing link 1719 may be pivotally connected to the top tube 1739 of the front frame 1712 to define a first pivot point 1728, and the bottom end of the swing link 1719 may be pivotally mounted to the rear frame 1714 to define a second pivot point 1730. As best shown in FIGS. 17F and 17G, which illustrate the shock 1725 in fully compressed and uncompressed positions, the swing link 1719 is configured to swing forwardly (i.e., in a counter-clockwise direction) in response to compression forces applied by the rear frame 1714. The second pivot point 1730 may travel along an arcuate path as the swing link 1719 swings forwardly, compressing the shock 1725.

The swing link 1719 structure is best illustrated in FIG. 17B. In one example, the swing link 1719 may have a dog bone-type structure, in which two parallel linkages 1780, 1781, are connected by a horizontal member 1782 that extends between the linkages 1780, 1781. The linkages may be pivotally coupled to the right and left sides of the front frame (i.e., at fixed pivot point 1728), as well as to each of the right and left triangles 1752, 1754 of the rear frame (i.e., at pivot point 1730). As best shown in FIG. 17B, in one example, the linkages 1780, 1781 are coupled to the opposing inner surfaces of the top ends of the forward members 1757. However, in other examples, the linkages 1780, 1781 may be otherwise coupled to the triangles 1752, 1754. For example, the linkages 1780, 1781 may be coupled to the outer surfaces of the forward members 1757, along the length of the forward members 1757 (rather than at the top of the forward members 1757), along the chain stay 1759, or along the seat stay 1758.

The rear frame 1714 may further be pivotally connected to the rear end of the piston 1720, which is best shown in FIGS. 17B, 17E, 17F, and 17G. The rear end of the piston 1720 defines an additional pivot point 1799 that allows the rear frame 1714 to pivot relative to the shock 1725 and the front frame 1712. In some examples, such as that shown in FIGS. 17A-17J, the rear end of the piston 1720 may be pivotally coupled to a member 1784 connecting the rear triangles 1752, 1754. In other examples, the rear end of the piston 1720 may be pivotally coupled to the swing link 1719, for example, the piston 1720 may be pivotally coupled to the horizontal member 1782 or to a separate member extending between the linkages 1780, 1781. The pivot point 1799 may travel forwardly and upwardly in response to forces impacting upon the rear frame. The top end of the shock 1725 may be pivotally coupled to the front frame 1712 at a fixed pivot point 1798 that allows the shock 1725 to pivot relative to the front frame 1712. Accordingly, and in contrast to some of the other examples previously discussed, the orientation of the shock 1725 relative to the front frame 1712 changes as it is compressed.

The rear frame 1714 may further be pivotally coupled to the mounting bracket 1770 that is coupled to the rear ends of the first and second pivot link assemblies 1716, 1718. As best shown in FIGS. 17F and 17G, forces impacting on the rear frame 1714 may cause the bracket 1770 to travel upwardly with the rear frame 1714 as it is displaced relative to the front frame 1712.

FIGS. 17C, 17E, 17D, 17F, and 17G illustrate the rear suspension system 1702 of FIG. 17A in fully uncompressed and compressed stages. As shown, displacement of the rear wheel causes the rear frame 1714 to travel relative to the front frame 1712, such that the bracket 1770 is moved upwardly along a substantially linear path. At the same time, the bottom end of the swing link 1719 is rotated in a counterclockwise direction towards the cylinder body 1710. The rear frame 1714 is further rotated in a clockwise direction and travels upwardly and forwardly relative to the front frame 1712. More particularly, the portion of the rear frame 1712 coupled to the mounting bracket 1770 is configured to move upwardly along the path defined by the bracket 1770, and the portion of the rear frame coupled to the swing link 1719 is configured to move along the arcuate path defined by the bottom end of the swing link 1719. This translation of the rear frame 1714 results in a wheel path that is slightly curved.

FIGS. 17F and 17G illustrate the motion of some of the pivot points 1730, 1799, and 1771 of the rear suspension system 1702 shown in FIGS. 17A- 17J. A comparison of FIGS. 17F and 17G illustrates that rotating pivot point 1730, which is located at the free end of the swing link 1719, travels along an arcuate path around fixed pivot point 1728. The path is located a distance away from the fixed pivot point 1728 that is substantially equal to the distance between the fixed pivot point 1728 and the rotating pivot point 1730. The pivot point located at the end of the shock 1799 travels along an arcuate path around fixed pivot point 1728. In contrast to the pivot point 1730 located on the swing link 1719, which maintains a constant distance away from the fixed pivot point 1728, the pivot point 1799 located on the shock 1725 moves closer to the fixed pivot point 1728 due to the rotation of the rear frame 1714 as it pivots relative to the swing link 1719 and to the shock 1725 as it is compressed. As is also shown in FIGS. 17F and 17G, the pivot point 1771 located on the mounting bracket 1770 moves along a linear path that is defined by the pivot link assemblies 1716, 1718.

Similar to the example rear suspension system shown in FIGS. 16A and 16B, the ICC and IC of the rear wheel in this example changes as the rear wheel is displaced, resulting in the curved wheel path described above. The curvature of the wheel path can be adjusted according to different examples by changing the location, geometrical shape of the swing link 1719 and/or the position of the link suspension system 1715. For example, the wheel path may be altered by varying the locations at which the front and rear ends of the first and second pivot link assemblies 1716, 1718 or the swing link 1719 are mounted or changing the lengths of the first and second pivot link assemblies 1716, 1718. The shock rate can be changed by moving the mounting points at which the ends of the shock are mounted to the front and rear frames. 1712, 1714.

FIG. 17H illustrates a top down view of the example of the rear suspension system shown in FIGS. 17A-17G, and 17I and 17J illustrate cross-sectional views taken along lines 17I-17I and 17J-17J of FIG. 17H. As shown in these figures, the forward and rear links 1717, 1709, 1727, 1729 of the first and second pivot link assemblies 1716, 1718 define angles, A and B, that are substantially equal to one another. While the angles A and B defined by the links 1717, 1709, 1727, 1729 change as the shock 1725 is compressed, the angle B defined by the forward and rear links 1717, 1709 of the first pivot link assembly 1716 remains substantially equal to the angle A defined by forward and rear links 1727, 1729 of the second pivot link assembly 1718 as the shock 1725 is compressed.

Another example of a rear suspension system 1802 is shown in FIGS. 18A-18F. Similar to the example shown in FIGS. 17A-17J, this example illustrates a link suspension system 1815 including first and second pivot link assemblies 1816, 1818 coupled to a mounting bracket 1870 that is configured to travel vertically relative to the front frame 1812 as the rear frame 1814 is displaced relative to the front frame 1812. Like the example shown in FIGS. 17A-17J, the rear frame 1814 is pivotally coupled to the bracket 1870, and to a rocker link 1819 that joins the rear frame 1814 to the front frame 1812. In contrast to the example shown in FIGS. 17A-17J, however, the rocker link 1819 coupling the front and rear frames 1812, 1814 extends upwardly, rather than downwardly, from a fixed pivot point 1828 at the bottom end of the link 1819 to a rotating pivot point 1830 at the top end of the link 1819.

Similar to prior examples, the rear ends of the first and second pivot link assemblies 1816, 1818 may define rear points 1837, 1839 for allowing the first and second pivot link assemblies 1816, 1818 to pivot relative to the rear frame 1814 and the front ends of the first and second pivot link assemblies 1816, 1818 may define front pivot points 1831, 1833 for allowing the first and second pivot link assemblies 1816, 1818 to pivot relative to the front frame 1812. As discussed above with respect to other examples, the front ends of the first and second pivot link assemblies 1816, 1818 may be mounted to a mounting portion 300 located along the down tube 1805 defining right and left mounting arms to which the first pivot link assembly 1816 and the second pivot link assembly 1818 are pivotally attached. Furthermore, the axes of rotation of the forward and rear links 1817, 1819, 1827, 1829 may form an angle that is between 0 and 90 degrees with respect to the longitudinal axis of the frame 1712 (i.e., the x-axis). In other examples, the axes of rotation may form an angle that is between 90 to 180 degrees with respect to the longitudinal axis of the frame and to the x-axis, or between 180 to 270 or 270 to 360 degrees with respect to the longitudinal axis of the frame and to the x-axis.

Similar to the example shown in FIGS. 17A-17J, the rocker link 1819 may have a dog bone-type structure, in which two parallel linkages 1880, 1881 are connected by a horizontal member 1882, that extends between the linkages 1880, 1881. The bottom ends of the linkages 1880, 1881 may be pivotally coupled to the right and left sides of the mounting portion 300 of the front frame 1812 (i.e., at fixed pivot point 1828). The top ends of the linkages 1880, 1881 may be pivotally coupled to the top ends of the front members 1857 of the right and left triangles 1852, 1854 of the rear frame (i.e., at pivot point 1830), as well as to the rear end of the shock assembly 1825 at pivot point 1830. As best shown in FIG. 18B, in one example, the top ends of the linkages 1880, 1881 are coupled to the opposing inner surfaces of the forward members 1757. However, in other examples, the linkages 1880, 1881 may be otherwise coupled to the triangles 1852, 1854. For example, the linkages 1880, 1881 may be coupled to the outer surfaces of the forward members 1857, along the length of the forward members 1857 (rather than at the top of the forward members 1857), along the chain stay 1859, or along the seat stay 1858.

As discussed above, the rear end of the shock assembly 1825 may be pivotally coupled to the front members 1857 of the triangles 1852, 1854, and to the top end of the rocker link 1819 at pivot point 1830. Similar to the example shown in FIGS. 17A-17J, the top end of the shock assembly 1825 may be pivotally coupled to the front frame at fixed pivot point 1898.

As mentioned above, and as best shown in FIGS. 18C, 18D, 18F, and 18G, compression of the shock 1825 in response to tension and/or compression forces applied by the rear frame 1814 causes the bracket 1870 to travel along a substantially linear vertical path as described above with respect to the example shown in FIGS. 17A-17J. At the same time, the top end of the link 1819, which is pivotally coupled to the bottom end of the shock 1825 and to the rear frame 1814, travels along an arcuate path as the link 1819 is rotated in a clockwise direction towards the cylinder body 1810.

The shock 1825 is also configured to pivot in relative to the front frame as the bottom end of the shock 1825 is moved along the arcuate path defined by the link 1819. At the same time, the portion of the rear frame 1814 coupled to the mounting bracket 1870 is configured to move upwardly along the linear path defined by the bracket 1870, and the portion of the rear frame 1812 coupled to the top end of the rocker link 1819 is configured to move along the arcuate path defined by the rocker link 1819, resulting in a wheel path that is slightly curved.

Figure 18A:
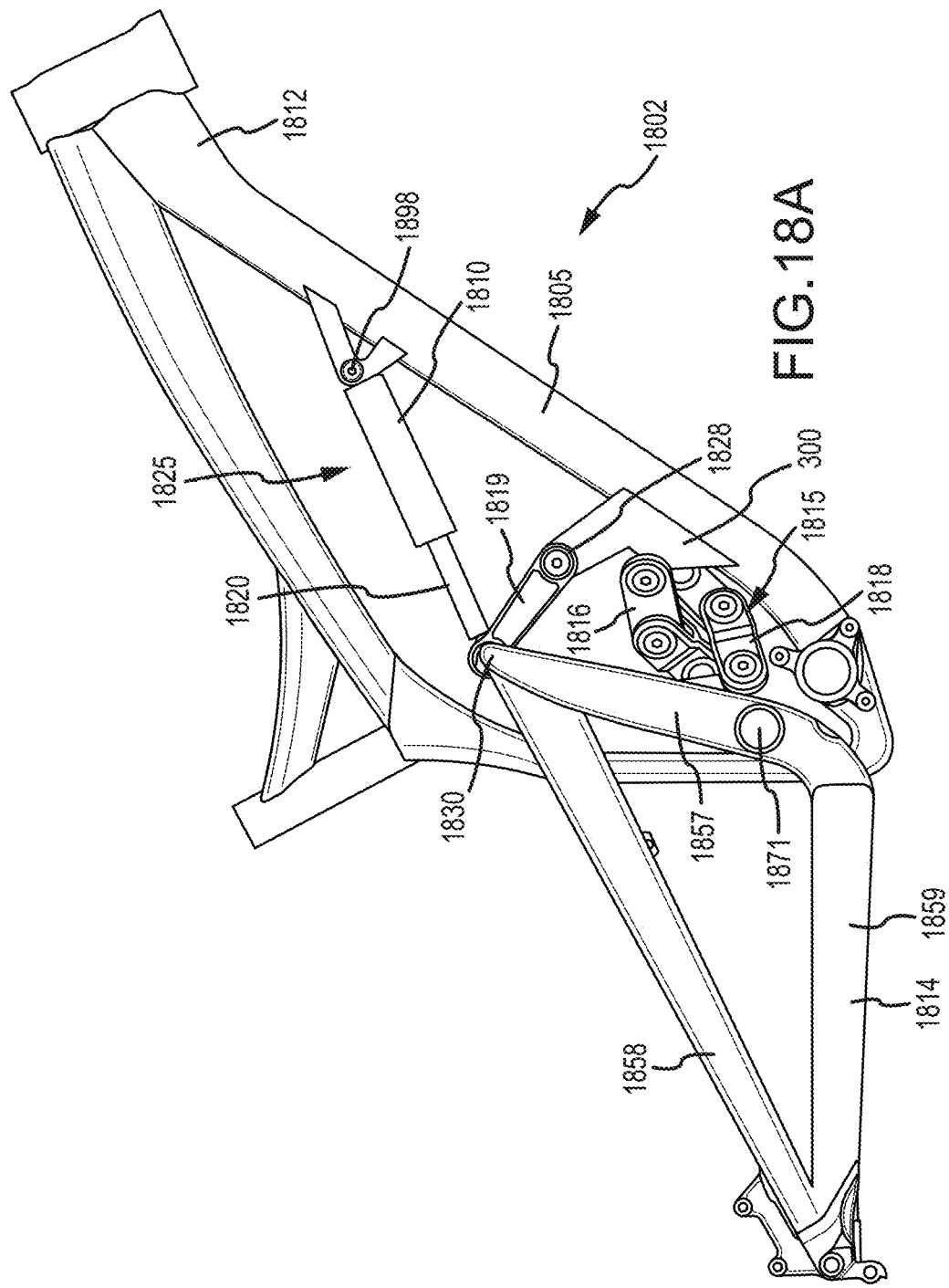
FIG. 18A is a right side view of a front frame and rear suspension system according to a fifth example of the present invention.
Figure 18B:
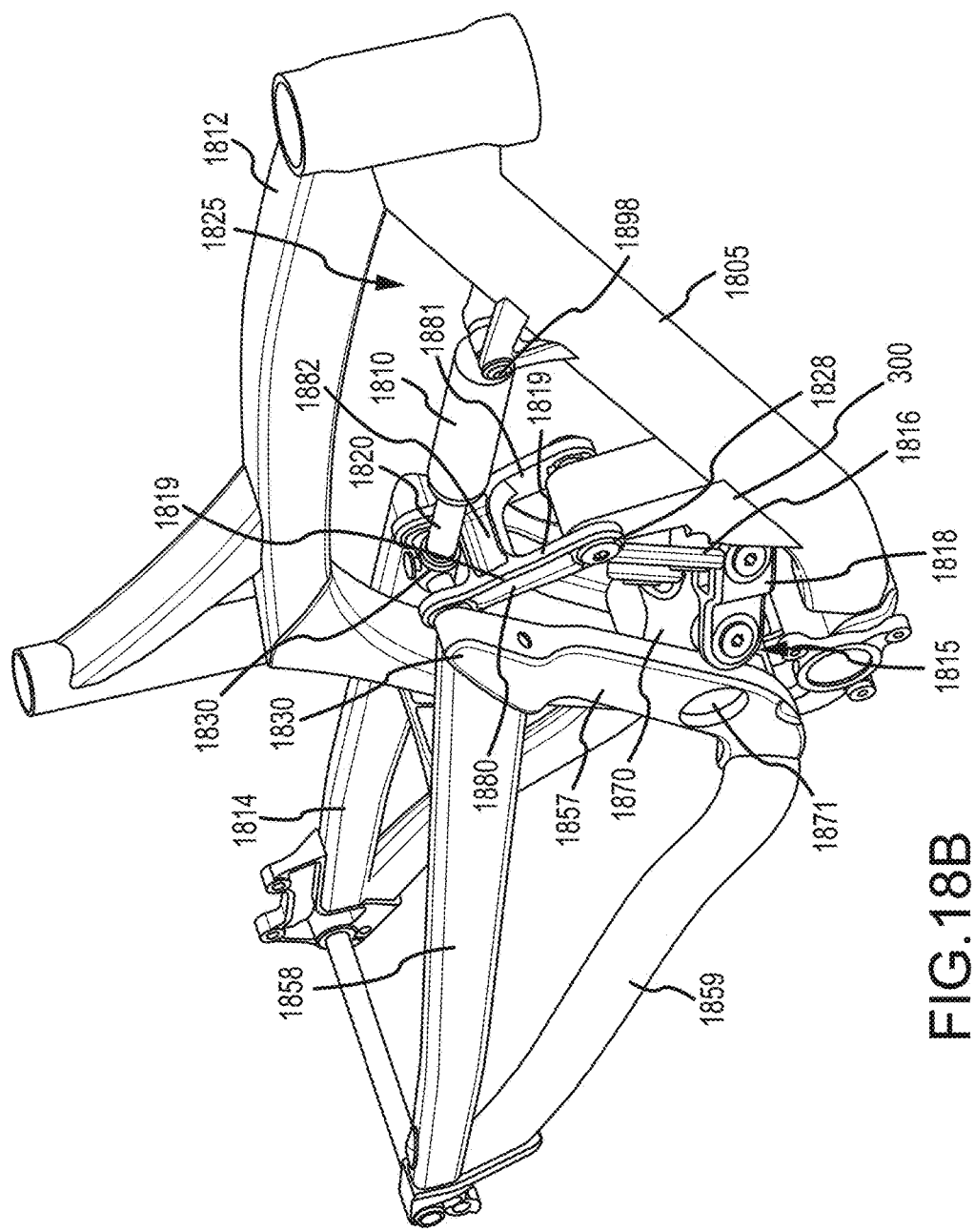
FIG. 18B is a right-front isometric view of the front frame and rear suspension system depicted in FIG. 18A.
Figure 18C:
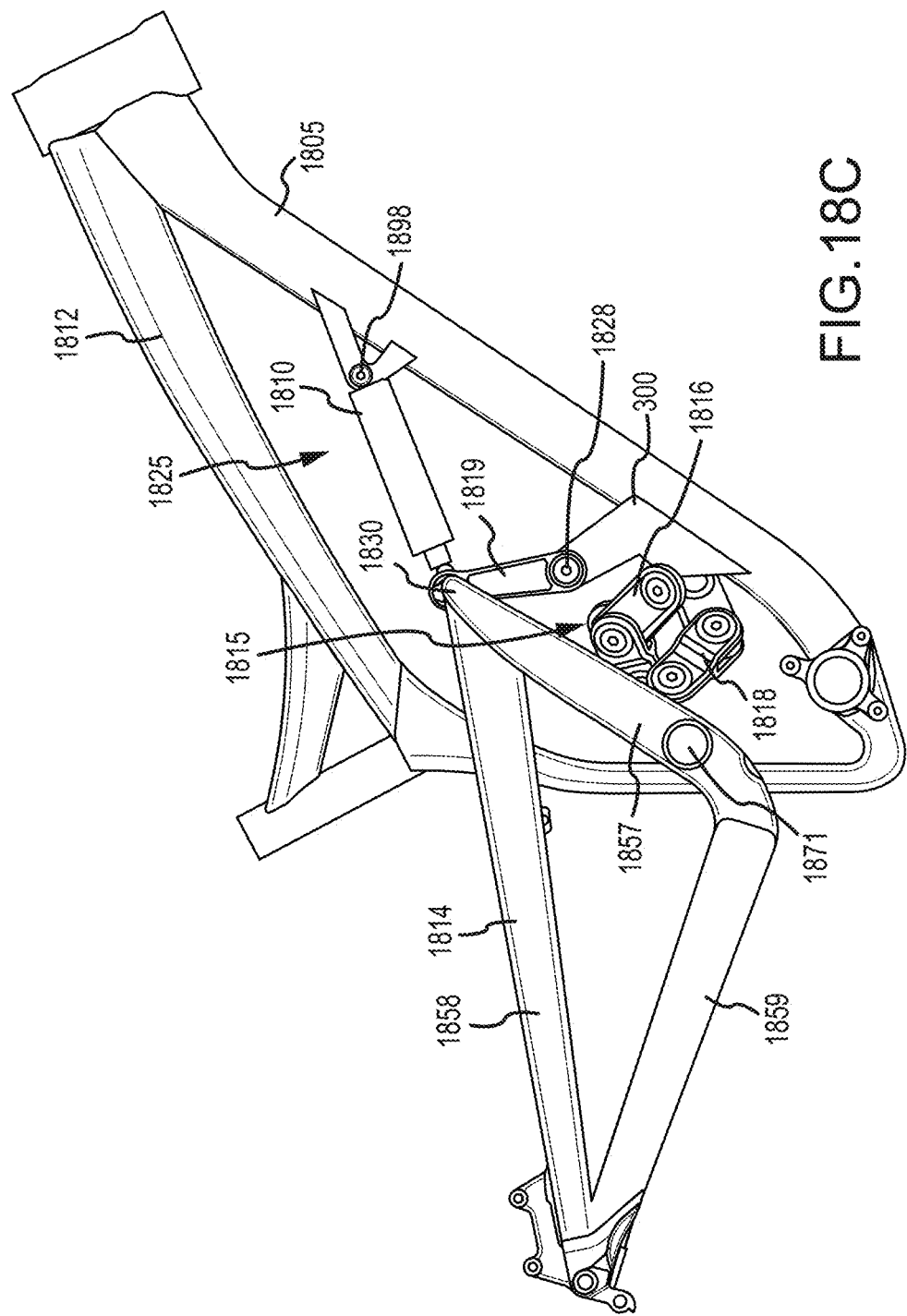
FIG. 18C is a right side view of the front frame and rear suspension system depicted in FIG. 18A in a fully compressed stage.
Figure 18D:
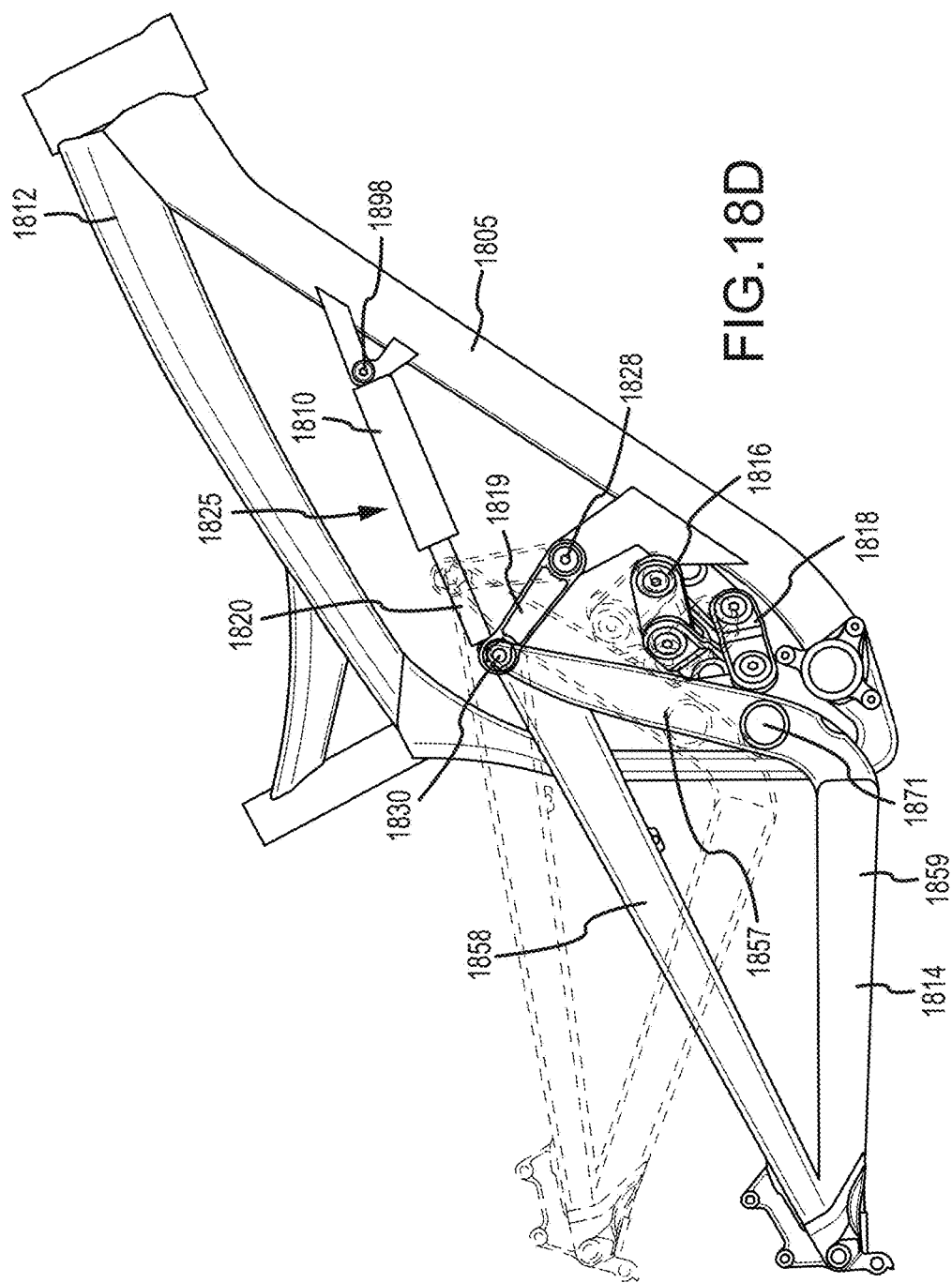
FIG. 18D is a right side view of the front frame and rear suspension system depicted in FIG. 18A in an uncompressed stage shown in solid lines, and in a fully compressed stage shown in dashed lines.

FIGS. 18F and 18G illustrate the motion of some of the pivot points 1830 and 1871 of the rear suspension system 1802 shown in FIGS. 18A-18G. A comparison of FIGS. 18F and 18G illustrates that pivot point 1830, which is located at the free end of the rocker link 1819, travels along an arcuate path around fixed pivot point 1828. The path is located a distance away from the fixed pivot point 1828 that is substantially equal to the distance between the fixed pivot point 1828 and the pivot point 1830. The end of the shock 1825, which is pivotally coupled to the rear frame 1814 and to the rocker link 1819 at pivot point 1830, also travels along this same arcuate path. As is also shown in FIGS. 18F and 18G, pivot point 1871, which is defined between the mounting bracket 1870 and the rear frame 1814, travels along a linear path that is defined by the pivot link assemblies 1816, 1818.

Another example of a rear suspension system is shown in FIGS. 19A-19G. This example is similar to the one shown in FIGS. 18A-18G in that the front and rear frames 1912, 1914 are coupled via a rocker link 1919. Similar to other examples, the rocker link 1919 may have a dog bone-type structure, in which two parallel linkages 1980, 1981 are connected by a horizontal member 1982 that extends between the linkages 1980, 1981.

In contrast to the example shown in FIGS. 18A-18G, however, the positions of the rocker link 1919 and the first and second pivot link assemblies 1916, 1918 are reversed. More particularly, the ends of the pivot link assemblies 1916, 1918 are pivotally coupled to the down tube 1905 and to a mounting bracket 1906 that is pivotally coupled to the rear end of the shock assembly 1925. As will be further discussed below, the mounting bracket 1906 is further coupled to the rear ends of the first and second pivot link assemblies 1916, 1918 and travels along a substantially linear path defined by the first and second pivot link assemblies 1916, 1918 as the shock 1925 is compressed. The top free end of the rocker link 1919 is pivotally coupled to the down tube 1905 at pivot point 1930, and the fixed end of the rocker link 1919 is pivotally coupled to the rear frame 1914 at pivot point 1928. In other examples, the pivot link assemblies 1916, 1918 may be directly joined to the rear end of the shock assembly 1925, rather than the mounting bracket 1906.

Figure 19B:
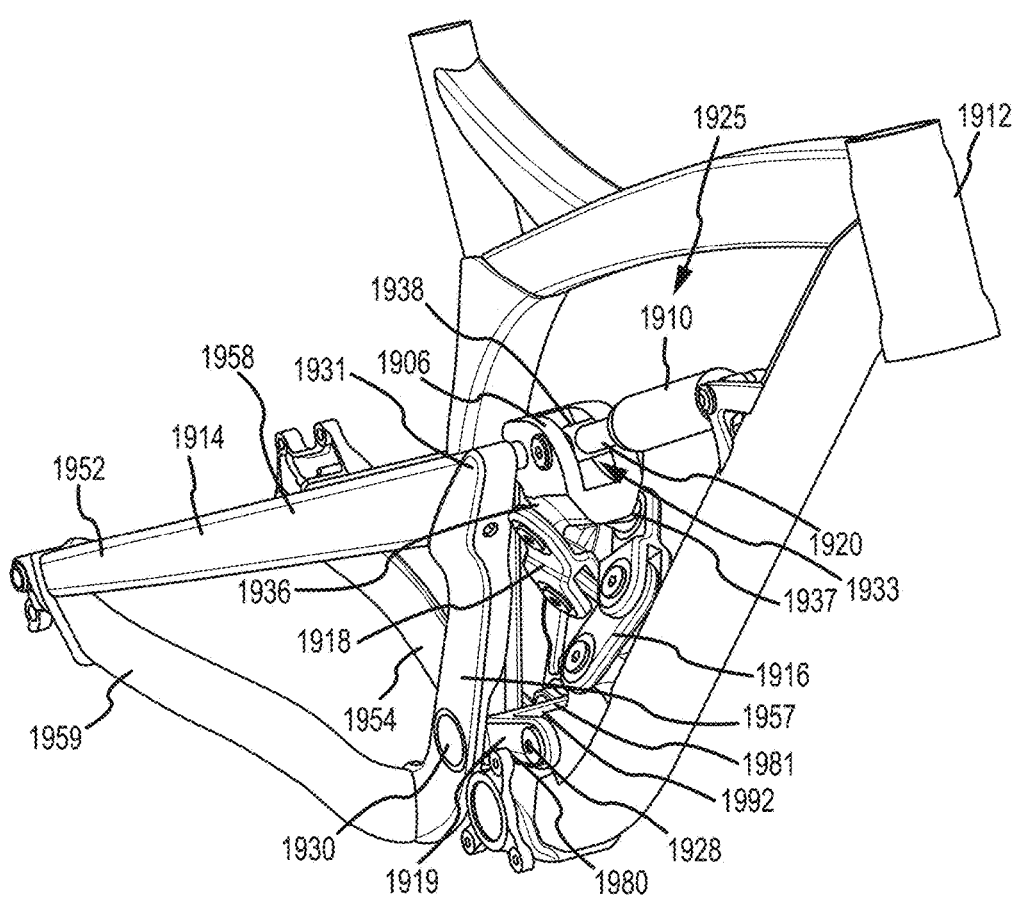
FIG. 19B is a right-front isometric view of the front frame and rear suspension system depicted in FIG. 19A.

As best shown in FIG. 19B, the mounting bracket 1906 defines two angled mounting arms 1936, 1937 to which the rear ends of the first and second pivot link assemblies 1916, 1918 are pivotally attached. As discussed above with respect to other examples, the axes of rotation of the forward and rear links 1917, 1919, 1927, 1929 may form an angle that is between 0 and 90 degrees with respect to the longitudinal axis of the front frame 1912 (i.e., the x-axis). In other examples, the axes of rotation may form an angle that is between 90 to 180 degrees with respect to the longitudinal axis of the frame and to the x-axis, or between 180 to 270 or 270 to 360 degrees with respect to the longitudinal axis of the frame and to the x-axis.

The mounting bracket 1906 may further define a slot 1933 configured to receive the rear end of the shock 1925, which may be pivotally attached to an axle 1938 that extends through the slot in a direction perpendicular to the longitudinal axis of the front frame 1912. The axis of rotation of the shock 1925 around the axle 1938 is illustrated on the mounting bracket 1906 as pivot point 1999. The mounting bracket 1906, which is pivotally coupled to each of the pivot link assemblies 1916, 1918, the shock 1925, and the front members 1957 of the rear frame 1914, thus functions similar to a small link system that interconnects these components and further guides the motion of the rear frame 1914.

Similar to other examples, the rear frame 1914 may include right and left triangles 1952, 1954 each defining a front member 1957, seat stay 1958, and chain stay 1959. The top ends of the front members 1957 may be pivotally attached to the mounting bracket 1906 at pivot point 1931, and the bottom ends of the front members 1957 may be pivotally attached to the top end of the rocker link at pivot point 1930.

As best shown in FIGS. 19C, 19D 19F, and 19G, compression of the shock 1925 in response to tension and/or compression forces applied by the rear frame 1914 causes the rocker link 1919 to rotate in a clockwise direction, such that the portion of the rear frame 1914 coupled to the link 1919 rotates upwardly along an arcuate path defined by the top end of the rocker link 1919. As discussed above, the rear frame 1914 is further coupled to the mounting bracket 1906, which, in turn, is coupled to the pivot link assemblies 1916, 1918 and to the rear end of the shock 1925. In this example, the transverse orientation of the link assemblies 1916, 1918 serves to confine any motion of the mounting bracket 1906 and the attached piston shaft 1920 to a substantially linear path having limited, if any, curvature. Additionally, in the illustrated embodiment, the shock 1925 is oriented such that it is substantially parallel to the linear path defined by the link assemblies 1916, 1918. Since the piston shaft 1920 is being pushed into the cylinder body 1910 along a path that is substantially parallel to the linear path defined by the pivot link assemblies 1916, 1918, the orientation of the shock 1925 only changes minimally, if at all, relative to the front frame 1914 as the shock 1925 is compressed and uncompressed.

In other examples, the shock may be directly coupled to the rear frame 1914 and to the pivot link assemblies 1916, 1918, rather to the mounting bracket 1906. Additionally, in other examples, the shock 1925 may be oriented at an angle with respect to the linear path defined by the pivot link assemblies 1916, 1918.

FIGS. 19F and 19G illustrate the motion of some of the pivot points 1931, 1999, and 1930 of the rear suspension system 1902 shown in FIGS. 19A-19G. A comparison of FIGS. 19F and 19G illustrates that pivot point 1930, which is located at the free end of the rocker link 1919, travels along an arcuate path around fixed pivot point 1928. The path is located a distance away from the fixed pivot point 1928 that is substantially equal to the distance between the fixed pivot point 1928 and the pivot point 1930. In contrast, the pivot point 1999 between the mounting bracket 1906 and the end of the shock 1925 and the pivot point 1931 between the mounting bracket 1906 and the rear frame 1914 travel along a linear path that is defined by the pivot link assemblies 1916, 1918.

In another example, illustrated in FIGS. 20A-20G, the swing link 2019 may be attached to the front frame such that it rotates in a counterclockwise, rather than a clockwise direction. This example is substantially similar to the example shown in FIGS. 19A-19G, but it includes a swing link 2019 that is fixedly and pivotally attached at one end to the seat tube 2073 of the front frame 2012. As shown in FIGS. 20A-20G, the free end of the swing link 2019 is pivotally coupled to the front members 2027 of the front members 2057 of the right and left rear triangles 2052, 2054, and rotates along an arcuate path in response to tension and/or compression forces applied by the rear frame 2014.

Figure 20B:
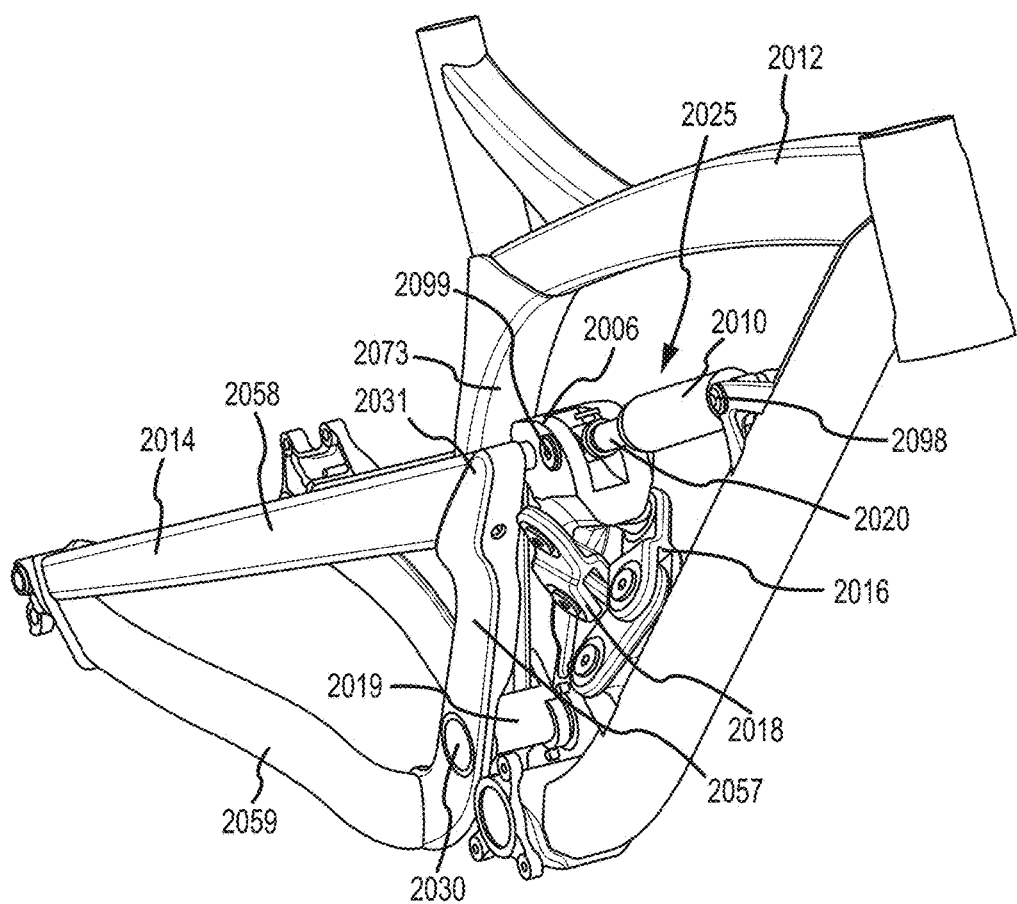
FIG. 20B is a right-front isometric view of the front frame and rear suspension system depicted in FIG. 20A.
Figure 20D:
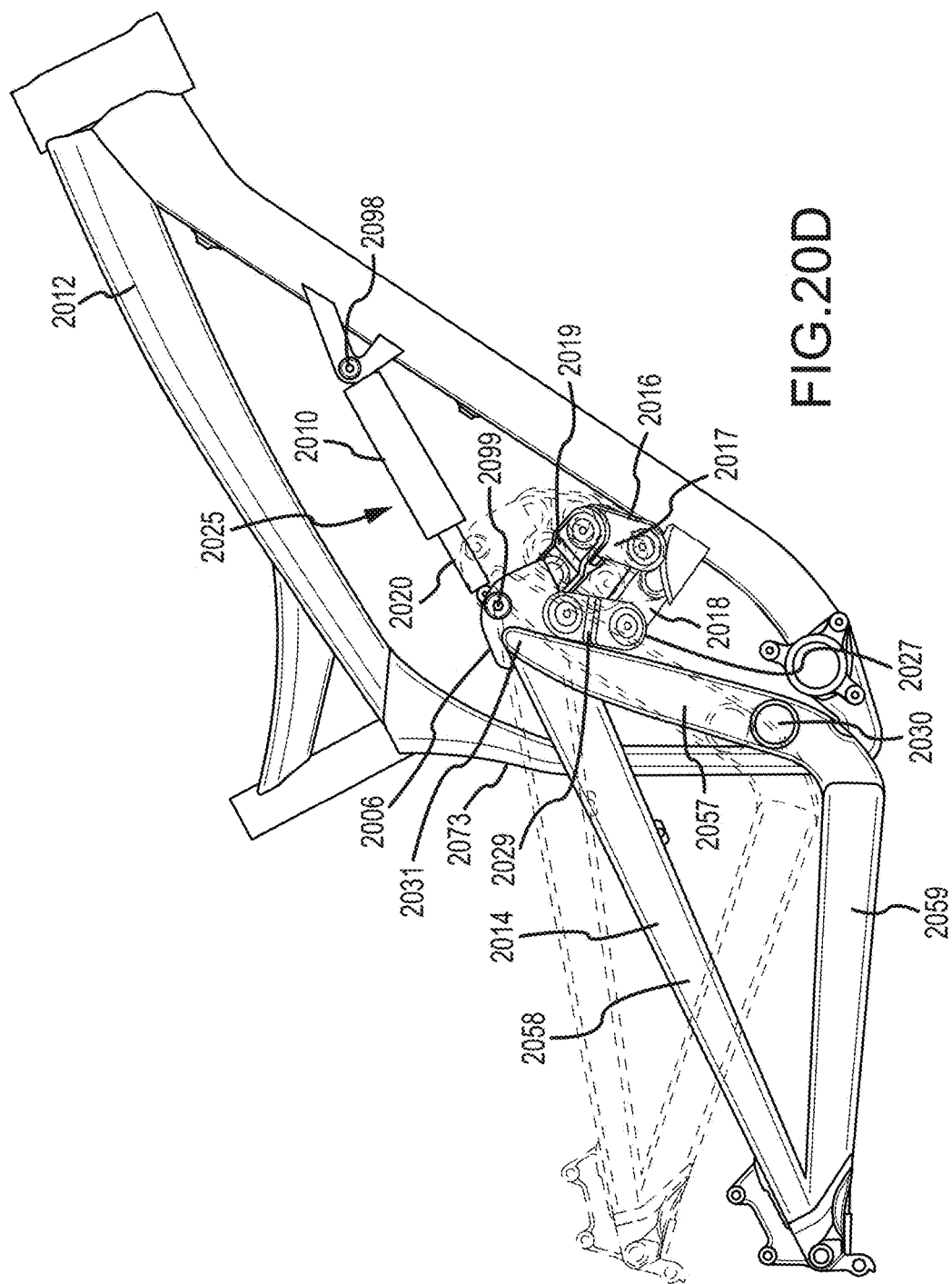
FIG. 20D is a right side view of the front frame and rear suspension system depicted in FIG. 20A in an uncompressed stage shown in solid lines, and in a fully compressed stage shown in dashed lines.
Figure 20E:
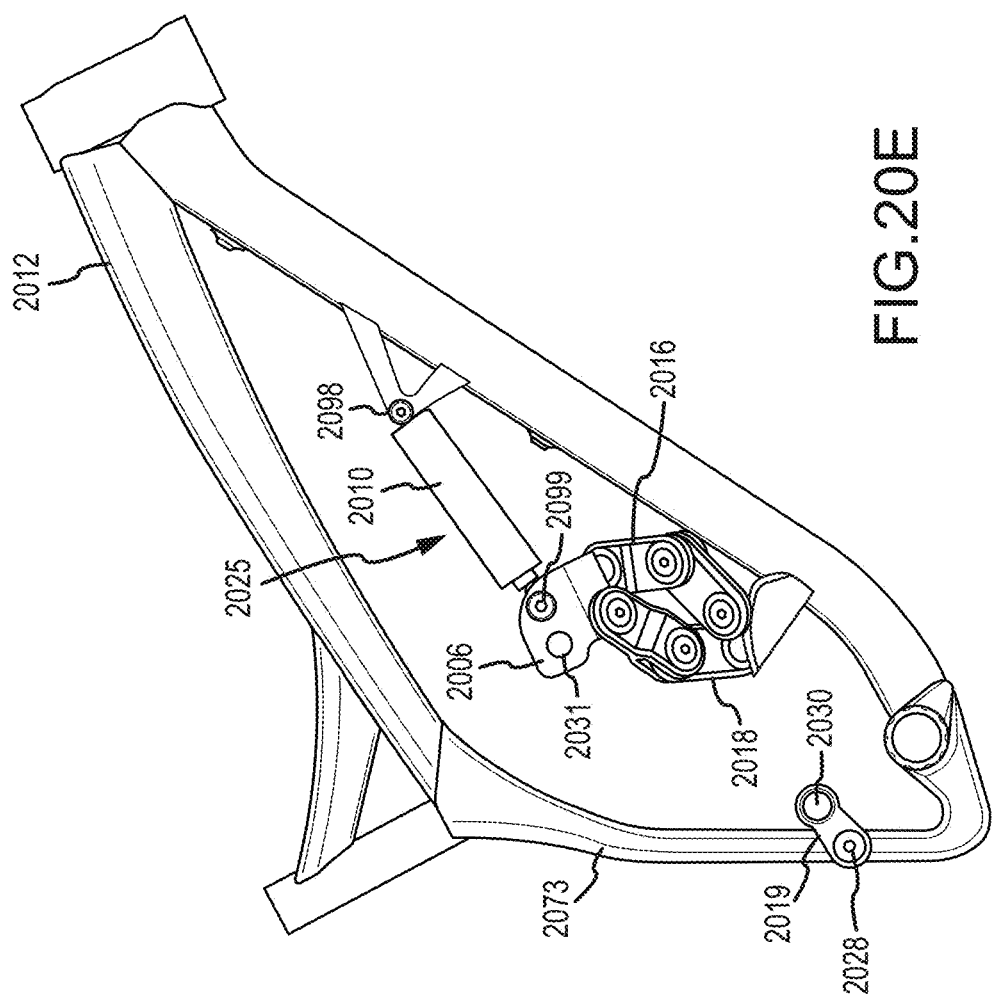
FIG. 20E is a right side view of the front frame depicted in FIG. 20A in a fully compressed stage.

Similar to the example shown in FIGS. 19A-19G, the example shown in FIGS. 20A-20G also utilizes a mounting bracket 2006 that serves to interconnect each of the pivot link assemblies 2016, 2018, the shock 2025, and the front members 2057 of the rear frame 2014, and guide the motion of the rear frame 2014. As best shown in FIG. 20B, the bracket 2006 defines two angled mounting arms 2036, 2037 to which the rear ends of the first and second pivot link assemblies 2016, 2018 are pivotally attached. The mounting bracket 1906 may further define a slot 2033 configured to receive the rear end of the shock 2025, which may be pivotally attached to an axle 2038 that extends through the slot 2033 in a direction perpendicular to the longitudinal axis of the front frame 2012. The axis of rotation of the shock 2025 around the axle 2038 is illustrated on the mounting bracket 2006 as pivot point 2099.

As best shown in FIGS. 20C, 20D, 20F, and 20G compression of the shock 2025 in response to tension and/or compression forces applied by the rear frame 2014 causes the swing link 2019 to rotate in a counterclockwise direction, such that the end of the link 2019 coupled to the rear frame 2014 travels upwardly with the rear frame 2014. Similar to the example shown in FIGS. 19A-19G, the rear frame 2014 is further coupled to a mounting bracket 2006 which, in turn, is coupled to the rear end of the shock 2025 and to the free ends of the first and second pivot link assemblies 2016, 2018, which serve to confine the motion of the mounting bracket 2006 and the attached piston shaft 2020 to a substantially linear travel path. As the shock is compressed, the portion of the rear frame 2014 attached to the free end of the link 2019 is configured to travel upwardly along the arcuate path defined by the link 2014, and the portion of the rear frame 2014 coupled to the mounting bracket 2006 is configured to travel along the linear path defined by first and second pivot link assemblies 2016, 2018. The motion of the rear frame 2014 is best illustrated in FIGS. 20F and 20G.

FIGS. 20F and 20G illustrate the motion of some of the pivot points 2031, 2099, and 2030 of the rear suspension system 2002 shown in FIGS. 20A- 20G. A comparison of FIGS. 20F and 20G illustrates that pivot point 2030, which is located at the free end of the swing link 2019, rotates along an arcuate path around fixed pivot point 2028. The path is located a distance away from the fixed pivot point 2028 that is substantially equal to the distance between the fixed pivot point 2028 and the pivot point 2030. In contrast, the pivot point 2099 between the mounting bracket 2006 and the end of the shock 2025 and the pivot point 2031 between the mounting bracket 2006 and the rear frame 2014 both travel along a linear path that is defined by the pivot link assemblies 2016, 2018.

Figure 21A:
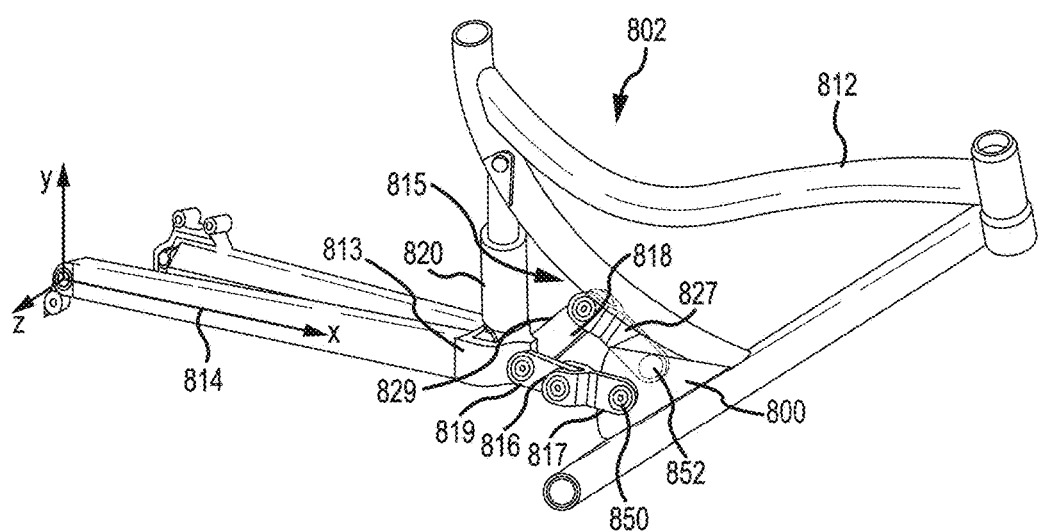
FIG. 21A is a right-front isometric view of a front frame and rear suspension system according to an eighth example of the present invention.
Figure 21B:
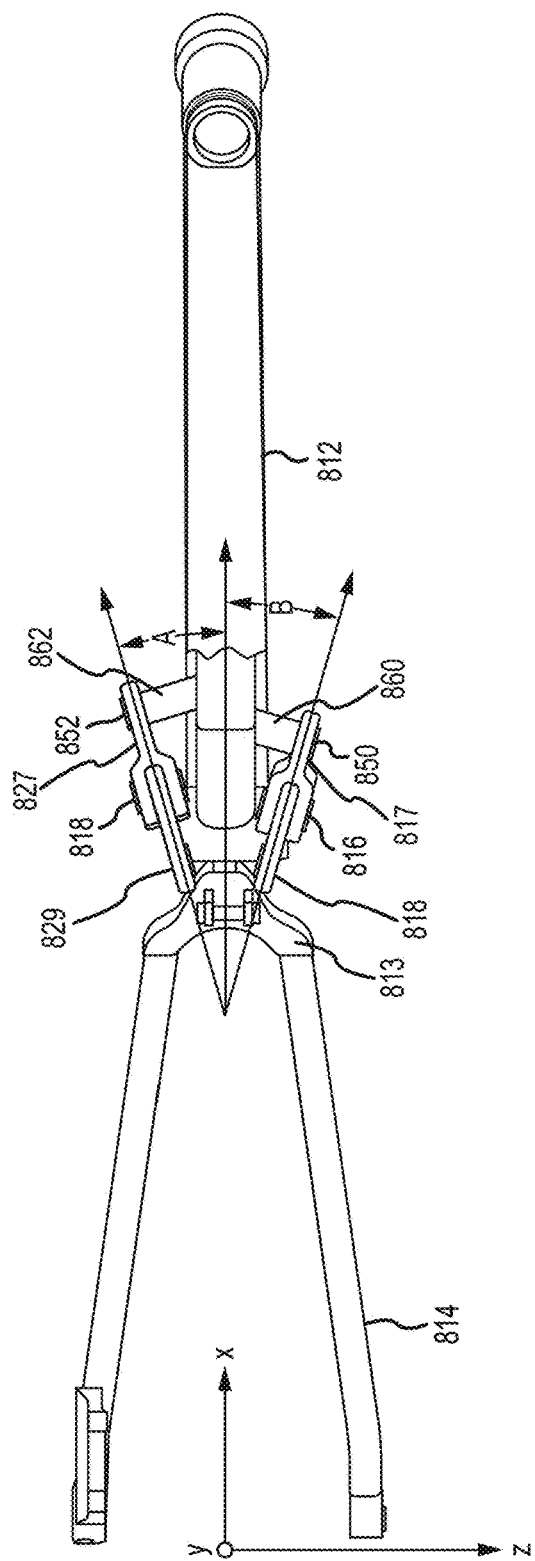
FIG. 21B is a top view of the front frame and rear suspension system of the front frame and rear suspension system depicted in FIG. 21A with the seat tube and top bracket partially removed.

Another example of the rear suspension system 802 is shown in FIGS. 21A and 21B. As shown in FIG. 21A, the fourth example may include a swingarm 814 coupled with the front frame 712 through a link suspension system 815 including a first pivot link assembly 816, a second pivot link assembly 818, and a shock assembly 820, which may be pivotally attached between the front frame 812 and the swingarm 814. Similar to the example shown in FIG. 15, this example may include first and second pivot link assemblies 816, 818 that are positioned in a v-shaped configuration. Accordingly, in this example, the pivot link assemblies 816, 818 are not crossed, and instead extend at angles away from the longitudinal axis of the frame 814.

As shown in FIG. 21A, the first and second pivot link assemblies 816, 818 may not have to be the same length. For example, the first pivot link assembly 816 may have a longer or shorter overall length than the second pivot link assembly 818. In one example, the forward link 817 of the first pivot link assembly 816 may be longer or shorter than the forward link 827 of the second pivot link assembly 818, and the rear link 819 of the first pivot link assembly 816 may be longer or shorter than the rear link 829 of the second pivot link assembly 818. In other examples, the forward and rear links 817, 819 of the first pivot link assembly 816 may have different lengths, and the forward and rear links 827, 829 of the second pivot link assembly 818 may have different lengths. Similar to other examples, the forward ends of the pivot link assemblies 816, 818 may be pivotally coupled to right and left mounting arms 860, 862 which extend at angles from a triangular-shaped mounting portion 800 of the front frame 812. The rear ends of the pivot link assemblies 816, 818 may be attached to angled mounting surfaces defined on a mounting portion 813 located at the front end of the swingarm 814. Furthermore, the axes of rotation of the forward and rear links 817, 819, 827, 829 define an angle that is between 0 and 90 degrees with respect to the longitudinal axis of the frame 812 (i.e., the x-axis). In other examples, axes of rotation may form an angle that is between 90 to 180 degrees with respect to the longitudinal axis of the frame and to the x-axis, or between 180 to 270 or 270 to 360 degrees with respect to the longitudinal axis of the frame and to the x-axis.

The pivot points of the first and second pivot link assemblies 816, 818 also may not be aligned along any particular axis. As best shown in FIG. 21B, for example, the front pivot point 852 of the second pivot link assembly 818 and the front pivot point 850 of the first pivot link assembly 816 may be positioned at different points along the x-axis so that the front pivot point 852 of the second pivot link assembly 818 is positioned in front of (or behind) the front pivot point 850 of the first pivot link assembly 816. Similarly, as best shown in FIG. 21A, the front pivot point 852 of the second pivot link assembly 818 and the front pivot point 850 of the first pivot link assembly 816 may be positioned at different points along the y-axis so that the front pivot point 852 of the second pivot link assembly 818 is positioned above (or below) the front pivot point 850 of the first pivot link assembly 816. In other examples, the rear and central pivot points of the first and second pivot link assemblies 816, 818 may be similarly offset.

To maintain a substantially vertical rear wheel travel path, the angle A formed between the second pivot link assembly 818 and the front frame 812 may be substantially equal to the angle B formed between the first pivot link assembly 816 and the frame 812. This may serve to prevent side-to-side wobbling of the swingarm 814 along the z-axis, even when the link assemblies 816, 818 are not the same length, or when the link assemblies 816, 818 are positioned in front of or behind one another.

Figure 22A:
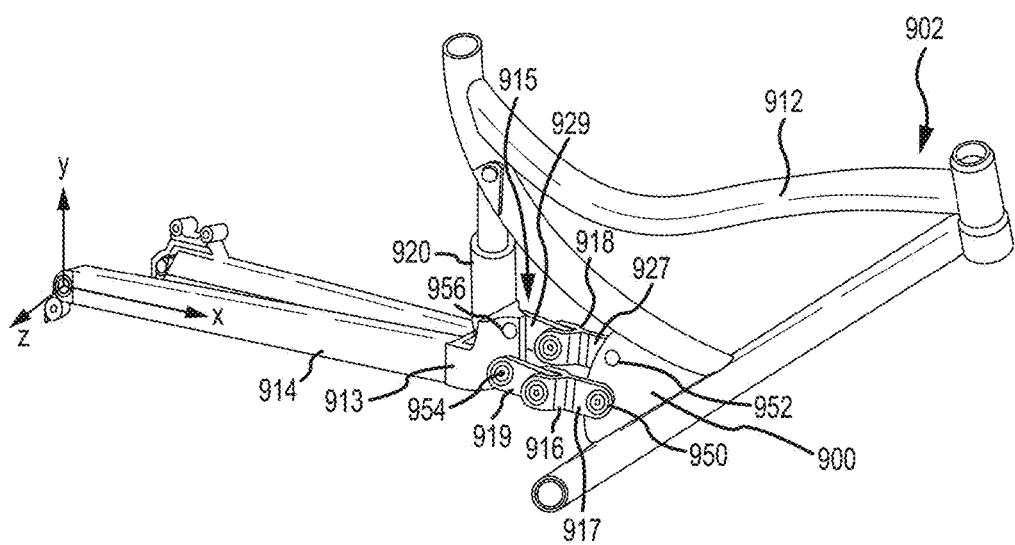
FIG. 22A is a right-front isometric view of a front frame and rear suspension system according to a ninth example of the present invention.
Figure 22B:
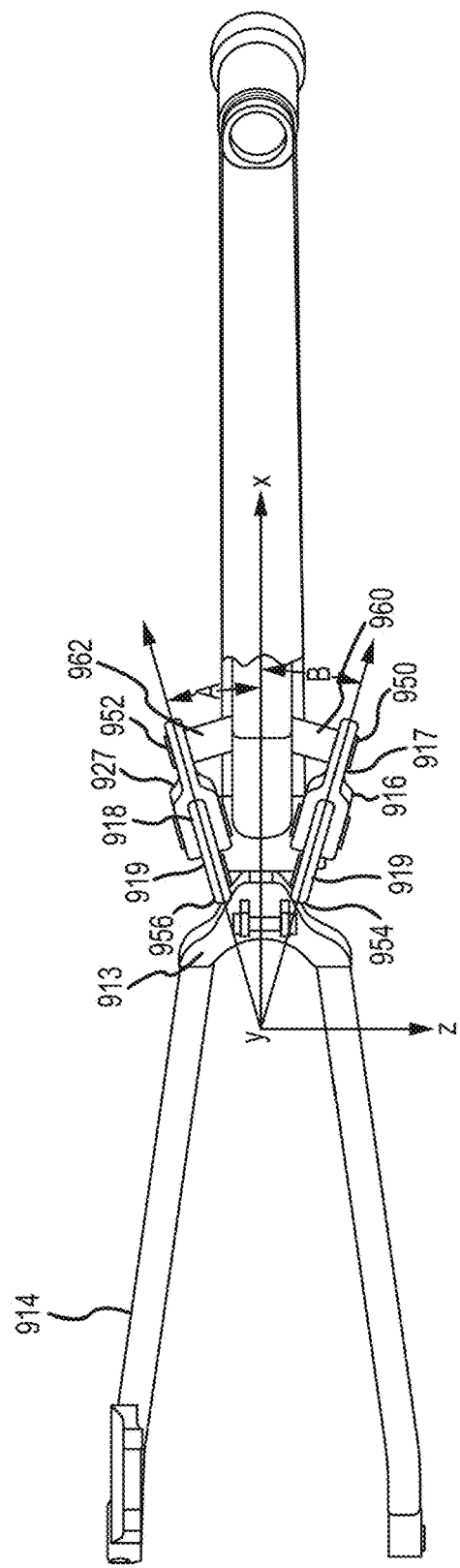
FIG. 22B is a top view of the front frame and rear suspension system of the front frame and rear suspension system depicted in FIG. 22A with the seat tube and top bracket partially removed.

Another example of the rear suspension system 902 is shown in FIGS. 22A and 22B. As shown in FIG. 22A, this example may include a swingarm 914 coupled with the front frame 912 through a link suspension system 915 including a first pivot link assembly 916, a second pivot link assembly 918, and a shock assembly 920, which may be pivotally coupled between the front frame 912 and the swingarm 914. Similar to the example shown in FIG. 15 and to the example shown in FIGS. 21A and 21B, the first and second pivot link assemblies 916, 918 may be uncrossed.

Both the front pivot points 950, 952 and rear pivot points 954, 956 of the first and second pivot link assemblies 916, 918 may be vertically offset from one another so that the first and second pivot link assemblies 916, 918 do cross or overlap along the y-axis. For example, as shown in FIG. 22A, the front pivot point 952 of the second pivot link assembly 918 and the front pivot point 950 of the first pivot link assembly 916 may be positioned at different points along the y-axis so that the front pivot point 952 of the second pivot link assembly 918 is positioned above (or below) the front pivot point 950 of the first pivot link assembly 916. Similarly, the rear pivot point 956 of the second pivot link assembly 918 and the rear pivot point 954 of the first pivot link assembly 916 may be positioned at different points along the y-axis so that the rear pivot point 956 of the second pivot link assembly 918 is positioned above (or below) the rear pivot point 954 of the first pivot link assembly 916.

Referring to FIG. 22B, the angle A formed between the second pivot link assembly 918 and the front frame 912 may be substantially equal to the angle B formed between the first pivot link assembly 916 and the frame 912. This may serve to maintain a substantially vertical rear wheel travel path, while preventing side-to-side wobbling of the swingarm 914 along the z-axis, even when the first and second pivot link assemblies 916, 918 are vertically offset. Similar to other examples, the forward ends of the pivot link assemblies 916, 918 may be pivotally coupled to right and left mounting arms 960, 962 which extend at angles from a triangular-shaped mounting portion 900 of the front frame 912. The rear ends of the pivot link assemblies 916, 918 may be attached to angled mounting surfaces defined on a mounting portion 913 located at the front end of the swingarm 914. Furthermore, the axes of rotation of the forward and rear links 917, 919, 927, 929 may form an angle that is between 0 and 90 degrees with respect to the longitudinal axis of the frame 912 (i.e., the x-axis). In other examples, the axes of rotation may form an angle that is between 90 to 180 degrees with respect to the longitudinal axis of the frame and to the x-axis, or between 180 to 270 or 270 to 360 degrees with respect to the longitudinal axis of the frame and to the x-axis.

Figure 23D:
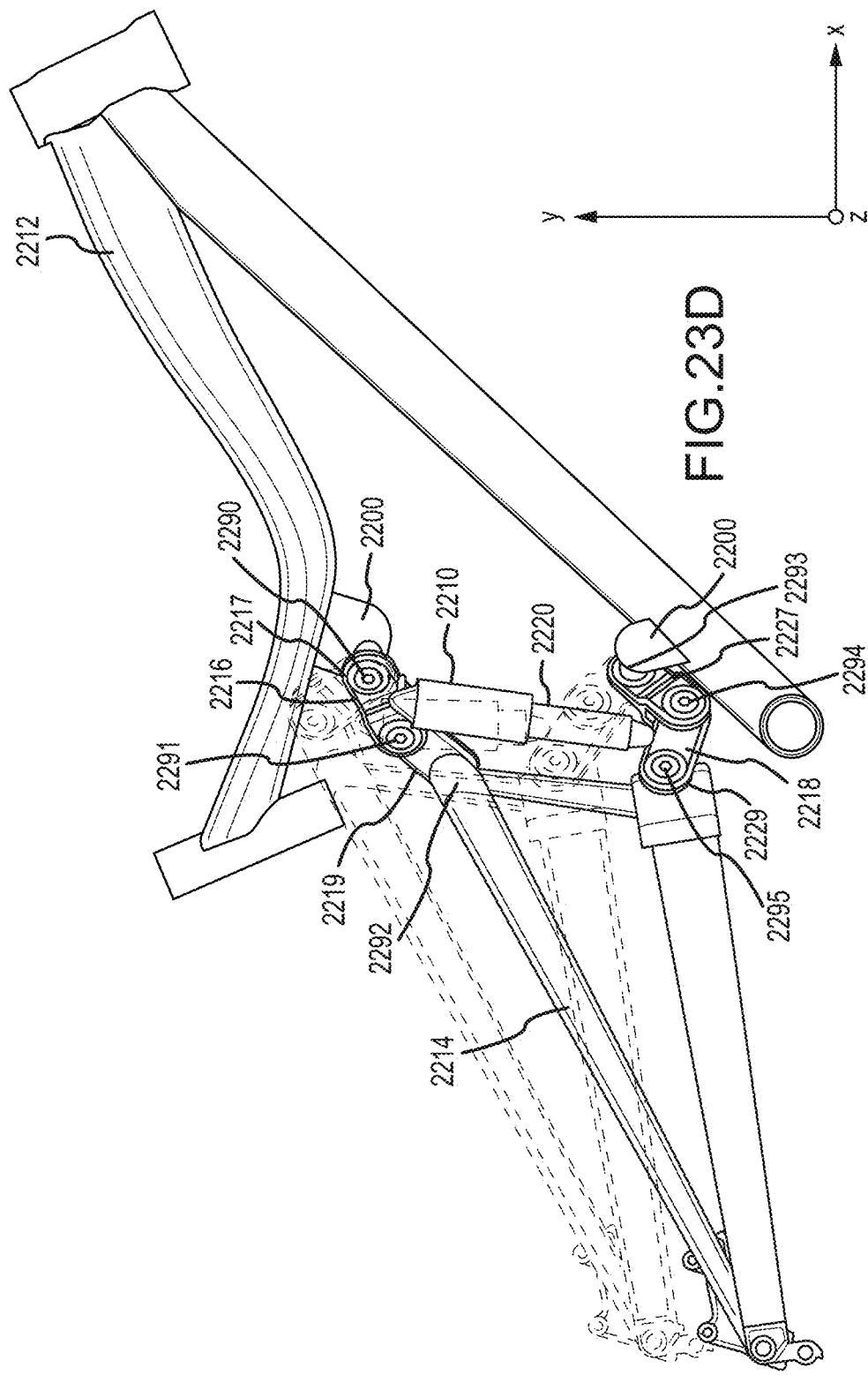
FIG. 23D is a right side view of the front frame and rear suspension system depicted in FIG. 23A in an uncompressed stage shown in solid lines, and in a fully compressed stage shown in dashed lines.
Figure 23G:
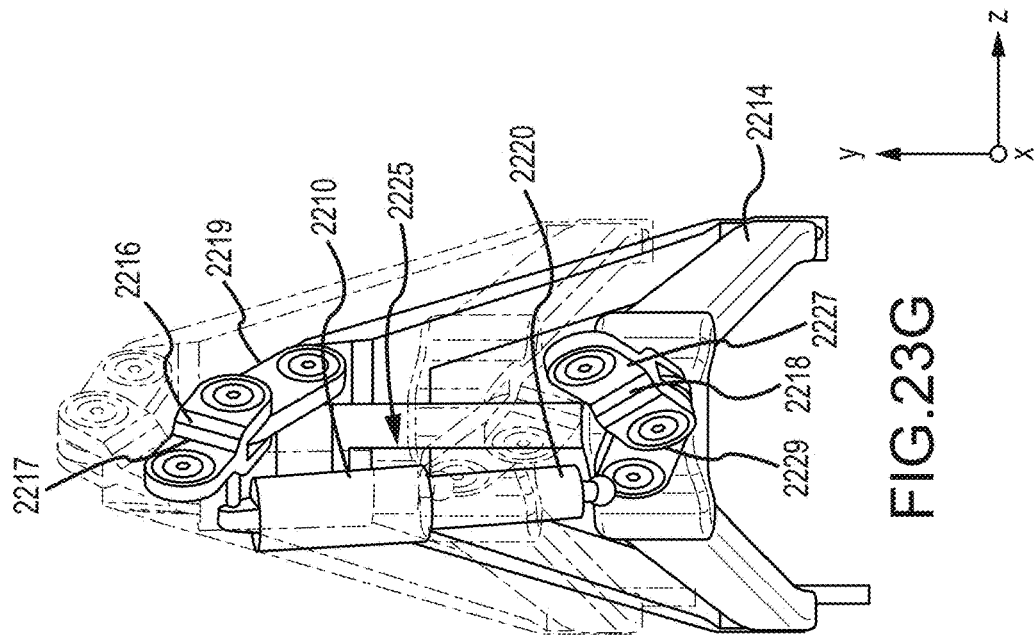
FIG. 23G is a front view of the front frame and rear suspension system depicted in FIG. 23A in an uncompressed stage shown in solid lines, and in a fully compressed stage shown in dashed lines.
Figure 23F:
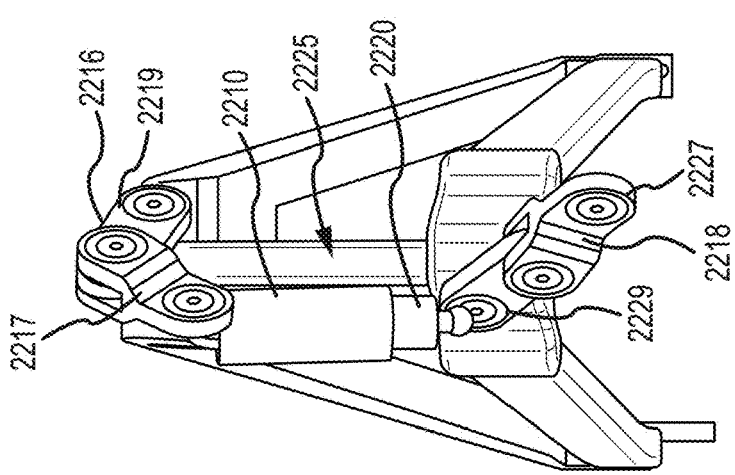
FIG. 23F is a front view of the front frame and rear suspension system depicted in FIG. 23A in a fully compressed stage.
Figure 23E:
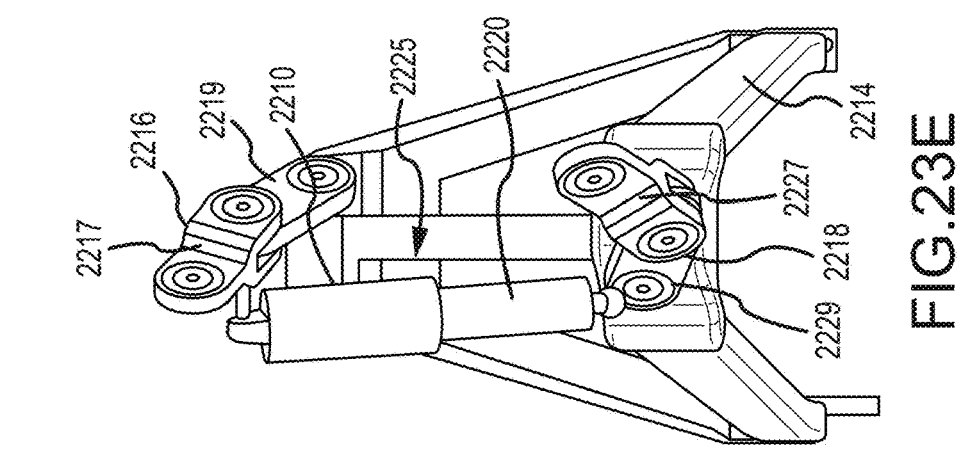
FIG. 23E is a front view of the front frame and rear suspension system depicted in FIG. 23A in an uncompressed stage.
Figure 23H:
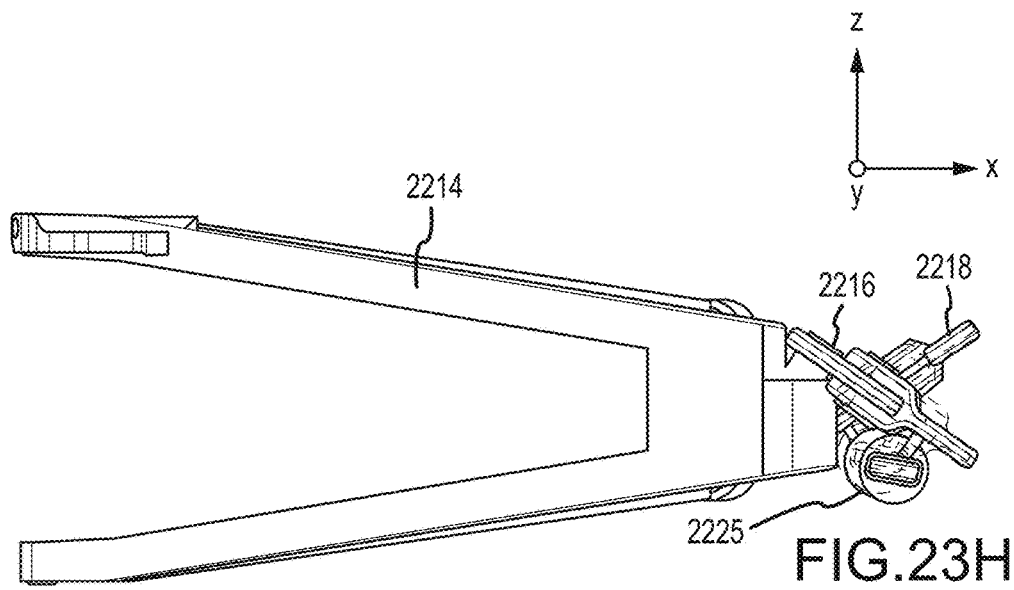
FIG. 23H is a top down view of the front frame and rear suspension system depicted in FIG. 23A in an uncompressed stage shown in solid lines, and in a fully compressed stage shown in dashed lines.
Figure 23I:
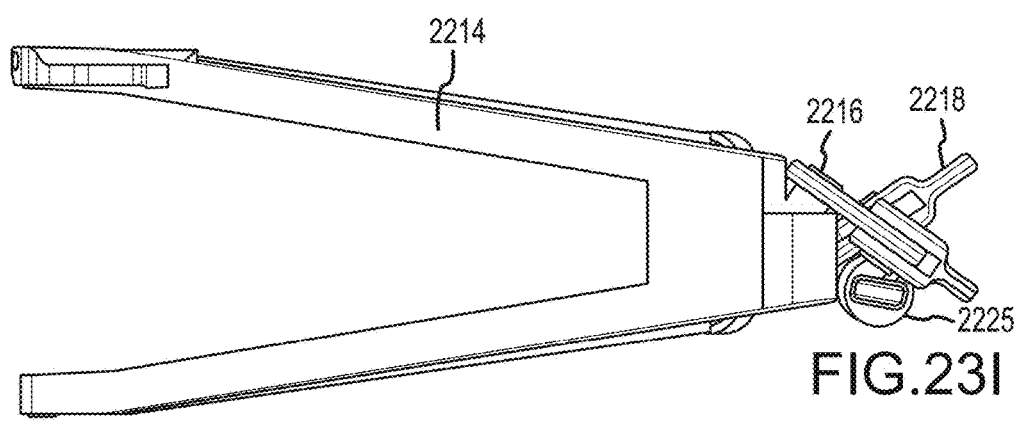
FIG. 23I is a top down view of the front frame and rear suspension system depicted in FIG. 23A in a fully compressed stage.
Figure 23J:
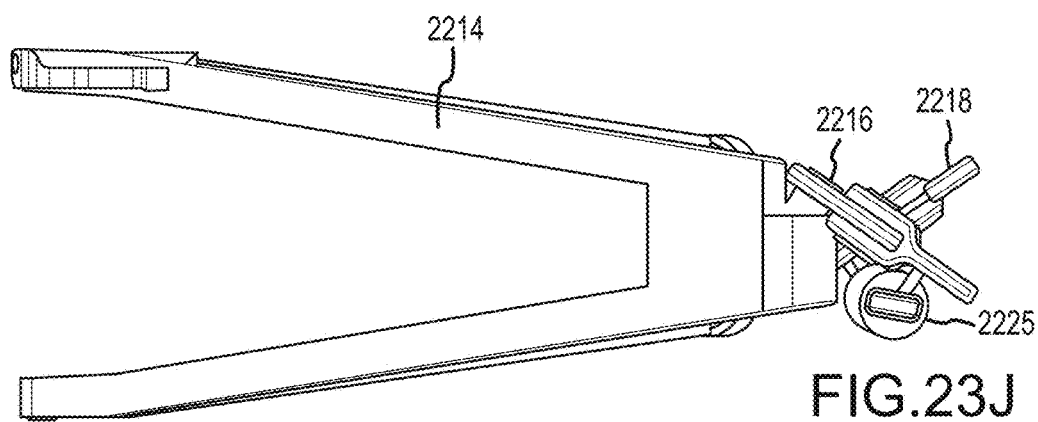
FIG. 23J is a front view of the front frame and rear suspension system depicted in FIG. 23A in an uncompressed stage.
Figure 23M:
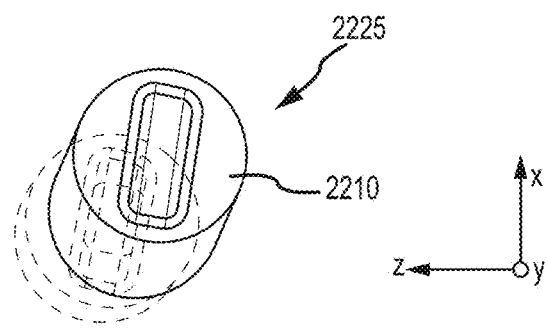
FIG. 23M is a top view of the front frame and rear suspension system depicted in FIG. 23A in an uncompressed stage shown in solid lines, and in a fully compressed stage shown in dashed lines.
Figure 23N:
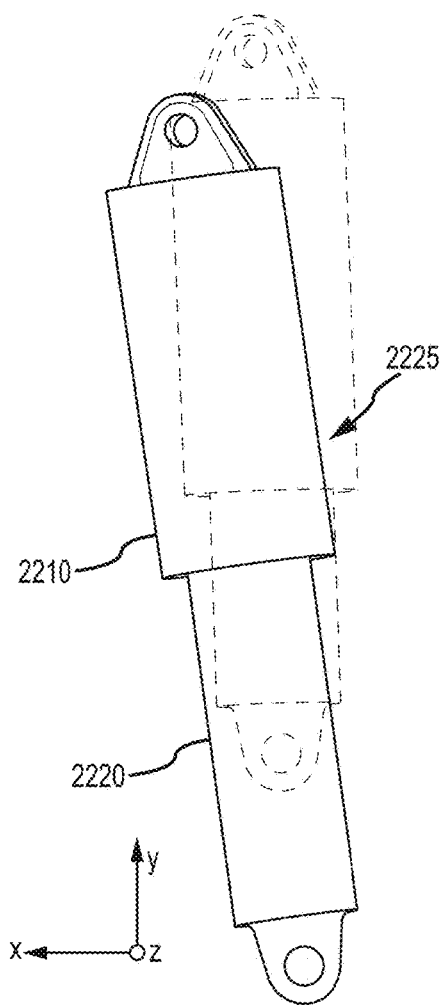
FIG. 23N is a left side view of the front frame and rear suspension system depicted in FIG. 23A in an uncompressed stage shown in solid lines, and in a partially compressed stage shown in dashed lines.
Figure 23O:
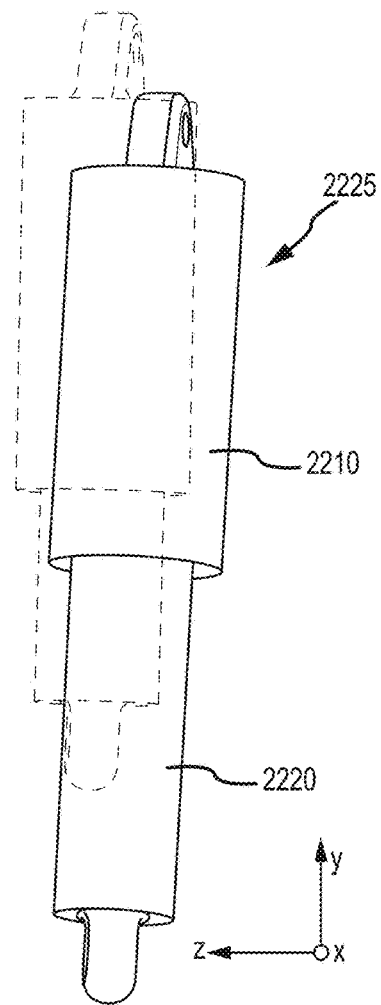
FIG. 23O is a rear view of the front frame and rear suspension system depicted in FIG. 23A in an uncompressed stage shown in solid lines, and in a partially compressed stage shown in dashed lines.

Another example of the rear suspension system 2202 is shown in FIGS. 23A-23O. In this example, the top and bottom ends of a floating shock assembly 2225 may be attached between the first and second pivot link assemblies 2216, 2218 of a link suspension system 2215. As shown in FIGS. 23A-23O, this example may include a swingarm 2214 coupled with the front frame 2212 through a link suspension system 2215 including a first pivot link assembly 2216, a second pivot link assembly 2218, and a floating shock assembly 2225. The top end of the floating shock assembly 2225 (i.e., the top end of the cylinder 2210) is joined to the first pivot link assembly 2216 and the bottom end of the floating shock assembly 2225 (i.e., the bottom end of the piston shaft 2220) is joined to the second pivot link assembly 2218. As shown in this particular example, the top end of the floating shock assembly 2225 is joined to the forward link 2217 of the first pivot link assembly 2216, and the bottom end of the floating shock assembly 2225 is joined to the rear link 2229 of the second pivot link assembly 2218. Both the top and bottom ends of the floating shock assembly 2225 are configured to move with the links 2217, 2219, 2227, 2229 of the first and second pivot link assemblies 2216, 2218 to which they are joined as the floating shock 2225 is compressed. In other words, the top end of the floating shock 2225 is configured to move along a path defined by the forward link 2217 of the first pivot link assembly 2216, and the bottom end of the floating shock 2225 is configured to move along a path defined by the rear link 2229 of the second pivot link assembly 2218. Similar to other examples, the forward and rear links 2217, 2219, 2229, 2227 of the first and second pivot link assemblies 2216, 2218 are further configured to pivot relative to one another around pivot points 2291, 2294 defined between the links 2217, 2219, 2229, 2227.

The pivot link assemblies 2216, 2218 extend at angles from mounting portions 2200 defined by the top and down tubes of the front frame 912. In one example, each mounting portion 2200 may define a mounting arm 2201, 2203 to which the forward ends of the link assemblies 2216, 2218 are pivotally coupled. The rear ends of the pivot link assemblies 2216, 2218 may be attached to angled mounting surfaces defined on the top and bottom ends of the forward member 2257 of the rear frame 2214. As shown in FIG. 23A, the rear frame 2214 may define right and left triangles 2252, 2254 that extend rearwardly at angles away from the forward member 2257.

Similar to other embodiments, the axes of rotation or pivot points 2290, 2291, 2292, 2293, 2294, 2295 of the forward and rear links 2217, 2219, 2227, 2229 may form an angle that is between 0 and 90 degrees with respect to the longitudinal axis of the frame 2212 (i.e., the x-axis). As previously discussed with respect to FIG. 5, each link assembly 2216, 2218 defines a plane that defines an angle relative to and intersects the longitudinal axis of the front frame 2212. The top and bottom ends of the floating shock 2225, which are joined to the links 2217, 2219, 2229, 2227 also move along respective travel paths that are parallel to the planes defined by the pivot link assemblies 2216, 2217, with the top and bottom ends moving along different planar paths. With respect to the example shown in FIGS. 23A-23O, the top end of the shock travels along a plane parallel to the plane defined by the first pivot link assembly 2316, and the bottom end of the shock travels along a plane parallel to the plane defined by the second pivot link assembly 2318, which intersects the plane defined by the first pivot link assembly 2316. Accordingly, the body of the shock 2225 (i.e., the piston shaft 2020 and cylinder body 2010), as well as its longitudinal axis, travels in a three-dimensional motion due to the simultaneous motion of the top and bottom ends along intersecting planes as the shock 2225 is compressed.

As will be further described below, the top and bottom ends of the floating shock 2225 travel in each of the x, y, and z directions, as the shock is compressed. Notably, despite the travel of the ends of the floating shock assembly 2225 along the x, y, an z axes, the motion of the swing arm 2214 and corresponding wheel travel path are substantially confined to the X-Y plane due to the transverse orientation of the link assemblies 2216, 2218.

In other examples, the ends of the floating shock assembly 2225 may be otherwise attached to the links of the first and second pivot link assemblies 2216, 2218 to generate different wheel paths. For example, the top end of the floating shock assembly 2225 may be joined to the rear link 2219 of the first pivot link assembly 2216 and the bottom end of the floating shock assembly 2225 may be joined to the forward link 2227 of the second pivot link assembly 2218. In a further example, the top and bottom ends of the floating shock 2225 may be coupled to the front links 2217, 2227 or the rear links 2219, 2229 of the first and second pivot link assemblies 2216, 2218. In the illustrated example, the ends of the floating shock assembly 2225 are joined to the links 2217, 2227, 2219, 2229 via heim joints, although other examples may utilize different types of joints, such as multi-orientation joints, for joining the floating shock assembly 2225 to the links.

In contrast to other examples described herein, the floating shock 2225 of the example shown in FIGS. 23A-23O is configured to travel in three dimensions due to the crossed configuration of the first and second pivot link assemblies 2216, 2218. The motion of the floating shock 2225 is best illustrated in FIGS. 23E-23O, which show various views of the rear suspension system 2002 along different planes of travel, demonstrating that the top and bottom ends of the floating shock are configured to move along each of the x, y, and z axes as the shock is compressed, and that the shock 2225 changes orientation relative to the front frame 2212 as it is compressed. For example, FIG. 23E-23G illustrate show various front views of the floating shock 2225 and pivot link assemblies 2216, 2218 in fully compressed and uncompressed states. Specifically, FIG. 23E illustrates the floating shock 2225 in an uncompressed state, FIG. 23F illustrates the floating shock in a fully compressed state, and FIG. 23G illustrates the shock 2225 in both an uncompressed state in solid lines and in a compressed state in dashed lines. Additionally, FIG. 23O illustrates a rear view of the floating shock in both an uncompressed state (in solid lines) and a partially state (in dashed lines) with the pivot link assemblies 2216, 2218 removed. These figures serve to illustrate the movement of the ends of the shock 2225 along the Y-Z plane. Comparing the positions of the top and bottom ends of the shock 2225 in the fully compressed and uncompressed states, the top end of the shock 2225, which is attached to the forward link 2217 of the first pivot link assembly 2216 moves both upwardly along the y-axis and towards the left-hand side of the bicycle along the z-axis. The bottom end of the shock 2225, which is attached to the rear link 2229 of the second pivot link assembly 2219, moves both upwardly along the y-axis, as well as towards the left-hand side of the bicycle along the z-axis.

FIGS. 23H-23J illustrate top views of the swing arm 2214, floating shock 2225, and pivot link assemblies 2216, 2218. Specifically, FIG. 23J illustrates the floating shock 2225 in an uncompressed state, FIG. 23I illustrates the floating shock in a fully compressed state, and FIG. 23H illustrates the shock 2225 in both an uncompressed state in solid lines and in a compressed state in dashed lines. FIG. 23M illustrates a top view of the floating shock in both the compressed and uncompressed states (in dashed lines) with the pivot link assemblies 2216, 2218 removed. These figures serve to illustrate the movement of the ends of the shock 2225 along the X-Z plane. As is shown, the top end of the shock 2225, which is attached to the forward link 2217 of the first pivot link assembly 2216 moves both rearwardly along the x-axis and slightly towards the left-hand side of the bicycle along the z-axis. The bottom end of the shock 2225, which is attached to the rear link 2229 of the second pivot link assembly 2219, moves forwardly along the x-axis, as well as towards the left-hand side of the bicycle along the z-axis.

FIGS. 23K-23L illustrate side views of the swing arm 2214, floating shock 2225, and pivot link assemblies 2216, 2218. Specifically, FIG. 23K illustrates the floating shock 2225 in an uncompressed state, and FIG. 23L illustrates the floating shock in a partially compressed state. FIG. 23N further illustrates a rear view of the floating shock in both the compressed and partially compressed states (in dashed lines) with the pivot link assemblies 2216, 2218 removed. These figures serve to illustrate the movement of the ends of the shock 2225 along the X-Y plane as the shock moves from a fully compressed to a partially compressed state. As is shown, the top end of the shock 2225, which is attached to the forward link 2217 of the first pivot link assembly 2216 moves both rearwardly along the x-axis and upwardly along the y-axis. The bottom end of the shock 2225, which is attached to the rear link 2229 of the second pivot link assembly 2219, also moves upwardly along the y-axis and slightly rearwardly along the x-axis.

In other examples, the curve defined by the instantaneous leverage ratios as the floating shock is compressed can be varied by changing the position and length of the link assemblies, as well as the attachment points of the floating shock assembly. Accordingly, this example may be particularly well-suited for use in conjunction with commercial off-the-shelf shock assemblies, since the attachment points of the shock assemblies on the links may be easily and relatively inexpensively adjusted to allow for the creation of different leverage ratios. In some other examples, the first and second pivot link assemblies 2216, 2218 may be oriented in a V-configuration, rather than crossed.

FIGS. 24A-24G illustrate another example of a rear suspension system 2502 for a bicycle. Similar to prior embodiments, this example includes a front frame 2512 operably associated with a rear frame 2514, a shock 2525, a dog bone link 2519, and a link suspension system 2515 including first and second pivot link assemblies 2516, 2518 arranged in a crossed configuration.

As best shown in FIG. 25, which illustrates the components of the front frame 2512 with the rear frame 2514 removed, the forward end of the shock 2525 may be pivotally coupled to the down tube 2505 of the front frame 2512 at a fixed pivot point 2598. The rear end of the shock 2512 may be pivotally coupled to the top end of the dog bone link 2519 at rotating pivot point 2599. The bottom end of the dog bone link 2519 may be pivotally coupled to the seat tube 2503 of the front frame 2512 at fixed pivot point 2592. Specifically, the dog bone link 2519 may be coupled to the front frame 2512 at a protrusion that extends from the seat tube 2503 towards the forward end of the bicycle. The rear frame 2514 may also be pivotally coupled to the dog bone link 2519 at a pivot point 2591, which is located between the top and bottom ends of the dog bone link 2519. As the dog bone link 2519 rotates about fixed pivot point 2592, it causes rotation of the top end of the front member 2572 of the rear frame 2514 along an arcuate path defined by the link 2519.

The forward ends of the first and second pivot link assemblies 2516, 2518 of the link suspension system 2515 may be pivotally coupled to mounting portion 2500 that extends from the down tube 2505 of the front frame 2512. The rear ends of the pivot link assemblies 2516, 2518 may be coupled to a mounting bracket 2570 that is, in turn, pivotally coupled to the rear frame 2514 at pivot point 2571. As with some of the examples previously described, the mounting bracket 2570 may be configured to travel along a substantially linear path defined by the transverse orientation of the pivot link assemblies 2516.

Figure 24A:
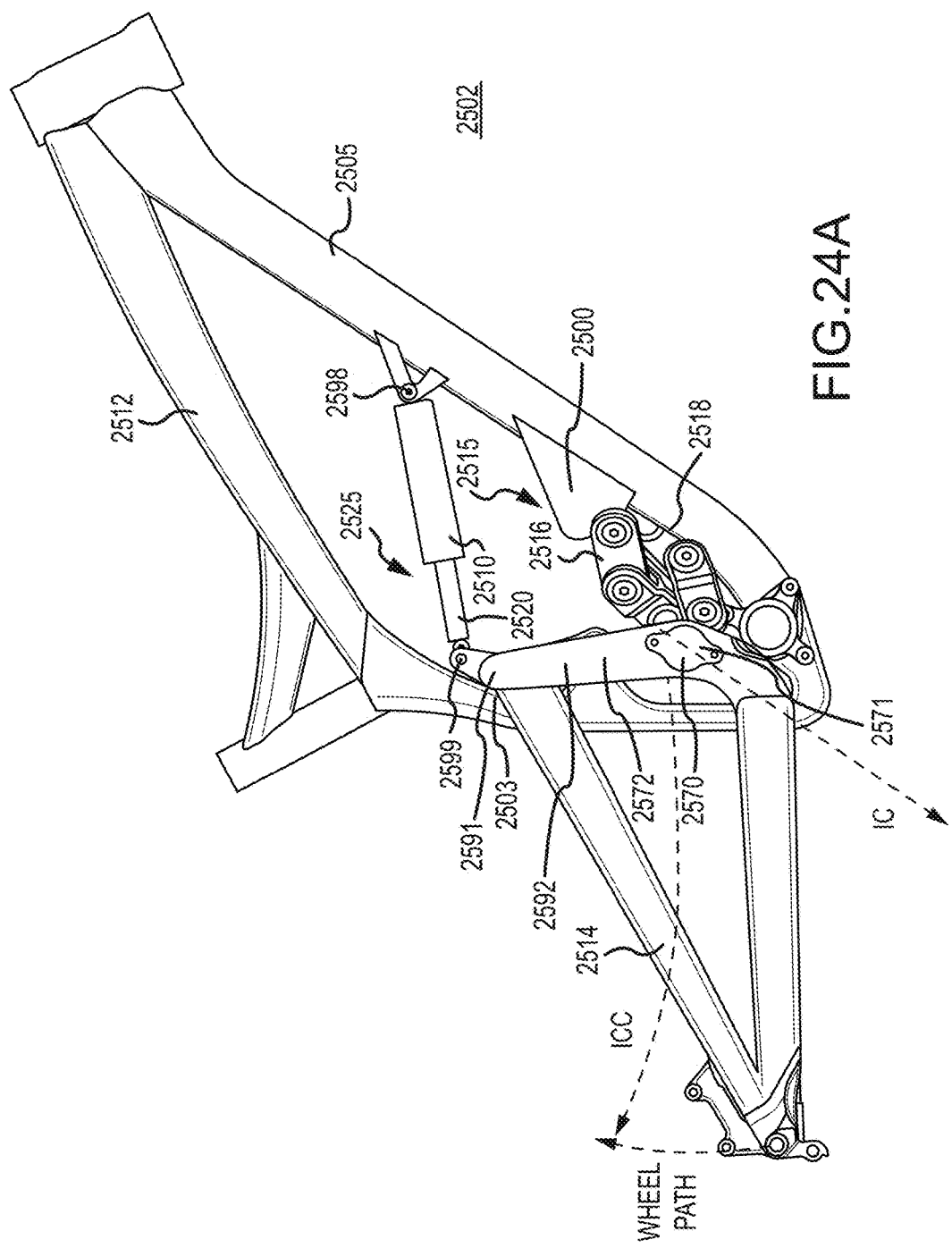
FIG. 24A is a right side view of a front frame and rear suspension system according to an eleventh example of the present invention.
Figure 24D:
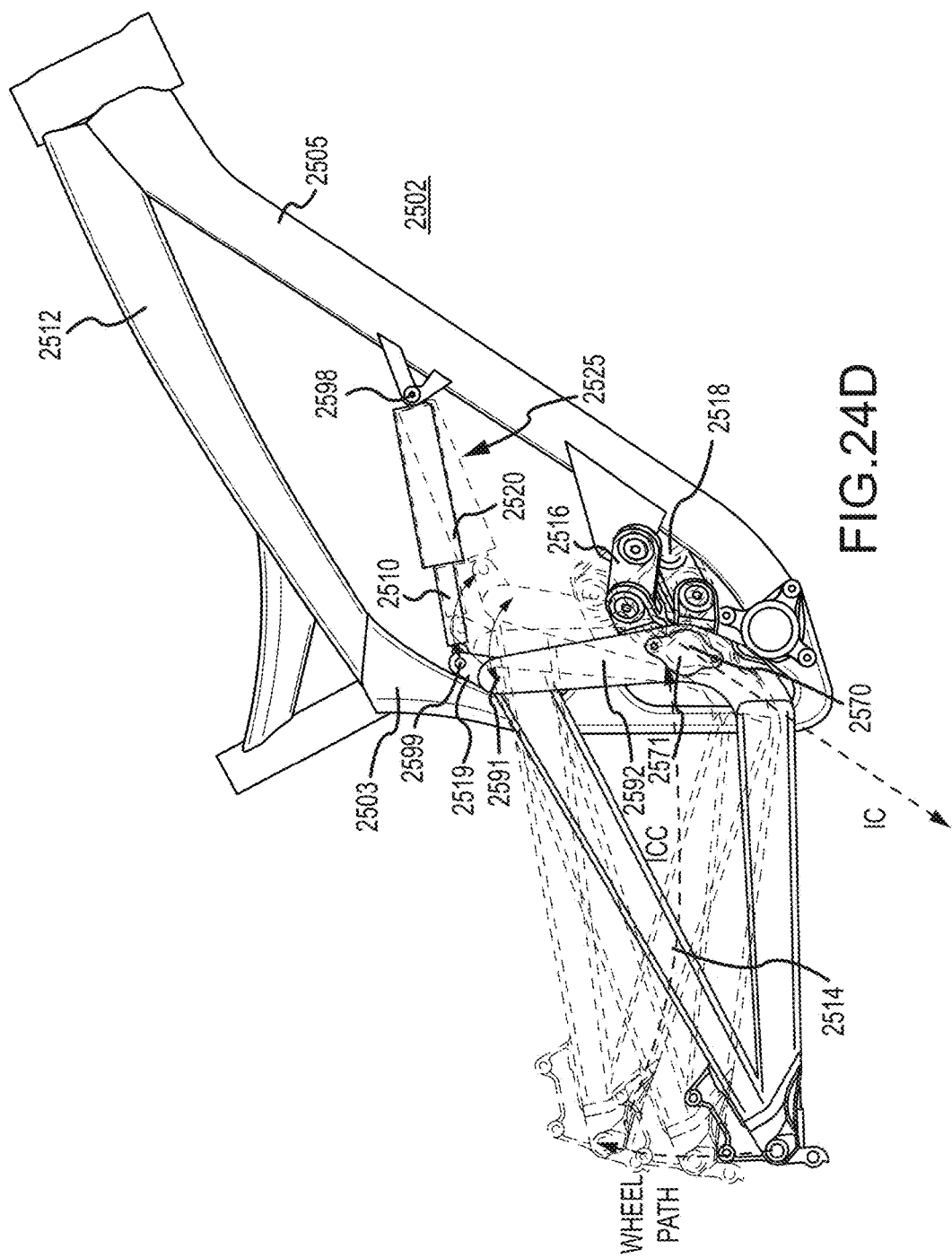
FIG. 24D is a right side view of the front frame and rear suspension system depicted in FIG. 24A in an uncompressed stage shown in solid lines, in a partially compressed stage shown in dashed lines, and in a fully compressed stage shown in dashed lines.

FIGS. 24A-24D, 24G, and 24H illustrate the relative motion of the shock 2525, link 2519, pivot link assemblies 2516, 2518, and rear frame 2514 relative to the front frame 2512 as the shock 2525 is compressed. Specifically, FIG. 24A illustrates the rear suspension system 2502 when the shock 2525 in an uncompressed state, FIG. 24B illustrates the rear suspension system 2502 when the shock 2525 is in a partially compressed state, and FIG. 24C illustrates the rear suspension system 2502 when the shock 2525 is in a fully compressed state. FIG. 24D illustrates a comparison of the three states shown in FIGS. 24A-24C, with the shock 2525 shown in the uncompressed state in solid lines, as well as in the partially and fully compressed state in dashed lines. FIG. 24E illustrates a magnified view of the mounting bracket in FIG. 24D. A comparison of FIGS. 24A-24B illustrates that partial compression of the shock 2525 causes the dog bone link 2519 to pivot in a clockwise direction around fixed pivot point 2592. The pivot point 2599 located at the top end of the link 2519, and the pivot point 2591 located along the length of the link 2519 are configured to move along arcuate paths defined by the rotation of the link 2519 around the fixed pivot point 2592. The rear end of the shock 2525, and the top end of the rear triangle 2514, which are coupled to the link at the pivot points 2599, 2591, are also configured to move along the arcuate paths defined by the pivot points 2599, 2591. At the same time, the mounting bracket 2571 is configured to travel in a rearward direction, such that the pivot point 2571 defined between the bracket 2570 and the rear frame 2514 travels backwardly along the linear path defined by the pivot link assemblies 2516.

Figure 25A:
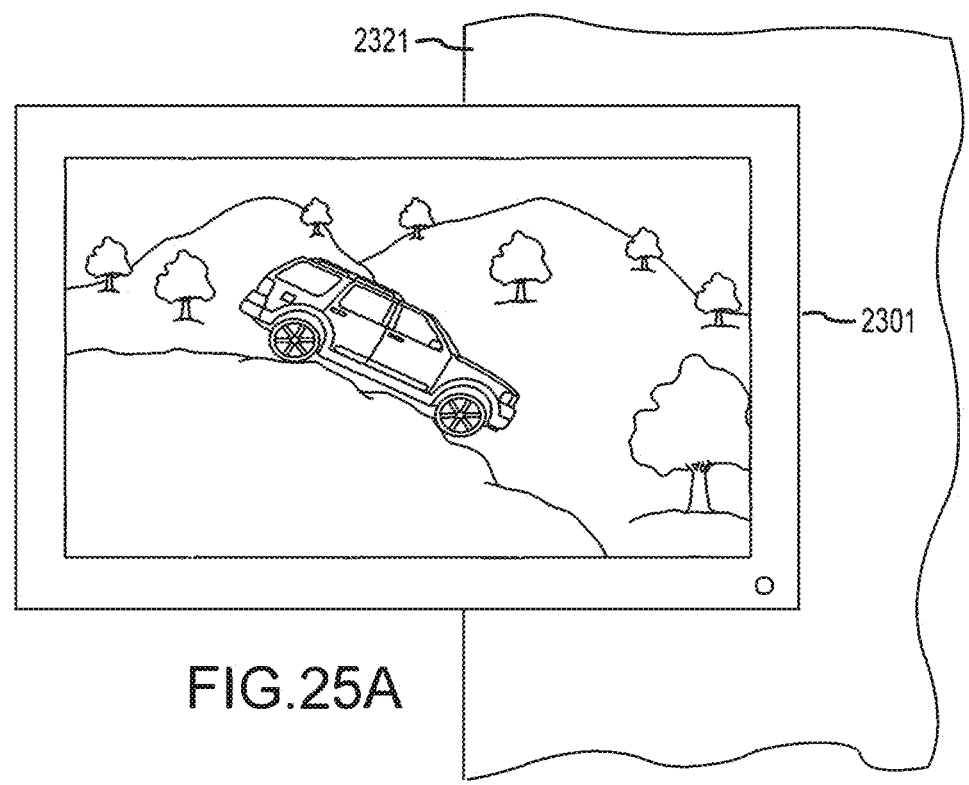
FIG. 25A is a front view of a television mounted on a wall using another example of a linkage system.
Figure 25B:
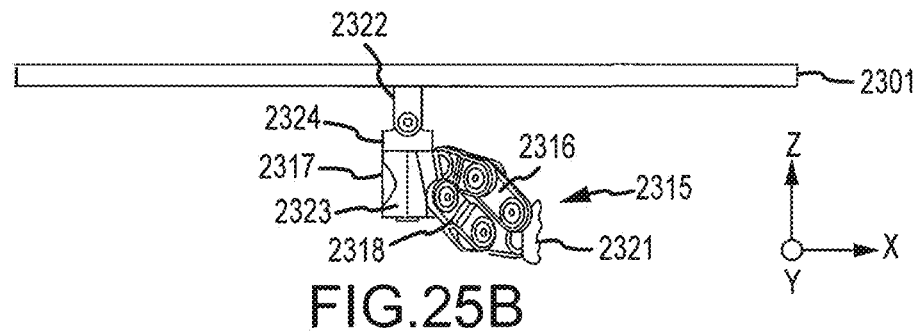
FIG. 25B is a top down view of the television, wall, and pivot link assemblies depicted in FIG. 25A, where the linkage system is in an extended position.
Figure 25C:
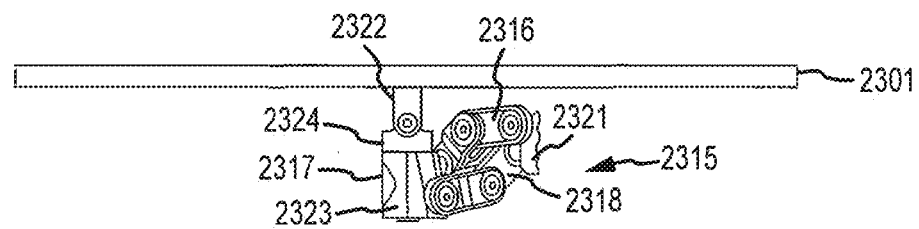
FIG. 25C is a top down view of the television, wall, and pivot link assemblies depicted in FIG. 25A, where the linkage system is in a retracted position.

A comparison of FIGS. 25B and 25C illustrates that further compression of the shock 2525 causes the dog bone link 2519 to rotate further in a clockwise direction around pivot point 2592, such that the shock 2525 is also rotated around fixed pivot point 2598. Additionally, the mounting bracket 2570 is configured to switch directions, such that the pivot point 2571 defined between the bracket 2570 and the rear frame 2514 travels forwardly along the linear path defined by the pivot link assemblies 2516, 2518.

As discussed above, the mounting bracket 2570 may be configured to travel in both backwards and forwards directions along the substantially linear path defined by the pivot link assemblies 2516, 2518 as the shock 2525 transforms between the uncompressed and fully compressed states. In other words, the mounting bracket 2570 and the attached portion of the rear frame 2514 are configured to move both backwards and forwards along the linear path as the rear wheel travels along the full wheel path during one of compression or extension of the shock. The back and forth motion of the bracket 2570 and rear frame 2514 are best shown in FIGS. 24D and 24E. As the rear wheel moves upwardly along the wheel path, the bracket 2570 initially moves rearwardly along the linear path defined by the pivot link assemblies 2516, 2518. At the same time, the top end of the rear frame 2514 travels forwardly along the arcuate path defined by the link 2519, resulting in a wheel path that is increasingly curved or concave (i.e., the radius of curvature of the wheel path decreases as the rear wheel travels upwardly). Once the rear wheel hits an inflection point along the wheel path, or the point at which the curvature or concavity of the wheel path changes sign, the bracket 2570 switches directions such that it begins to travel in the opposite direction (in this case, forwardly) along the linear path defined by the pivot link assemblies 2516, 2518. Accordingly, the bracket 2570 and the attached portion of the rear frame 2514 are configured to move rearwardly and forwardly along the linear path defined by the pivot link assemblies 2516, 2518 during each compression or extension of the shock 2525. In other embodiments, the mounting points and configurations of the link 2519, shock, 2525, and pivot link assemblies 2516, 2518 may be adjusted so that the bracket 2570 moves forwardly first, and then rearwardly along the linear path.

FIGS. 24G and 24H illustrate the motion of pivot points 2599, 2591, and 2571 as the shock 2525 is compressed. A comparison of FIGS. 20G and 20H illustrates that pivot point 2099, which is located at the free end of the dog bone link 2519, rotates along an arcuate path around fixed pivot point 2592. The path is located a distance away from the fixed pivot point 2592 that is substantially equal to the distance between the fixed pivot point 2592 and the rotating pivot point 2592. Similarly, pivot point 2591, which is located along the length of the dog bone link 2519 also travels in an arcuate path around fixed pivot point 2592 that is parallel to that traveled by pivot point 2599. The path is located a distance away from the fixed pivot point 2592 that is substantially equal to the distance between the fixed pivot point 2592 and the rotating pivot point 2591. The pivot point 2571 between the mounting bracket 2570 and the rear frame 2514 travels along a linear path that is defined by the pivot link assemblies 2516, 2518.

The ICC and the IC for this example vary and migrate throughout the path traveled by the wheel. As shown in FIGS. 24A-24D, the ICC and the IC move in different directions, with the IC defining a substantially straight line that extends downwardly and rearwardly from the bracket 2570 and the ICC defining a curve that extends rearwardly from the bracket 2570. As is shown in FIGS. 24A-D, the curve defined by the ICC becomes increasingly concave as the rear wheel travels upwardly, resulting in the aforementioned wheel path in which the curvature of the path changes as the wheel approaches the highest point in its path. Notably, the distance traveled by the wheel in the y-direction is very large as compared to the distance traveled by the bracket 2570 along the x-axis.

Figure 25D:
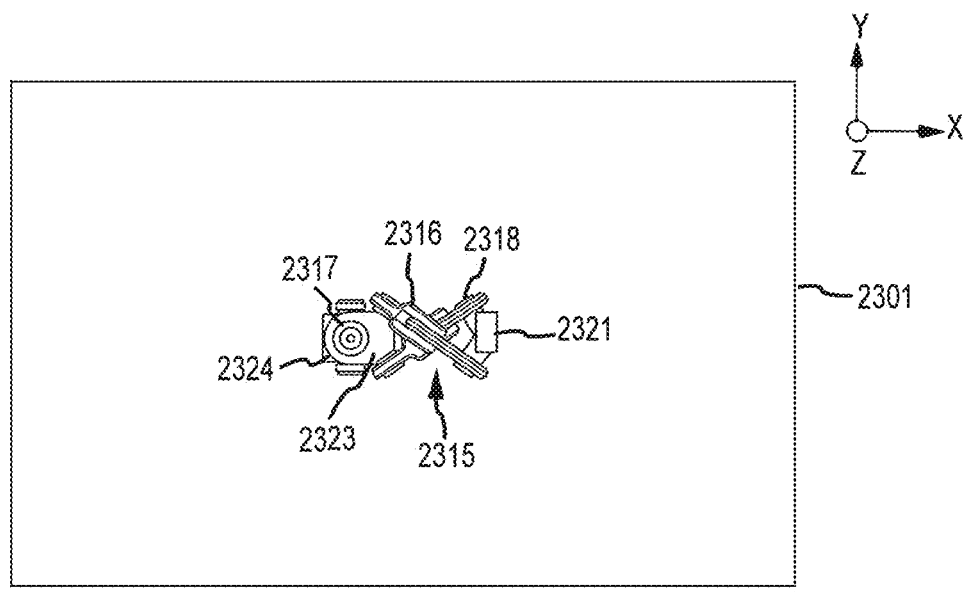
FIG. 25D is a rear view of the television, wall, and pivot link assembly depicted in FIG. 25A.

FIGS. 25A-25D illustrate another application of a linkage system 2315. As consistent with other examples described herein, the linkage system 2315 includes first and second pivot link assemblies 2316, 2318 that are arranged in a crossed configuration. As shown in FIGS. 25B-25D, the front ends of the pivot link assemblies 2316, 2318 may be attached at angles to a mounting bracket 2317, which in turn, may be attached either directly or indirectly to a supported object, such as a television 2301. The rear ends of the pivot link assemblies 2316, 2318 may be attached, either directly or indirectly, to a supporting object 2321, such as a wall, or other object. As discussed above with respect to other examples, the transverse orientation of the pivot link assemblies 2316, 2318 serves to confine the motion of the television 2301 relative to the wall or object 2321 to a substantially linear path along the z-axis. This motion is best illustrated in FIGS. 25B and 25C, which respectively illustrate the television 2301 in an extended position further away from the wall 2321, and in a retracted position closer to the wall 2321.

In some examples, additional pivotal attachments may be provided to allow for rotation of the television 2301, mounting bracket 2317 and/or pivot link assemblies 2316, 2318 relative to one another. For example, in the illustrated example, the television 2301 is joined to a support arm 2322 that is pivotally coupled to the mounting bracket 2317 to allow the television 2301 to pivot relative to the mounting bracket 2317. As best shown in FIGS. 25B and 25C, this may allow for tilting the screen of the television 2301 along the X-Z plane. Additionally, the mounting bracket 2317 may include a rotatable portion 2323 rotatably coupled to a base portion 2324 to allow for rotation of the television 2301 around the base portion 2324. As best shown in FIG. 25D, this may allow for rotating the screen of the television 2301 along the X-Y plane.

In other examples, the lengths of the links of the pivot link assemblies 2316, 2318 may be changed to increase or decrease the distance of the television 2301 from the supporting object or wall 2321. Additionally, the attachment points of the ends of the pivot link assemblies 2316, 2318 may be changed. In further examples, one or both of the pivot link assemblies 2316, 2318 may include more than two links, which may allow for further extension of the pivot link assemblies 2316, 2318 along the z-axis.

It will be appreciated from the above noted description of the various arrangements and examples of the present disclosure that a rear suspension system for a bicycle has been described which includes a first link assembly and a second link assembly. The rear suspension system can be formed in various ways and operated in various manners depending upon a user's desired rear wheel path and leverage ratio curve. It will be appreciated that the features described in connection with each arrangement and example of the disclosure are interchangeable to some degree so that many variations beyond those specifically described are possible. It should also be understood that the above described component parts of the rear suspension need not be connected with the bicycle in the manners described and depicted above, and as such, can be connected with the frame and with each other in various additional locations. It should also be understood that the physical shapes and relative lengths of the rear suspension components are not limited to that which has been depicted and described herein.

Although various representative examples of this disclosure have been described above with a certain degree of particularity, those skilled in the art could make numerous alterations to the disclosed examples without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the present disclosure, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The foregoing has been generally described with respect to particular examples and methods of manufacture. It will be apparent to those of ordinary skill in the art that certain modifications may be made without departing from the spirit or scope of this disclosure. For example, a fiber other than carbon may be used as a strengthening or stiffening element. As one example, certain metals may be used instead, or another type of plastic may be used. Accordingly, the proper scope of this disclosure is set forth in the following claims.

What is claimed is:

1. A bicycle comprising:
   a frame having a longitudinal axis and a transverse axis;
   a mounting bracket; and
   a first pivot link assembly including a first link configured to rotate around a first pivot point, the first pivot point having a first axis of rotation that is non-orthogonal to the longitudinal axis of the frame and non-orthogonal to the transverse axis of the frame;
   wherein the frame is coupled with the mounting bracket through the first pivot link assembly.

2. The bicycle of claim 1, further comprising a second pivot link assembly including a second link configured to rotate around a second pivot point, the second pivot point having a second axis of rotation that is at a different angle than the first axis of rotation.

3. The bicycle of claim 2, wherein the second axis of rotation is non-orthogonal to the longitudinal axis of the frame and non-orthogonal to the transverse axis of the frame.

4. The bicycle of claim 3, wherein the frame is coupled with the mounting bracket through the second pivot link assembly.

5. The bicycle of claim 4, wherein the frame is a front frame.

6. The bicycle of claim 5, wherein the mounting bracket is connected to a rear frame thereby connecting the front frame to the rear frame via the first and second pivot link assemblies.

7. The bicycle of claim 6, wherein the rear frame is pivotally coupled to the mounting bracket.

8. The bicycle of claim 2, wherein the mounting bracket is configured to travel along a substantially linear path in a first direction and in a second direction opposite the first direction as a shock assembly transforms between an uncompressed state to a fully compressed state.

9. The bicycle of claim 5, further comprising a wheel, wherein the first pivot link assembly forms a portion of a suspension system that causes the first pivot point to travel along the substantially linear path in the first direction and in the second direction as the wheel travels in an upward direction relative to the front frame.

10. The bicycle of claim 8, wherein the first link is further pivotally coupled to the shock assembly.

11. The bicycle of claim 10, wherein one end of the shock assembly is configured to travel along an arcuate path defined by the first link.

12. The bicycle of claim 10, wherein the rear frame is configured to travel along an arcuate path defined by the second link.

13. A bicycle comprising:
a frame having a longitudinal axis and a transverse axis;
a mounting bracket; and
a first pivot link assembly including a first link-set configured to rotate around a first pivot point, the first pivot point having a first axis of rotation;
a second pivot link assembly including a second link-set configured to rotate around a second pivot point, the second pivot point having a second axis of rotation;
wherein the frame is coupled to the mounting bracket through the first pivot link assembly or the second pivot link assembly with the first axis of rotation and the second axis of rotation being non-parallel.

14. The bicycle of claim 13, wherein the first axis of rotation is parallel to the longitudinal axis of the frame.

15. The bicycle of claim 14, wherein the second axis of rotation is parallel to the transverse axis of the frame.

16. The bicycle of claim 15, wherein the frame is coupled with the mounting bracket through the second pivot link assembly.

17. The bicycle of claim 16, wherein the frame is a front frame.

18. The bicycle of claim 17, wherein the mounting bracket is connected to a rear frame thereby connecting the front frame to the rear frame via the first and second pivot link assemblies.

19. The bicycle of claim 15, wherein the mounting bracket is configured to travel along a substantially linear path in a first direction and in a second direction opposite the first direction as a shock assembly transforms between an uncompressed state to a fully compressed state.

20. The bicycle of claim 15, wherein the first pivot link is further pivotally coupled to a shock assembly and one end of the shock assembly is configured to travel along an arcuate path defined by the first pivot link.

* * * * *